(12) United States Patent
Lok et al.

(10) Patent No.: US 11,771,097 B2
(45) Date of Patent: Oct. 3, 2023

(54) MOULDING FOOD PRODUCTS FROM A PUMPABLE FOODSTUFF MASS

(71) Applicant: MAREL FURTHER PROCESSING B.V., Boxmeer (NL)

(72) Inventors: Geert Johannes Lok, Oisterwijk (NL); Mathias Marcellus Kuijpers, Wijchen (NL); Thomas Willem Dekker, Nijmegen (NL); Johannes Martinus Meulendijks, Deurne (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 440 days.

(21) Appl. No.: 16/843,234

(22) Filed: Apr. 8, 2020

(65) Prior Publication Data
US 2020/0245632 A1 Aug. 6, 2020

Related U.S. Application Data

(63) Continuation of application No. 14/903,188, filed as application No. PCT/NL2014/050504 on Jul. 23, 2014, now Pat. No. 10,638,764.

(30) Foreign Application Priority Data

Jul. 25, 2013 (NL) .................................. 2011222

(51) Int. Cl.
*A22C 7/00* (2006.01)
*A22C 17/00* (2006.01)

(52) U.S. Cl.
CPC .......... *A22C 7/0069* (2013.01); *A22C 7/0076* (2013.01); *A22C 17/0026* (2013.01)

(58) Field of Classification Search
CPC .. A22C 7/0069; A22C 7/0076; A22C 17/0026
See application file for complete search history.

(56) References Cited

U.S. PATENT DOCUMENTS 3,137,029 A 6/1964 De Zolt
3,646,979 A 3/1972 Anderson
(Continued)

FOREIGN PATENT DOCUMENTS

EP 2449893 A1 5/2012
NL 2006841 C 12/2012
(Continued)

*Primary Examiner* — Jerzi H Moreno Hernandez
(74) *Attorney, Agent, or Firm* — WORKMAN NYDEGGER

(57) ABSTRACT

An installation for moulding of three dimensional products from a mass of pumpable foodstuff material includes a pump having at least one pump chamber, a pump drive, and a moulding device including a mould drum, a mould member drive for moving the mould drum along a path, and a mass feed member. The mass feed member has a chamber with an inlet, a discharge mouth facing the mould member at the fill position along the path of the mould drum, an orificed grinder body and multiple mobile grinder members each arranged at one of the distinct positions of the mold cavities and cooperating with the grinding face of the orificed grinder body. The installation is advantageously employed for the manufacture of meat products from a pumpable meat mass for the manufacture of meat patties.

19 Claims, 34 Drawing Sheets

(56) References Cited

U.S. PATENT DOCUMENTS

| | | | |
|---|---|---|---|
| 4,068,008 A | | 1/1978 | Orchard |
| 4,356,595 A | | 11/1982 | Sandberg et al. |
| 4,422,372 A | | 12/1983 | Hoezee |
| 4,761,121 A | | 8/1988 | Battista et al. |
| 5,021,025 A | | 6/1991 | Wagner |
| 5,335,455 A | * | 8/1994 | Bergner ............... B24B 23/04 451/356 |
| 5,866,176 A | | 2/1999 | Baars et al. |
| 2004/0247759 A1 | | 12/2004 | Palese |
| 2007/0224305 A1 | * | 9/2007 | Meskendahl ........ A22C 7/0069 425/237 |
| 2012/0058213 A1 | * | 3/2012 | Lindee ............... A22C 7/0069 425/135 |
| 2013/0224357 A1 | * | 8/2013 | Van Gerwen ....... A22C 7/0092 426/513 |
| 2014/0141135 A1 | | 5/2014 | Van Doom et al. |

FOREIGN PATENT DOCUMENTS

| | | |
|---|---|---|
| WO | 0030458 A1 | 6/2000 |
| WO | 2004002229 A2 | 1/2004 |
| WO | 2011005099 A1 | 1/2011 |
| WO | 2012161577 A1 | 11/2012 |

\* cited by examiner

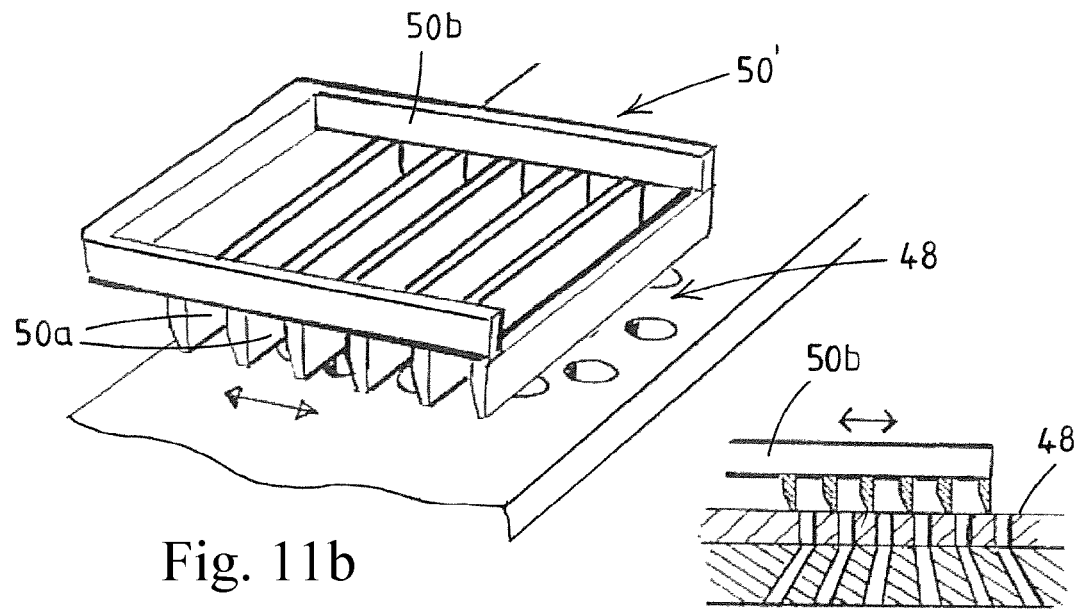
Fig. 11b
Fig. 11c
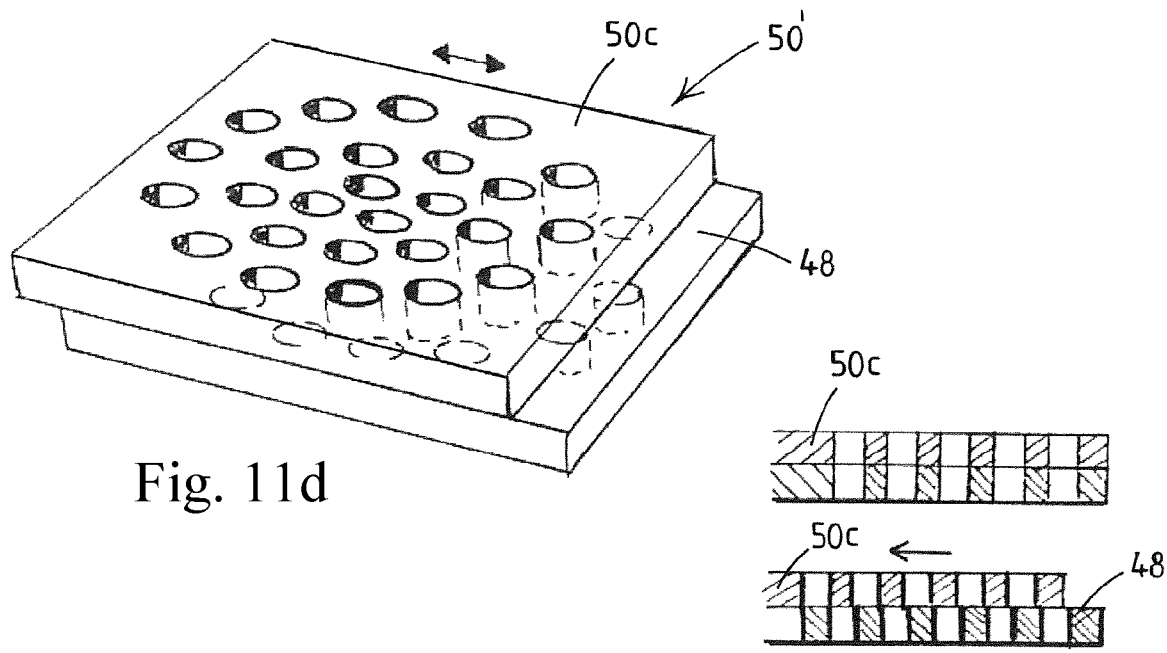
Fig. 11d
Fig. 11e

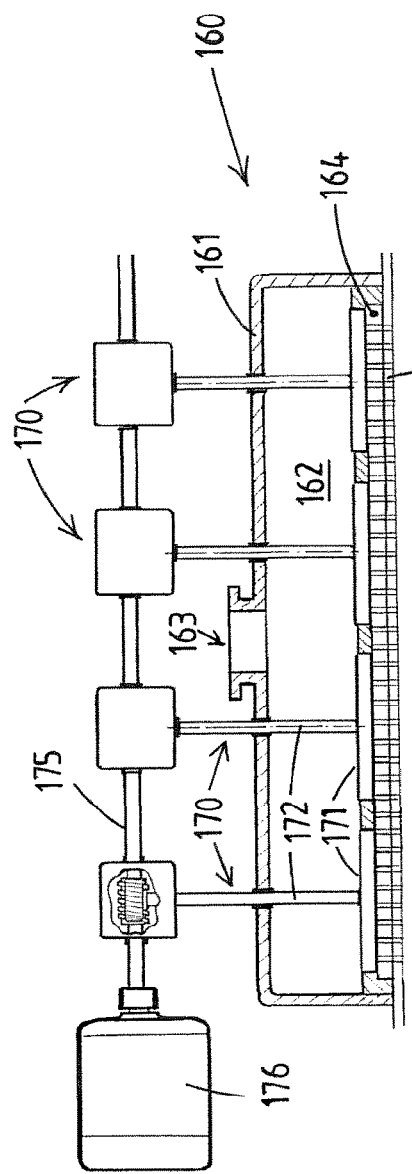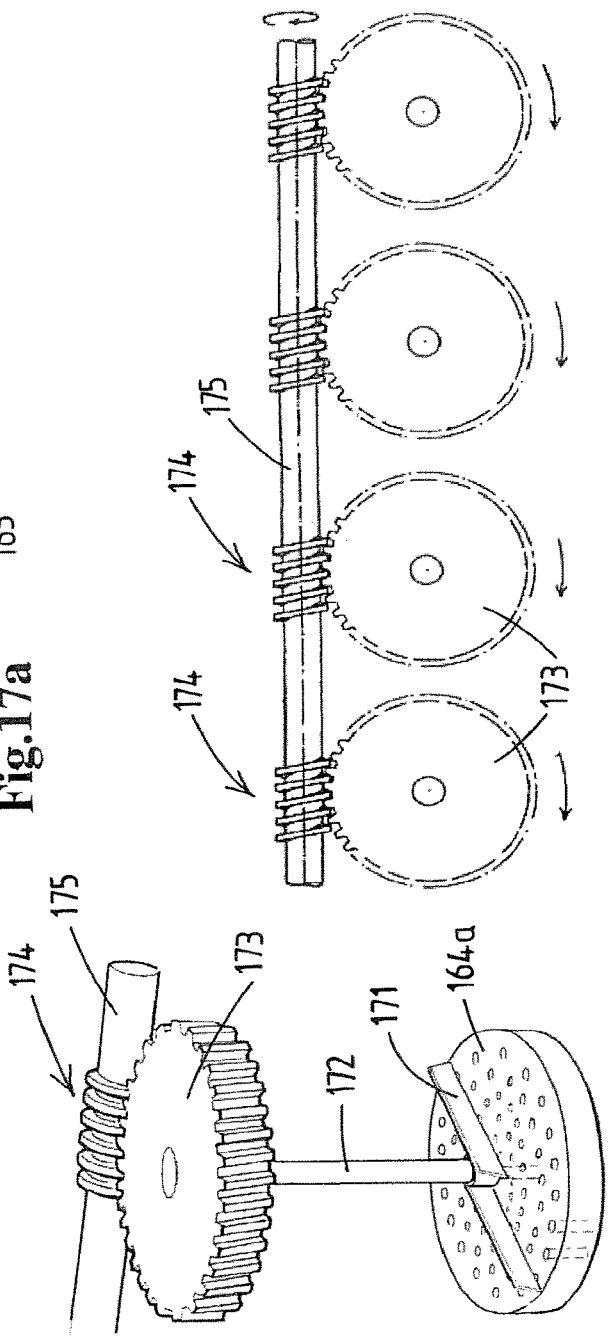
Fig.17a
Fig.17b
Fig.17c

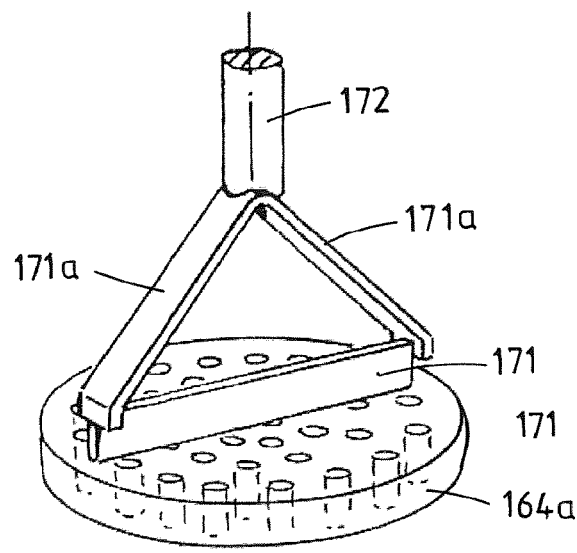
Fig.18a
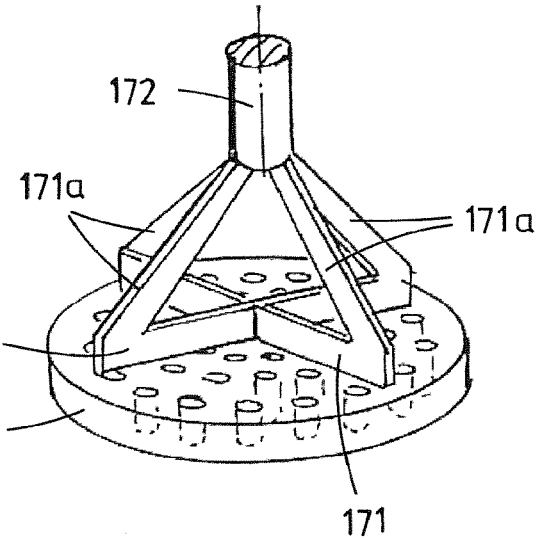
Fig.18b
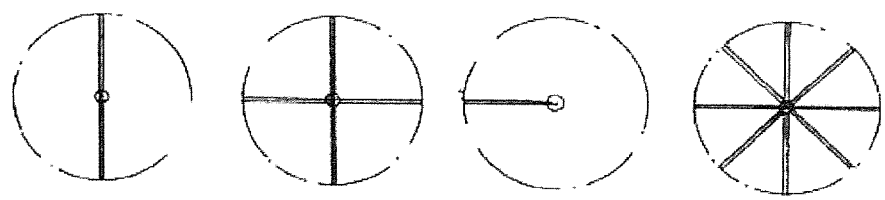
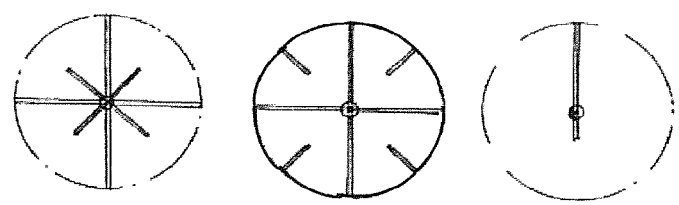
Fig.18c

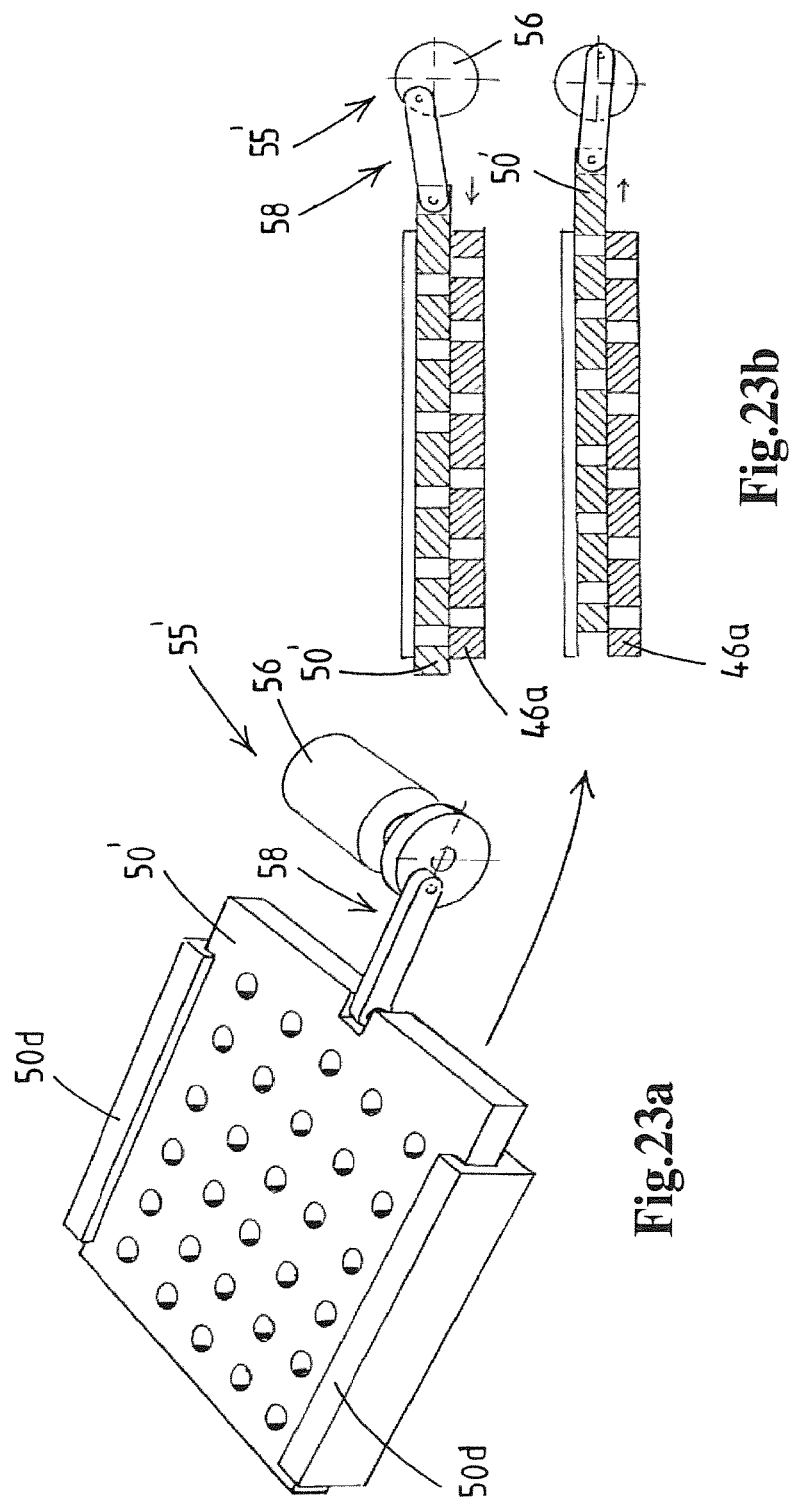

MOULDING FOOD PRODUCTS FROM A PUMPABLE FOODSTUFF MASS

FIELD OF THE INVENTION

The present invention relates to installations and methods for moulding food products from a pumpable foodstuff mass. The invention is advantageously employed for the manufacture of meat products from a pumpable meat mass, e.g. a ground beef mass, for the manufacture of meat patties.

BACKGROUND OF THE INVENTION

A known method for manufacture of e.g. meat patties involves the use of an installation having a frame and a mould drum with an outer circumferential drum surface and a longitudinal drum rotation axis, often a horizontal axis. The drum is rotatably supported by the frame to revolve about the drum rotation axis. The drum has in the drum surface multiple mould cavities, each having a filling opening for the introduction of foodstuff mass, e.g. ground beef mass, into the mould cavity. A mould drum drive is coupled to the drum to drive the drum in a rotation direction. A mass feed member is stationary arranged at a fill position. This mass feed member has a single chamber with an inlet for the foodstuff mass to introduce foodstuff mass into the chamber and with a mouth facing the drum surface that is provided with the mould cavities. The mass feed member is adapted to transfer mass from the chamber into the passing mould cavities of the rotating mould drum when the filling opening of a mould cavity is in communication with the mouth at said fill position. The mass that has been filled into a mould cavity remains in said cavity for a while, commonly the installation has a closure member that extends in downstream direction from the mass feed member at the fill position and temporarily keeps the filled mould cavities closed downstream of the fill position, e.g. to allow the mass to become a more coherent food product. The mass in the mould cavity forms the food product, e.g. the meat patty. The installation comprises a pump that is connected to the inlet of the mass feed member and is adapted to feed foodstuff mass under pressure into the chamber of the mass feed member. A food products release or knock-out mechanism is provided, e.g. associated with the mould drum, and is adapted to cause or facilitate removal of the food product at a product removal position that is downstream of the fill position. It is for example known to provide air channels in the drum that extend to the cavities and allow to selectively introduce air that has been supplied from a manifold at a head end of the drum via said channels to between the drum and the product in order to facilitate the release thereof from the mould cavity. Other release or removal mechanisms, e.g. using a mechanical ejector, are also known in the art.

The production of moulded food products, e.g. meat patties, with such installations generally includes:
- driving the drum in its rotation direction in a continuous, non-interrupted manner;
- operating the pump so as to feed foodstuff mass to the mass feed member and establish a foodstuff mass pressure in the chamber of said mass feed member,
- transfer of pressurized foodstuff mass via the mouth into each passing mould cavity,
- release of the moulded products from the mould cavities.

Some small capacity prior art moulding devices of the design mentioned above have a drum of minimal axial length that is only provided with a single circumferential array of mould cavities that are arranged at different circumferential positions on the drum surface. An example thereof is shown in U.S. Pat. No. 3,137,029.

It is also known to increase the capacity by lengthening the drum so that the drum has multiple of such groups in axial direction of the drum, or in general to have the mould cavities arranged in the drum surface in a mould cavities pattern with cavities at multiple, e.g. two, or four or more, longitudinal positions when seen in longitudinal direction of the drum and at multiple circumferential positions when seen in circumferential position of the drum. It is common in prior art mould drums for these installations to arrange the mould cavities in straight or rectilinear rows of multiple mould cavities, said rows being parallel to the drum axis with the rows being offset from one another in circumferential direction. It is also common in such prior art mould drums that all mould cavities are of identical dimensions, e.g. circular contoured cavities, although other embodiments with non-identical cavities are known as well. Examples of known high capacity food product moulding installations and methods are found in e.g. WO 0030458 and WO2004002229.

In general drum type moulding installations allow for a high production capacity compared to well-known slide-plate moulding devices, wherein a cyclically driven mould plate with a row of mould cavities is cycled back and forth between a fill position and a release or knock-out position. At the fill position the row of mould cavities in the reciprocating plate is filled with foodstuff mass. This is for example illustrated in U.S. Pat. No. 4,356,595.

In U.S. Pat. No. 5,021,025 a slide-plate moulding device is disclosed, wherein the plate has a row of mould cavities and for each cavity the mass feed member is provided with a rotary driven orificed grinder body having a grinding face that cooperates with a stationary grinder member. The mass flows through the orifices in the grinder body whereof the outlets form the mouth, so that the exiting mass flows directly into the cavity of the plate.

In WO 2011005099 the issue of non-uniformity of the finally obtained food products is addressed, e.g. with regard to their appearance and shape. For instance in practical use of a high capacity drum mould device it is observed that in a batch of circular meat patties that are made of ground meat there are visible deviations from the circular contour of the mould cavities. These shape deviations are also non consistent within the batch. In WO 2011005099 it is amongst others proposed to embody each mould cavity with walls so as to define a plurality of moulding cells within each mould cavity in order to alleviate this problem. Whilst measures like the ones proposed in WO 2011005099 enhance moulded food product uniformity, the uniformity problem still remains present, in particular at a high production speed of drum moulding installation. For example stringent demands are placed on meat patties that are supplied to fast food chains, e.g. with regard to shape uniformity.

The present invention amongst others aims to provide measures that resolve, or at least reduce, undesirable non-uniformity of the moulded food products, for example of products that have been obtained with a high capacity drum moulding installation. The non-uniformity may relate to the shape but also to other aspects of the product, e.g. the composition, such as the density, which may influence other aspects like the later cooking or frying, or the taste in general.

Objects of the Invention

The present invention amongst others aims to provide measures that allow for enhanced versatility and/or control with regard to the characteristics of the formed product, e.g. in view of the above mentioned density, taste, frying behaviour, etc.

The present invention also aims to provide alternative mass feed members to be used in a moulding device for food products, which mass feed members may be used to attain one or more of the above aims.

The invention is primarily aimed at products formed of ground meat mass, e.g. beef or poultry meat, but is also seen as of interest for other foodstuff masses, e.g. fibrous foodstuff masses. For example the foodstuff mass may include, or primarily be composed of, foodstuff like fish meat, potatoes, rice, (leguminous) vegetables (e.g. soy), seaweeds, nuts, fungi, etc.

SUMMARY OF THE INVENTION

According to a first aspect thereof the invention provides an installation for moulding of three dimensional products from a mass of pumpable foodstuff material, for example from ground meat.

This installation is characterized in that the mass feed member is further provided with an orificed mouth body having multiple outlet orifices forming the mouth so that mass flows into a mould cavity via said multiple outlet orifices, and in that the mass feed member is provided with multiple mobile grinder members at said distinct perpendicular axis positions when seen perpendicular to the path of the mould member, each mobile grinder member cooperating with the grinding face of the orificed grinder body, and in that the installation comprises a grinder drive and associated grinder drive controller adapted to drive the mobile grinder members.

The first aspect of the invention achieves the filling of a mould cavity via multiple outlet orifices, preferably rather small diameter orifices, for example orifices having a diameter in the range between 2 and 6 millimeters. In order to assure that the mass can readily pass through such outlet orifices the mass feed member is provided with multiple mobile grinder members and one or more orificed grinder bodies that cooperate therewith. This allows for an effective grinding of the mass in the mass feed member and/or allows for a dislodging of any mass particles that get jammed in an orifice of the grinder body.

The provision of multiple mobile grinder members allows for a versatile installation and for a practical and reliable design of the installation.

In an embodiment each mobile grinder is a rotary grinder member and the associated grinder dive and grinder drive controller are adapted to rotate the rotary grinder members.

In an embodiment the rotation of the mobile grinder member is a rotation about an axis but in another embodiment the rotation comprises a spiraling motion of the grinder member or similar motion.

In a practically preferred embodiment each mobile grinder member is a rotary grinder member that is rotatable about an axis. Rotary grinder members are generally known in the field of grinding, e.g. for grinding meat, so that this design allows to benefit from existing knowledge in the field of meat grinding. Also this design is highly reliable and practical to integrate in a mass feed member.

In an embodiment the mould member is a mould drum, which mould drum has an outer circumferential drum surface with a curvature and a longitudinal drum rotation axis. The drum is rotatably supported by the frame to revolve about the drum rotation axis, e.g. a horizontal axis. The mould drum has in the drum surface a pattern of multiple mould cavities, which pattern includes multiple arrays of mould cavities at distinct positions in the longitudinal drum rotation axis, with—in each array—multiple mould cavities at spaced location in circumferential direction of the drum surface. Each mould cavity has an opening in the outer circumferential drum surface for the transfer of foodstuff mass into the mould cavity and for the later removal of the moulded product from the mould cavity. The orificed mouth body has a curved outlet face corresponding to the curvature of a mould drum, e.g. with a plastic orificed body part that forms the outlet face of the mouth body.

In an advantageous embodiment the grinder body is integrated with the orificed mouth body, so that the grinder body forms the side facing away from the mould member. This allows for the grinding to take place in immediate vicinity of the outlet orifices, which enhances the effectiveness of the action of the mobile grinder members in view of the reliable flow of mass through the orificed mouth body.

In a further advantageous embodiment the orificed mouth body is provided with a valve, e.g. incorporated in the orificed mouth body, which valve is adapted to open and close orifices in the orificed mouth body independent from operation of the mobile grinder members. This allows grinding on the one hand and valve action on the other hand to be distinct functions that can be performed in essence independent from one another. For example the valve action is used to trigger the start of a filling event, with the grinding action being done at any suitable moment, preferably during actual flow of mass through the outlet orifices and not during standstill of mass when the valve is closed. It is envisaged that in embodiments the mobile grinder members are dimensioned such that each of them covers only a fraction, e.g. less than 50%, preferably less than 25%, of the associated region of the grinding face and orifices therein at any time during their grinding operation. This means that at no point in time during operation a grinder member closes all associated orifices and thus does not act as an open-close valve, which valve action is performed by the valve. For example the grinder member comprises a grinding blade having a main plane that is angled relative to the grinder face, e.g. perpendicular to the grinder face.

In a practical embodiment the valve comprises an orificed valve plate that is movable in its plane between an opened and closed position. For example the orificed valve plate is integrated with the grinder body, so that the multiple mobile grinder members cooperate with an element that is a combined valve plate and grinder body. This arrangement allows to avoid any clogging of orifices in this element and so assures the reliable passage of mass via the mouth body into the mould cavities. The motion of the valve plate between its opened and closed position may be in the mentioned perpendicular axis direction, but could e.g. also be at right angles thereto so in the direction of the path of motion of the mould member.

The valve plate orifices may be similar in cross-section to the adjoining outlet orifices in the mouth body, but one can also envisage that the valve plate orifices are differently shaped, e.g. slotted orifices in the valve plate and cylindrical orifices in the mouth body with the slots being longer than the diameter of the outlet orifices. For example the slotted orifices extend with their length in the mentioned perpendicular axis direction.

For example the element combining a valve plate and grinder body may have orifices in a region that is not covered by any grinder member when the element is at standstill in open position of the valve, e.g. in regions between adjacent grinder members, e.g. between adjacent circular grinder members. It is then considered advantageous that the element is reciprocated at least once per filling event in the perpendicular axis direction over such a stroke that each orifice in the element passes underneath one of the mobile grinder members such that any clogging of orifices in the element is dealt with by cutting and/or dislodging mass particles that caused the clogging. Such a reciprocating motion can be performed e.g. when the actual motion between an opened and closed position of the element is effected in a different direction, e.g. at right angles to the perpendicular axis direction, e.g. with slotted orifices aligned in rows in perpendicular direction and with the spacing between the rows serving as the actual closing portion of the element when positioned over the outlet orifices.

In an embodiment each rotary grinder member is mounted on a rotary shaft that extends at right angles to the grinding face. This allows for a simple and reliable structure.

In an embodiment thereof the shaft protrudes from the chamber of the mass feed member.

It is preferred for the protruding shaft end to be connected to the grinder drive, so that the drive is outside the chamber which allows for a simple construction and ease of maintenance.

In an advantageous embodiment each mobile grinder member comprises at least one blade forming an edge that cooperates with the grinding face, e.g. the blade having a main surface that is angled to the grinding face so as to not impair the flow of mass towards the mouth body.

In a practical embodiment the orificed mouth body comprises a plastic orificed body part that forms an outlet face of the mouth body that is adjacent the path of the mould member, e.g. having a curved outlet face corresponding to the curvature of a mobile mould member embodied as a drum. The plastic embodiment allows for ease of manufacture and avoids undue wear of the mobile mould member.

In an embodiment each mobile grinder member has an associated independently controllable grinder drive allowing to independently operate each mobile grinder member. This e.g. allows for independent timing of the operation of the mobile grinder members and/or for independent speed control of the mobile grinder members, etc. This may e.g. be of use when filling events of mould cavities passing the mouth at different perpendicular axis positions are not taking place at the same time, e.g. with mould cavities arranged in staggered patterns on the mould drum.

In an embodiment the mass feed member is provided with multiple orificed grinder bodies at distinct perpendicular axis positions when seen perpendicular to the path of the mould member, said positions each corresponding to the perpendicular axis position of an array of mould cavities of the mould member, preferably the grinder bodies being exchangeable mounted and/or positionable at different positions in the perpendicular axis direction relative to the mass feed member.

In an embodiment the grinder body is provided with multiple groups of orifices, each group having orifice inlets arranged within a region of the grinding face along which a mobile grinder member passes, e.g. a rotary grinder member, with one region being spaced from an adjacent region, and wherein the grinder body is integrated with the orificed mouth body, and wherein—at the outlet face of the mouth body—the orifices having orifice outlets that are evenly distributed in said perpendicular axis direction.

In a practical embodiment the grinding face is a planar face. However the grinding face may also have a relief and/or curvature. For example the grinding face may be curved in one dimension, e.g. along a longitudinal axis thereof, for example said axis being parallel to the rotation axis of a moulding drum forming the mould member of the installation. In an embodiment the curvature of the grinding face, in a direction transverse to its longitudinal extent, has as its centre the rotation axis of the moulding drum. This latter arrangement may, in a suitable embodiment of the orifices, allow for uniformity of the length of the orifices or bores between the grinding face and the outlet face, which may enhance uniformity of flow of mass into the mould cavity.

The first aspect of the invention also relates to a method for moulding of three dimensional products from a mass of pumpable foodstuff material, for example from ground meat, wherein use is made of an installation as described herein. In an embodiment the installation is embodied and operated such that the start of the filling event and thus of the first flow of mass into the mould cavity takes place only after a timed delay relative to the initial moment of communication between the outlet orifices and the mould cavity.

According to a second aspect thereof, the present invention achieves one or more of the above aims by providing a method for moulding of three dimensional products from a mass of pumpable foodstuff material, for example from ground meat, wherein use is made of an installation comprising:
  a pump having at least one pump chamber, an inlet, and an outlet for the foodstuff mass,
  a pump drive,
  a moulding device comprising:
  a frame,
  a mould member having multiple mould cavities, each having a filling opening for the introduction of foodstuff mass into the mould cavity, wherein the mould member is movably supported by the frame,
  a mould member drive for moving the mould member along a path, said path including a fill position of a mould cavity where mass is filled into a mould cavity and a product release position of a mould cavity where a moulded product is released from the mould cavity,
  a mass feed member, preferably supported by the frame, said mass feed member having a chamber with an inlet for the foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into a mould cavity of the mould member in a corresponding mould cavity filling event that is defined by the moment of first flow of foodstuff mass into the mould cavity and the moment wherein the mould cavity has been fully filled and flow of foodstuff mass therein is terminated,
wherein the mould member drive is operated so as to move the mould member along said path, wherein the pump is operated so as to feed foodstuff mass to the mass feed member and establish a foodstuff mass pressure in the chamber of said mass feed member,
wherein the mass feed member is provided with at least one grinder device adapted to subject the foodstuff mass to a grinding action,
wherein said grinder device comprises:

an orificed grinder body having multiple orifices between a grinding face of the grinder body and an opposed face of the grinder body, a grinder member arranged adjacent the grinding face of the grinder body, a grinder drive adapted to cause relative grinding motion between the grinder body and the grinder member, a grinder device controller adapted to control operation of the grinder drive of the grinder device, wherein the mass feed member comprises an orificed mouth body having multiple outlet orifices forming the mouth so that mass flows into a mould cavity via multiple outlet orifices, wherein said movement of the mould member along said path causes the mould cavity to overlap with said mouth such that a variable effective outflow area of the mouth is afforded by said overlap along which effective outflow area said mass can flow into the mould cavity, wherein the installation is embodied and operated such that the start of the filling event and thus of the first flow of mass into the mould cavity takes place only after a timed delay relative to the initial moment of communication between the outlet orifices and the mould cavity.

The second aspect of the present invention envisages that the combination of a an orificed mouth body, a grinder device action, and a delayed start of the filling event, which aspects are in an embodiment completely linked to one another, allows to avoid or at least reduce the problem of undesirable changes to the shape of the formed product during further treatment, e.g. cooking or frying. The filling event only starts at a moment that the flow into the mould cavity occupies a significant part of the filling opening of the mould cavity, which filling is then effected by passing the mass through multiple outlet orifices, wherein the grinding action assures the proper flow through said outlet orifices.

In an embodiment the grinder device controller causes intermittent operation of the grinder device that is synchronized with the movement of the mould member and/or the opening of a valve when present, such that the foodstuff mass is subjected to the grinding process during the filling event as the grinder drive drives the mobile grinder member at a grinding speed during the filling event and such that in an intermediate period between successive filling events the grinder device is halted or operated at a slower speed relative to the grinding speed, preferably halted. This embodiment assures or enhances that by halting or slowing down the grinder in the intermediate period, (which may be very short as drum moulding devices are already operated so as to have successive starts of filling events at an interval of e.g. 0.25 seconds), the foodstuff mass is not "overworked" by the grinder device during the intermediate period. This approach also avoids or at least reduces any problems with the generation of heat as is may result from operation of the grinder, which heat may unduly affect the foodstuff mass.

In an embodiment the grinder device controller is configured, e.g. programmed, to start the grinding process by bringing the mobile grinder member to said grinding speed after the effective cross-sectional outflow area has reached a predetermined value or after a valve, when present, has been opened. In this manner the mobile grinder member only starts the actual grinding action once there is flow into the mould cavity. So the grinder is not started as soon as there is a first communication between orifices of the grinder body and the mould cavity, and not even prior to that. The grinder action is thus delayed, so that grinding is done whilst there is flow of mass through the orifices of the grinder, thereby avoiding or reducing overworking of the foodstuff mass.

The outlet orifices in the orificed mouth body are advantageously dimensioned and oriented so as to obtain a desired inflow of mass into the mould cavity. For example some of the outlet orifices may have an inclination so that the mass enters into the mould cavity at an oblique angle, e.g. some outlet orifices having a component that is directed counter to the mould member motion and/or some orifices may have an inclination directed along the mould member motion. Some outlet orifices may be directed at right angles to the path of the mould member motion. Some outlet orifices may be directed to emit mass towards a circumferential wall portion of the mould cavity, whereas other outlet orifices are directed to emit mass towards a centrally located bottom wall portion of the mould cavity.

The skilled person may also vary the cross-section and cross-sectional shape of the outlet orifices, e.g. with smaller orifices that provide the mass to form an outer region of the product (e.g. a circumferential region of a meat patty) and with larger orifices that provide mass to form an inner region of the product. Also the cross-section and orientation may vary over the length of an outlet orifice, e.g. with sections that are angled with respect to one another.

In an embodiment the orificed mouth body is integrated with the orificed grinder body, so that the mass is ground as it passes into the orifices in the grinder body and then continues through the integrated orificed mouth body, e.g. the grinder body being made of metal and the mouth body being made of plastic.

In an embodiment the composition of the foodstuff mass that is pumped by the pump into the mass feed member chamber is such in relation to the orifices in the orificed grinder body that the foodstuff mass in said composition is unable to pass through the orifices in the orificed grinder body under influence of the foodstuff mass pressure in the chamber of the mass feed member. Herein it is envisaged that the grinding process effected by the grinder device causes a change in said foodstuff mass composition so that the foodstuff mass passes through the orifices in the orificed grinder body, whereby the start of the operation of the grinder devices triggers the first flow of mass into the mold cavity and thus the start of the filling event. As a result the grinder device provided on the mass feed member somewhat acts as a controller governing the timing of the flow of mass into the mould cavity. Benefits of timing the inflow of mass into the mould cavity have been addressed for example in WO2012/161577.

In another embodiment the composition of the foodstuff mass that is pumped by the pump into the mass feed member chamber is such in relation to the orifices in the orificed grinder body that the foodstuff mass in said composition is able to pass through the orifices in the orificed grinder body under influence of foodstuff mass pressure in the chamber of said mass feed member. It is envisaged that the operation of the pump drive is controlled so as to vary the foodstuff mass pressure in the chamber of the mass feed member between a lower pressure at which said foodstuff mass does not flow through said grinder body orifices and a raised pressure at which said foodstuff mass does flow through said grinder body orifices, whereby—possibly—the operation of the pump is employed to trigger the first flow of mass into the mould cavity and thus the start of the filling event.

In an embodiment the mass feed member is provided with a valve that is adapted to selectively open and close the outlet orifices of the mouth body. This may be done to relieve pressure on the mass that has been filled into a mould cavity. As explained with reference to the first aspect of the invention, the valve may be integrated in the mouth body. In an embodiment the valve may be incorporated in an element that also forms the orificed grinder body. The valve may—in an embodiment—also be used to trigger the first flow of mass into the mould cavity and thus the start of the filling event. Possibly the composition of the foodstuff mass that is pumped by the pump into the mass feed member chamber is such in relation to the orifices in the orificed grinder body that the foodstuff mass in said composition is able to pass through the orifices in the orificed grinder body under influence of foodstuff mass pressure in the chamber of said mass feed member.

It is noted that in embodiments the grinder action may comprise a single passage of the mobile grinder member along each of the orifices in the grinder body per filling event or just a fraction of the orifices per filling event, this limited grinder action primarily serving to avoid clogging of the orifices by cutting any mass particles that got stuck in the entry of an orifices and/or by dislodging such mass particles.

It is envisaged, in a possible embodiment of the invention, that the foodstuff mass that is supplied to the inlet of the pump is ground meat or other ground food stuff mass, e.g. other fibrous foodstuff mass, that has been subjected to a primary grinding process, e.g. in a remote meat grinder, so that the grinder device in the mass feed member subjects the meat or other foodstuff mass to a secondary grinding process.

So the method then includes the step of subjecting foodstuff mass, e.g. meat, to a primary grinding process, supplying said primary ground mass to the pump, and subjecting the meat by the grinder device in the mass feed member to a secondary grinder process. This secondary grinded mass then is filled into the mould cavity.

In some embodiment the foodstuff mass is not subjected to such a primary grinding process. For example if the product does not require such pre-treatment in view of the desired end product or the nature of the foodstuff.

Compared to the prior art approach the primary grinding can, possibly, be a coarser grinding than in the prior art, with the secondary grinding resulting in a food mass as now made in the primary grinding step. The possibility to use a primary grinder that results in a coarser mass than the eventual mass in the formed product is beneficial e.g. in view of:

less overworking of the mass, e.g. less shear load on the mass,
retention of foodstuff texture, preservation of matrixes (fat, protein),
enhanced particle definition of the end product,
reduced deposition of fatty matter in pump, etc.
reduction of pre-treatment efforts by production staff, e.g. less handling of the mass, no need for timely primary grinding.

For example—for ground beef—the orifices in the grinder device in the mass feed member have a diameter between 2 and 6 millimeters, e.g. between 2 and 4 millimeters.

In embodiments the grinder action is such that the mobile grinder member passes the majority, preferably all, of the orifices in the grinder face at least twice, e.g. at least five times, per filling event of a mould cavity.

A third aspect of the present invention relates to an installation for moulding of three dimensional products from a mass of pumpable foodstuff material, for example from ground meat, wherein the installation comprises:

a pump comprising:
a pump having at least one pump chamber, an inlet, and an outlet for the foodstuff mass,
a pump drive,
a moulding device comprising:
a frame,
a mould member having multiple mould cavities, each having a filling opening for the introduction of foodstuff mass into the mould cavity,
wherein the mould member is movably supported by the frame
a mould member drive for moving the mould member along a path, said path including a fill position for filling the mass into a mould cavity and a product release position for releasing a moulded product from the mould cavity,
wherein the mobile mould member is provided with a pattern of multiple mould cavities with cavities at distinct perpendicular axis positions when seen perpendicular to the path of the mould member,
a mass feed member, preferably supported by the frame, having a chamber with an inlet for foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into a mould cavity of the mould member in a corresponding mould cavity filling event that is defined by the moment of first flow of foodstuff mass into the mould cavity and the moment wherein the mould cavity has been fully filled and flow of foodstuff mass therein is terminated,
wherein—in use—the pump is operated so as to feed foodstuff mass to the mass feed member and establish a foodstuff mass pressure in the chamber of said mass feed member,
wherein the mass feed member is provided with multiple mobile grinder members at distinct perpendicular axis positions when seen perpendicular to the path of the mould member, said positions each corresponding to the perpendicular axis position of a cavity,
wherein each grinder device comprises:
an orificed grinder body having multiple orifices and a grinding face,
a mobile grinder member arranged adjacent the grinding face of the grinder body,
a grinder drive for moving the mobile grinder member,
wherein a grinder device controller is provided to control operation of the grinder devices.

As is apparent from the description of the prior art both in drum moulding devices and in plate member moulding devices it is well-known to have a pattern of mould cavities so that—seen perpendicular to the path of the mobile mould member—there are cavities at spaced apart locations. The third aspect of the invention places a grinder device in line with each of those locations, so as to allow for optimal use of the grinder, e.g. in view of timing of its operation as explained with respect to the second aspect of the invention.

One can also envisage that at one such "perpendicular axis location" the one or more cavities are differently shaped than at one or more other "perpendicular axis locations", which may be accompanied by a different grinding by the respective grinding device. Even with all cavities being identical one can envisaged that by different grinding, different products are obtained. For example for small size products, e.g. nuggets or smaller soup meat products, this may be of interest in that deliberately non-uniformity of products, e.g. coarser or finer grinding, can be created which may be attractive to consumers.

In an embodiment each mobile grinder member has an associated independent grinder drive allowing to independently operate each mobile grinder member.

In an embodiment the mass feed member is provided with multiple orificed grinder bodies members at distinct perpendicular axis positions when seen perpendicular to the path of the mould member, said positions each corresponding to the perpendicular axis position of a cavity, preferably the grinder bodies being exchangeable.

The invention also allows for a very practical embodiment of the one or more grinders, which is well-known for meat grinders, e.g. as in U.S. Pat. No. 3,646,979.

In an embodiment each mobile grinder member is a rotary grinder member that is rotatable about an axis, e.g. an axis substantially perpendicular to the outlet face of the grinder body. In a further embodiment the rotary grinder member has a central hub joined to a drive shaft, and one or more grinder blades extending from said hub.

In an alternative embodiment the mobile grinder member is a reciprocally movable grinder member, e.g. embodied as a reciprocable plate, wherein the grinder drive is a reciprocating drive. So in the third aspect of the invention multiple of such grinder members are provided, e.g. each reciprocal in a direction parallel to the path of motion of the mobile mould member.

In an embodiment the mouth of the chamber of the mass feed member is formed by an orificed mouth body adjoining a grinder body having a metal or ceramic orificed grinder body part that forms the grinding face of the grinder body. Herein the mouth body further comprises plastic orificed body part that adjoins the orificed grinder body part so that said orifices therein form a continuation of orifices in said orificed grinder body part, said plastic orificed body part forming the outlet face of the mouth body that faces the mobile mould member, e.g. said mobile mould member having a metal surface facing, e.g. frictionally engaging, said outlet face of the mouth body.

A fourth aspect of the invention relates to an installation for moulding of three dimensional products from a mass of pumpable foodstuff material, for example from ground meat, wherein the installation comprises:
  a pump having at least one pump chamber, an inlet, and an outlet for the foodstuff mass,
  a pump drive,
  a moulding device comprising:
  a frame,
  a mould member having multiple mould cavities, each having a filling opening for the introduction of foodstuff mass into the mould cavity,
wherein the mould member is movably supported by the frame
  a mould member drive for moving the mould member along a path, said path including a fill position for filling the mass into a mould cavity and a product release position for releasing a moulded product from the mould cavity,
wherein the mobile mould member is provided with a pattern of multiple mould cavities with cavities at distinct perpendicular axis positions when seen perpendicular to the path of the mould member
  a mass feed member, preferably supported by the frame, having a chamber with an inlet for foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into a mould cavity of the mould member in a corresponding mould cavity filling event that is defined by the moment of first flow of foodstuff mass into the mould cavity and the moment wherein the mould cavity has been fully filled and flow of foodstuff mass therein is terminated,
wherein—in use—the pump is operated so as to feed foodstuff mass to the mass feed member and establish a foodstuff mass pressure in the chamber of said mass feed member,
wherein the mass feed member comprises multiple mass feed member units, preferably releasably mounted so as to be exchangeable or at least movable in said perpendicular axis direction, each unit comprising:
  a housing having a chamber with an inlet for foodstuff mass,
  wherein the unit is provided with at least one grinder device adapted to subject the foodstuff mass to a grinding action, wherein said grinder device comprises:
    an orificed grinder body having multiple orifices between a grinding face of the grinder body and an opposed face of the grinder body,
    a mobile grinder member arranged in the chamber of the unit and adjacent the grinding face of the grinder body,
  and, preferably, the unit further comprising:
    a grinder drive adapted to move the mobile grinder member of said unit.

The fourth aspect of the invention allows for versatile and practical implementation of a grinding action in the mass feed member in situations, as is common, wherein the mobile mould member is provided with a pattern of multiple mould cavities with cavities at distinct perpendicular axis positions when seen perpendicular to the path of the mould member.

In a preferred embodiment each unit is provided with a grinder drive adapted to move the mobile grinder member of said unit, and wherein said grinder drive of a unit comprises an electrical motor, preferably mounted to said housing of the unit.

In a practical embodiment the mass feed member comprises a main carrier body provided with a mounting slot in which said multiple units are releasably secured.

In a practical embodiment the mass feed member is provided with one or more spacer members that are each mounted between adjacent units, e.g. said spacer members being located in the mounting slot.

In a practical embodiment the mass feed member comprises a main carrier member supporting said multiple units, wherein the housings of the multiple units are releasably secured to the main carrier member, so as to allow for exchange of each of said multiple units, preferably such that each unit can be independently exchanged without release of any other unit.

In a practical embodiment the mass feed member comprises a main carrier member supporting said multiple units, and wherein the housing of one or more, preferably all, of the multiple units is secured to the main carrier such as to allow for variation of the position of said one or more units in the direction of said perpendicular axis.

In a practical embodiment a foodstuff mass distributor is arranged between the outlet of the pump and the inlets of said multiple units, said distributor splitting the flow of foodstuff mass into subflows to each of said units.

In an embodiment the distributor comprises a distributor housing with a singular inlet connected or connectable to the pump and with a series of outlet openings each connected or connectable to a respective unit.

In an embodiment thereof the distributor housing forms a conical chamber between a conical outer chamber wall and a conical inner chamber wall, so as to form the singular inlet at the apex of the conical chamber, and with an annular rear wall at the outlet side of the conical chamber, wherein said series of outlet opening is formed in the annular rear wall.

In an embodiment between each outlet of the distributor and the corresponding inlet of a unit a hose is arranged.

The fourth aspect of the invention also relates to a method for moulding of three dimensional products from a mass of pumpable foodstuff material, for example from ground meat, wherein use is made of an installation as disclosed herein.

A fifth aspect of the invention relates to an installation for moulding of three dimensional products from a mass of pumpable foodstuff material, for example from ground meat, wherein the installation comprises:
  a pump having at least one pump chamber, an inlet, and an outlet for the foodstuff mass,
  a pump drive,
  a moulding device comprising:
  a frame,
  a mould member having multiple mould cavities, each having a filling opening for the introduction of foodstuff mass into the mould cavity,
wherein the mould member is movably supported by the frame
  a mould member drive for moving the mould member along a path, said path including a fill position for filling the mass into a mould cavity and a product release position for releasing a moulded product from the mould cavity,
  a mass feed member, preferably supported by the frame, having a chamber with an inlet for foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into a mould cavity of the mould member in a corresponding mould cavity filling event that is defined by the moment of first flow of foodstuff mass into the mould cavity and the moment wherein the mould cavity has been fully filled and flow of foodstuff mass therein is terminated,
wherein—in use—the pump is operated so as to feed foodstuff mass to the mass feed member and establish a foodstuff mass pressure in the chamber of said mass feed member,
wherein the mass feed member is provided with at least one grinder device adapted to subject the foodstuff mass to a grinding action,
wherein said grinder device comprises:
  an orificed grinder body having multiple orifices and a grinding face,
  a mobile grinder member arranged adjacent the grinding face of the grinder body,
  a grinder drive for moving the mobile grinder member,
wherein a grinder device controller is provided to control operation of the grinder device, wherein the orificed grinder body comprises a metal or ceramic orificed grinder body part that forms the grinding face of the grinder body, which grinder body part adjoins a plastic orificed mouth body so that said orifices therein form a continuation of orifices in said metal or ceramic orificed grinder body part, said plastic orificed mouth body forming an outlet face that faces the mobile mould member, e.g. said mobile mould member having a metal surface facing, e.g. frictionally engaging, said outlet face.

In a practical embodiment the mouth body is stationary secured in the mass feed member, e.g. as part of a unit as explained above.

In an embodiment with the mobile mould member designed as a mould plate the mouth body is rotatably mounted, wherein a rotary drive is provided for the mouth body that is adapted to cause a rotation of the mouth body over at most 180° during a filling event, e.g. of about 90°. For example a worm gear transmission is provided between the mouth body and a rotary drive motor.

A sixth aspect of the present invention relates to an installation for moulding of three dimensional products from a mass of pumpable foodstuff material, for example from ground meat, wherein the installation comprises:
  a pump having at least one pump chamber, an inlet, and an outlet for the foodstuff mass,
  a pump drive,
  a moulding device comprising:
  a frame,
  a mould member having multiple mould cavities, each having a filling opening for the introduction of foodstuff mass into the mould cavity,
wherein the mould member is movably supported by the frame,
  a mould member drive for moving the mould member along a path, said path including a fill position of a mould cavity where mass is filled into a mould cavity and a product release position of a mould cavity where a moulded product is released from the mould cavity,
  a mass feed member, preferably supported by the frame, said mass feed member having a chamber with an inlet for the foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into a mould cavity of the mould member in a corresponding mould cavity filling event that is defined by the moment of first flow of foodstuff mass into the mould cavity and the moment wherein the mould cavity has been fully filled and flow of foodstuff mass therein is terminated,
wherein the mass feed member is provided with at least one grinder device adapted to subject the foodstuff mass to a grinding action,
wherein said grinder device comprises:
  an orificed grinder body having multiple orifices between a grinding face of the grinder body and an opposed face of the grinder body,
  a grinder member arranged adjacent the grinding face of the grinder body,
  a grinder drive adapted to cause relative grinding motion between the grinder body and the grinder member,
  a grinder device controller adapted to control operation of the grinder drive of the grinder device.

The sixth aspect of the present invention also relates to a method for moulding meat products, e.g. hamburger patties, from a pumpable ground meat mass, wherein use is made of a moulding installation according to the sixth aspect of the invention.

It will be appreciated that any detail or optional detail of the operational methods and/or installations discussed herein with respect to any other aspect of the invention can be incorporated in the sixth aspect of the invention.

It is noted that the various aspects of the invention apply to drum moulding devices, but also to other moulding devices, e.g. plate moulding devices having a reciprocating mould plate member with one or more rows of mould cavities therein.

It is noted that the various aspects of the invention and advantageous or optional details of the aspects of the invention can be readily combined. Many of such combinations will be illustrated for example in the drawings and the description thereof, whereas others will readily follow from the description.

It is seen as advantageous that—in a drum moulding device—the drum is driven in its rotation direction in a continuous, non-interrupted manner. This is preferably at a constant rotational speed during a revolution of the drum, but one can also envisage a drum drive that causes a periodic variation of the drum rotational speed during a revolution, e.g. increasing the drum speed in an approach period when a cavity to be filled nears the mouth or is already in first communication therewith and slowing down the drum speed when the major portion of the filling event takes place, e.g. when the effective filling opening formed by the overlap of the mouth and the filling opening of the mould cavity is the greatest.

The pump is operated so as to feed foodstuff mass to the mass feed member and establish a foodstuff mass pressure in the chamber of said mass feed member. The pump preferably is a positive displacement pump, e.g. a rotor pump having a rotor with vanes that revolves in a pump chamber having an inlet and an outlet, or a plunger pump, a screw pump, etc.

The pump may be connected at its inlet to a hopper that is adapted to receive therein a batch of pumpable foodstuff mass, e.g. ground meat. The hopper may be evacuated to reduce the inclusion of air in the mass.

The transfer of pressurized foodstuff mass via the mouth of the mass feed member into each passing mould cavity takes place in a corresponding mould cavity filling event that is defined—with regard to the duration thereof—by the moment of first flow of foodstuff mass into the individual mould cavity and the moment wherein the individual mould cavity has been fully filled and flow of foodstuff mass therein is terminated. Later, e.g. as explained above with reference to the prior art, the release of moulded products from the mould cavities is performed.

With regard to the pattern of mould cavities this invention allows for all sorts of patterns including the presently most common design of mould drums for high capacity moulding devices, which drums have a pattern of rectilinear rows of mould cavities, which rows are parallel to the drum rotation axis, in combination with a mouth of the mass feed member that is in essence parallel to the rotation axis. This design entails that in each row the multiple mould cavities come into communication with the mouth of the mass feed member at the same time and the filling events take place in parallel.

The invention may be performed with the mass feed member having a single elongated mouth formed by evenly distributed outlet orifices, said even distribution at least in the longitudinal direction of the mouth. In this embodiment, the drum may have rectilinear rows of mould cavities that are parallel to the drum rotation axis, so that multiple filling events can start and take place simultaneously or at least in overlapping manner.

Other patterns, e.g. with the mould cavities of a drum arranged in a pattern of helically extending rows, with one cavity being offset in circumferential direction with regard to the axially neighboring cavity, are also possible. It is noted that such an embodiment of the mould drum is disclosed in WO0030458 in combination with a method that envisages a continuous filling of the mould cavities of the drum, so with overlap in time between the filling events of the mould cavities.

One can also envisage other patterns of the mould cavities than said helically extending rows, e.g. with mould cavities in staggered rows, e.g. at equal axial spacing yet at differing circumferential positions. All sorts of variations of the pattern are possible.

The invention envisages that the pump can be operated at a constant output or speed. In preferred embodiments however, it is envisaged that a pump controller is provided which is adapted to allow for periodic variation of the effective pump rate, e.g. in synchronized relation with filling events of the mould member so that the mass pressure in the chamber of the mass feed member is optimized in view of the filling events.

In an embodiment the installation comprises a foodstuff mass pressure sensor that is adapted to sense the actual pressure of the foodstuff mass in the chamber of the mass feed member, preferably the sensor being arranged directly on or in the chamber. The installation comprises a pump controller that is connected to said foodstuff mass pressure sensor, preferably an electronic controller.

An embodiment comprises selecting a target pressure or target pressure range for the foodstuff mass in the chamber, e.g. based on test runs performed with such foodstuff mass on the device, or based on historical data (e.g. from the manufacturer of the device or other food product manufacturers). In this embodiment it is envisaged that the pump control unit stops or at least slows the pump when the measured foodstuff pressure exceeds the target pressure or the target pressure range and that the pump control unit activates or accelerates the pump when the measured foodstuff pressure drops below the target pressure or target pressure range.

In a preferred embodiment for ground meat the pressure of the mass supplied by the pump to the chamber of the mass feed member lies between 3 and 6 bars.

In an embodiment the invention envisages the use of an installation that is also provided with a pump timing mechanism that causes activation or acceleration of the pump during intervals that take place periodically during a revolution of the mould drum, each of said intervals being in timed relation to a corresponding filling event of a single mould cavity, an interval at least partly being in timed overlap with said single filling event, said activation or acceleration causing a temporary increase of flow of foodstuff mass to the mass feed member during said interval and said flow being relatively reduced in between successive intervals. In a preferred embodiment the timing mechanism determines the actual position of the first to be filled mould cavity relative to the mouth, e.g. by detecting the actual angular position of the drum (and thereby of the mould cavities) during operation of the device. It will be appreciated that such pump timing may be used as an alternative for the pump controlled based on actual mass pressure in the chamber, or can even be combined therewith to obtain a further enhanced control of the pump output and thereby enhanced filling of the mould cavities. With regard to the pump timing mechanism reference is made to applicants non-prepublished and co-pending patent application NL2006841 which is incorporated herein by reference, in particular with respect to the embodiments of the device and method as listed in the claims thereof.

In a practically preferred embodiment of the invention the mass feed member comprises a funnel body that delimits the single chamber for the mass in the mass feed member. The funnel body has main walls of substantially triangular shape that are connected along their sides, with a mouth side thereof formed by a wall containing the mouth and with the inlet to the chamber being arranged at an apex of said main walls that is located opposite said wall containing said mouth. Due to this funnel shape the effective cross section of the chamber increases from the inlet towards the opposite side wall containing the outflow mouth.

In an embodiment wherein the orificed mouth body is absent the mass feed member may have a single slot mouth that spans the length of the drum surface provided with mould cavities, so that all said cavities pass along said single slot.

It is envisaged that the chamber of the mass feed member is a closed chamber that allows for pressure of the mass during the method at a level or levels above atmospheric pressure, with the mouth being the only outlet for the mass from the chamber. The closed chamber also shields the mass from the atmosphere, e.g. to avoid inclusion of air into the mass, as it only has the inlet that is connected to the pump and the mouth that is directly adjacent the mobile mould member, e.g. the outer surface of the revolving drum.

In a practically embodiment, the mass feed member is provided with a straight slot that is arranged parallel to the longitudinal axis of the drum. One or more orificed mouth bodies and/or units as disclosed herein are arranged in the slot, e.g. releasably secured therein allowing for exchange.

As explained above the mould drum devices are predominantly chosen for their high capacity. This capacity can amongst others be enhanced by increasing the length of the drum so as to mould more food products with a single drum. This is seen as beneficial for large capacity food producing installations, e.g. as the moulded food products may be received on a conveyor of significant width, e.g. of 0.8 or 1.0 meter that passes into a further treatment device, e.g. into an oven or a fryer. The method according to the invention may include the step of conveying the formed products to an oven or fryer, and subjecting the products therein to an oven treatment or frying the product.

In view of increasing the length of the drum the invention, in an embodiment thereof, envisages an installation comprising not just a single mass feed member at the fill position, but with at least a first and a second mass feed members that are arranged at the fill position in side by side arrangement. Herein each mass feed member has a chamber therein for the mass that is separated from the chamber of the other mass feed member, possibly with a first and a second pump respectively connected to the first and second mass feed member, or, with multiple mass feed members connected to the same pump.

The installation may have a single mould drum with a first section of the drum surface passing along the first mass feed member and a second section passing along the second mass feed member during revolution of the drum. The mould cavities of said single drum are filled by said first and second mass feed members, wherein each of the first section and the second section of the drum surface have multiple mould cavities that are arranged in a mould cavities pattern for each drum surface section with cavities at multiple (at least two, e.g. four or more) longitudinal positions when seen in longitudinal direction of the drum and at multiple circumferential position when seen in circumferential position of the drum.

In a practical embodiment the mould cavity pattern is composed of mould cavities of identical dimensions, e.g. to mould meat patties with circular contour.

As described herein the installation may comprise as mobile grinder member a rotary grinder member, but the provision of a reciprocal grinder member, e.g. instead of a rotary grinder member as explained herein, is also envisaged.

The present invention also relates to a method for moulding meat products, e.g. hamburger patties, from a pumpable ground meat mass, wherein use is made of a moulding installation for moulding meat products from a pumpable ground meat mass.

The present invention also relates to an installation having a computer control for the drum rotation, operation of the pump, and grinder operation, said control e.g. being programmed to perform the inventive methods, e.g. with a memory containing predetermined routines that make the installation perform the inventive methods for selected foodstuff masses and products to be formed.

The aspects and optional details of the invention will be explained below with reference to the drawings.

BRIEF DESCRIPTION OF THE DRAWINGS

FIGS. 11b-g show in a view similar to FIG. 5 an alternative grinder unit with reciprocating mobile grinder member, FIG. 12. shows in a view similar to FIG. 4 alternative embodiment of the mass feed member.

DETAILED DESCRIPTION OF EMBODIMENTS

Figure 1:
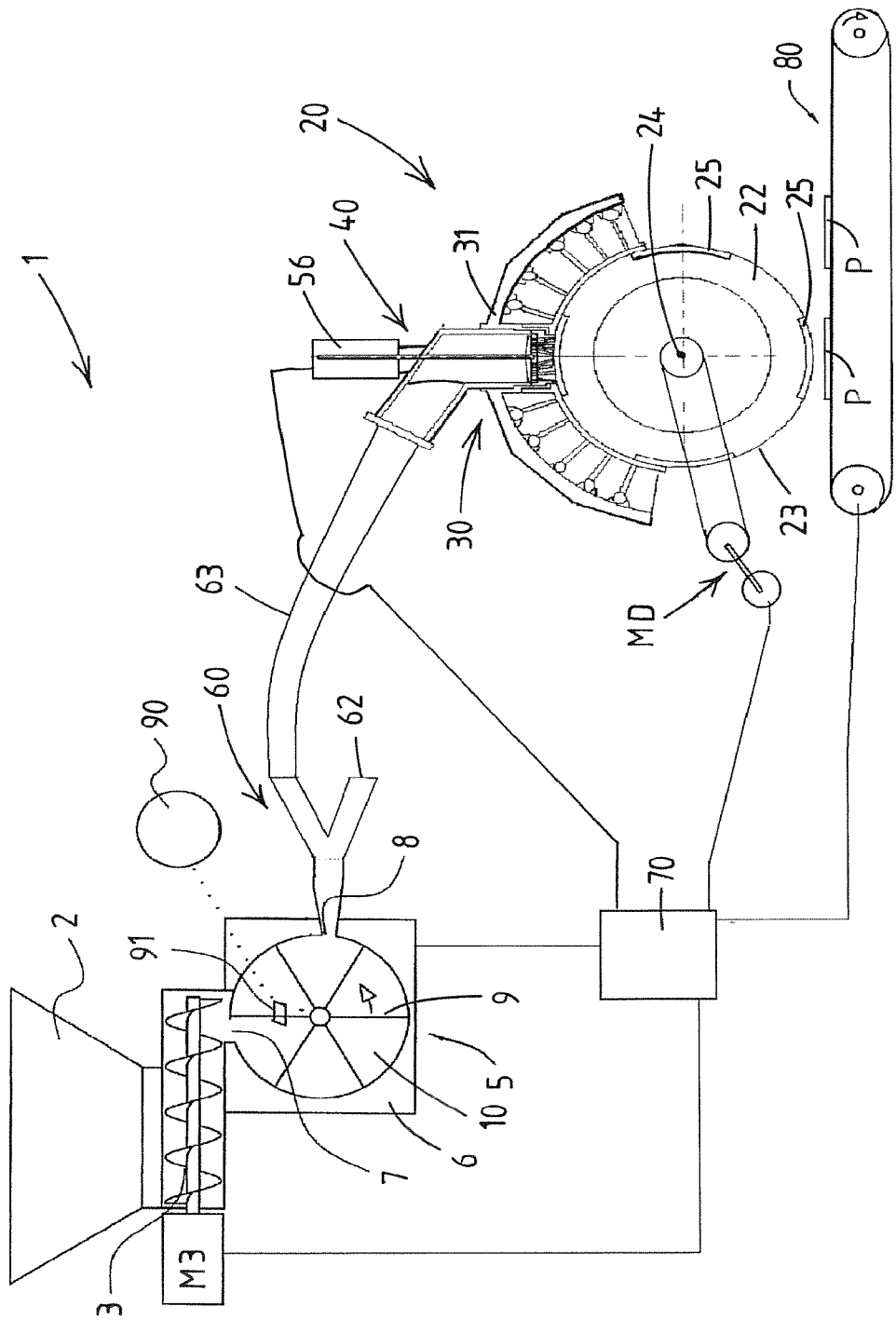
FIG. 1 shows schematically a moulding installation for moulding food products from a pumpable foodstuff mass.

FIG. 1 schematically depicts a high capacity installation for the moulding of three dimensional products from a mass of pumpable foodstuff material, for example from a ground meat mass, e.g. for the production of hamburger patties.

A batch of ground meat mass, e.g. of beef, pork, or poultry meat, is commonly prepared in a primary grinding process (not shown) with a primary meat grinding device. A batch of ground meat is then e.g. loaded into a (wheeled) bin and—possibly after some storage time in a cold storage—transported to the installation as shown in FIG. 1.

In this example it is illustrated that the installation 1 may comprise a hopper 2 that is adapted to receive one or more batches of the mass of pumpable foodstuff material, e.g. ground meat.

In this example it is illustrated that an optional feeder assembly 3 is associated with the hopper 2 to assist in discharging the mass from the hopper 2. In this example one or more motor driven augers 3 with motor M3 are mounted at the bottom of the hopper 2.

Instead of loading a hopper 2 of the installation with bin loads of foodstuff mass, the loading of the installation may be conducted via a pipe connecting to the installation, e.g. to a hopper thereof.

The installation further comprises a pump 5, e.g. a vane pump, a screw pump, a piston pump, etc. The pump 5 has a pump housing 6 with an inlet 7 receiving the mass from the hopper 2, here via the auger 3. The pump housing 6 further has an outlet 8 for outputting the mass.

The pump 5 shown is a vane pump with a rotor having multiples vanes 9 disposed in a pump cavity of a pump housing. Such rotor pumps, e.g. supplied by Risco (Italy), are known for pumping ground meat and other pumpable foodstuff masses.

A pump drive motor (e.g. electric, shown at MP in FIG. 2) is provided for driving the pump. The pump 5 forms pump chambers 10, in the figure shown between neighboring vanes 9, that each are successively in communication with the pump inlet 7 for the introduction of mass into the pump chamber and with the pump outlet 8 for the discharge of mass from the pump chamber. The effective volume of the pump chamber reduces from the position thereof at the pump inlet to the position thereof at the pump outlet, so that the mass is effectively expelled from the pump chamber when the pump is in operation. An example of such a pump is disclosed in U.S. Pat. No. 4,761,121.

The pump 5 may instead of a vane pump also be embodied as a different type of pump, e.g. as a piston pump having one or more reciprocating pistons.

The installation 1 further comprises a moulding device 20 comprising:
 a frame 21 (example depicted in FIG. 2),
 a mould member 22, here embodied as a mould drum 22,
 a mould member drive MD,
 a mass feed member 30, The drum 22 is embodied to rotate or revolve as the drum 22 is rotatably supported by the frame 21, e.g. on a cantilevered (horizontal) shaft of the frame of the device 20.

The mould drum 22 has an outer circumferential drum surface 23 and a longitudinal drum rotation axis 24. The drum 22 is rotatably supported by the frame 21 to revolve about the drum rotation axis, here—as is preferred—a horizontal axis.

The mould drum 22 has in the drum surface 23 multiple mould cavities 25, each cavity 25 having a filling opening in the plane of the surface 23 for the introduction of foodstuff mass into the mould cavity and for the later removal or release of the product from the cavity 25.

In the depicted example the cavities 25 are embodied as individual recesses in the outer surface 23 of the drum body, having a bottom opposite the filling opening of the cavity 25. Preferably the device 20 and drum 22 are designed to allow for an easy exchange of one drum for another drum having a different pattern and shape of mould cavities so as to allow the production of different food products with the installation.

The mould member drive MD is adapted to move the mould member along a path, here a circular path about the axis 24. The path includes a fill position for filling the mass into a mould cavity at mass feed member 30 that is arranged stationary at said fill position and a product release position for releasing a moulded product from the mould cavity, here at or near the lower section of the circular path. In this example the formed products P are delivered onto conveyor 80 that extends below the drum 22.

The ejection of a product from a mould cavity may be facilitated/performed by means of the cavity being bounded by porous material wall parts through which pressurized gas, e.g. air, is expelled to release the product from the cavity. The cavity could also be embodied to comprise a piston type bottom as is also known in the art.

In yet another embodiment the drum is embodied as a hollow tubular member with the cavities each being formed as an opening that extends through the wall of the tubular member. At the interior side of the tubular drum member this moulding device comprises a bottom member that is stationary mounted in the frame and opposite from the mass feed member. This bottom member forms a bottom of the cavity opposite the filling opening of the cavity. In such a design, the ejection of a formed product may e.g. be done by a mechanical knock-out member that knocks the formed product out of the cavity.

The mould member drive MD is preferably an electric drive allowing for a variable and controllable drum rotation speed. In use of the installation 1 it is envisaged that the drum 22 is driven in a continuous, non-interrupted manner, so without starting and stopping during a revolution of the drum 22 in order to achieve a high production capacity. It is preferred that the drum 22 is driven at a constant speed during normal production (e.g. with an acceleration when starting production). It may also be that the speed of the drum 22 is periodically varied during a revolution of the drum, yet preferably without stopping and starting.

In general terms the mass feed member 30 is adapted to transfer the foodstuff mass into a mould cavity of the mould member in a corresponding mould cavity filling event that is defined by the moment of first flow of foodstuff mass into the mould cavity 25 and the moment wherein the mould cavity has been fully filled and flow of foodstuff mass therein is terminated.

In the embodiment depicted in FIGS. 1-6 the mass feed member 30 comprises:
- a main carrier body 31 provided with an elongated mounting slot 32, here parallel to the axis 24,
- multiple units 40 which are each releasably secured in the mounting slot 32,
- spacer members 35 which are located between adjacent unit 40, here each spacer member 35 being located in the mounting slot in which the multiple units are releasably secured, e.g. by fastening bolts (not shown).

The slot 32 has a length that corresponds substantially to the axial length of the drum 22. Each unit 40 of the mass feed member 30 comprises a housing 41 having a chamber 42 with an inlet 43 for foodstuff mass. The mass feed member, here each unit 40 thereof, also has a mouth 44 at the other end of the chamber 42, which mouth faces the mould member, here the drum 22, so that mass is transferred from the chamber 42 via said mouth 44 into a passing mould cavity 25.

A foodstuff mass distributor 60 is arranged between the outlet 8 of the pump 5 and the inlets 43 of these units 40. This distributor 60 splits the flow of foodstuff mass into subflows to each of the units. The distributor as shown has a singular inlet 61 connected or connectable to the pump 5 and a series of outlet openings 62 each connected or connectable to a respective unit 40, here via a hose 63.

Each unit 40 is provided with a grinder device that is adapted to subject the foodstuff mass to a grinding action. The grinder device comprises:
- an orificed grinder body 46a arranged in the chamber 42 and having multiple orifices 47a as well as a grinding face 48,
- an orificed mouth body 46b adjoining the body 46a so that the outlet orifices 47b therein form a continuation of the orifices 47a in the body 46a,
- a mobile grinder member 50 arranged in the chamber 42 of the unit and adjacent the grinding face 48 of the grinder body.

In the depicted embodiment the grinding face 48 is directed away from the mould drum 22 and the mouth body has an outlet face 49 that faces the mould member 22. The mass feed member 30, here each unit 40 thereof, has a grinder drive 55 that is adapted to move the mobile grinder member 50 of each of the units 40.

Figures 9A, 9B:
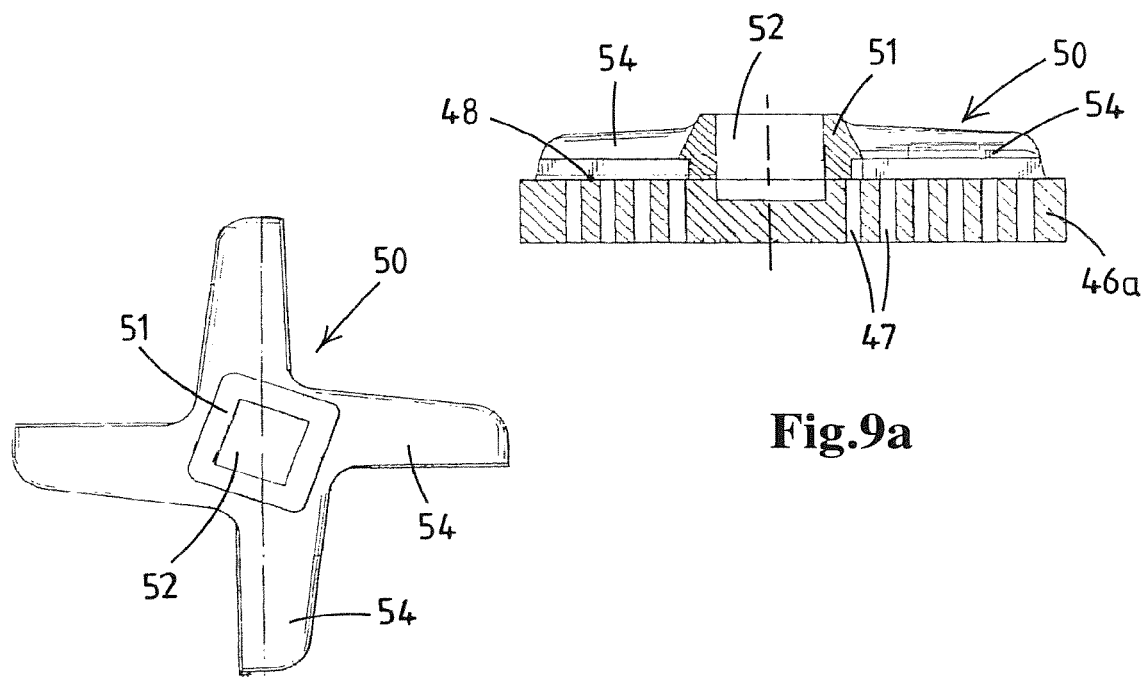
FIG. 9a shows in cross-sectional view a metal grinder body part and mobile grinder member
FIG. 9b shows in plan view the mobile grinder member of FIG. 9a, FIG. 10 shows in perspective view a mass distributor as shown in FIG. 3.

In the depicted embodiment each unit is provided with its own grinder drive comprising an electrical motor 56, here driving a rotary drive shaft 57. Preferably the motor 56 is mounted to the housing of the unit 40 so as to be exchangeable along with the unit 40. In this example, as depicted also in FIGS. 9a, 9b, it is envisaged that the mobile grinder member is a rotary cutter 50, here having a central hub 51 with an opening 52 for a drive shaft 57 and having multiple cutter blades 54. This is an embodiment that is well known in the art of meat grinding.

Figure 2:
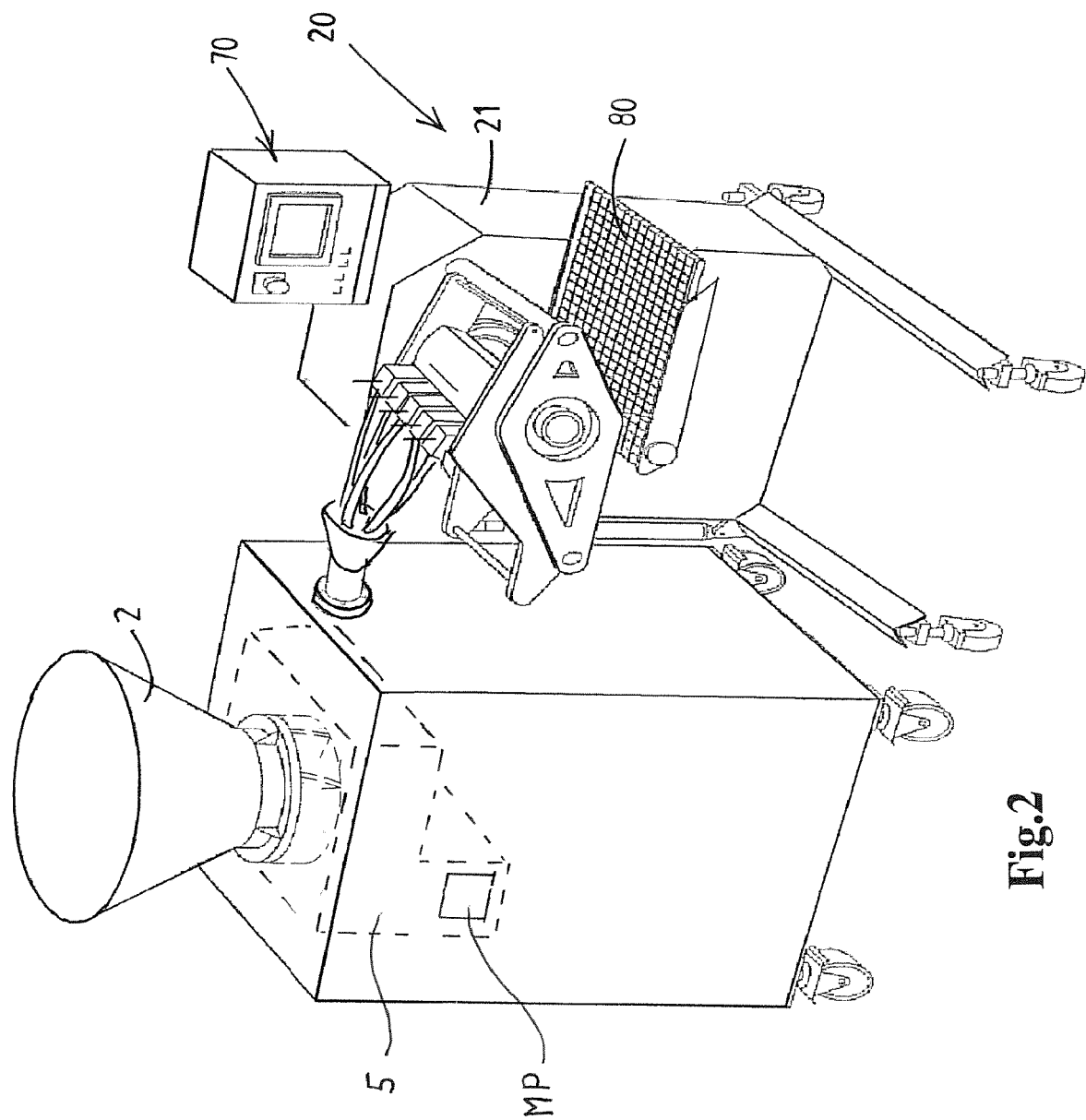
FIG. 2 shows an exemplary embodiment of the moulding installation of FIG. 1.

FIGS. 1 and 2 also illustrate the presence of a grinder device controller 70, here integrated into a computerized controller 70 of several functional components of the installation, in this example for operation of the motor M3 of the auger(s) 3, the motor MP of the pump 5, the motor MD of the drum drive, and of the product conveyor 80.

The controller 70 allows the control the operation of each grinder drive 55 of the units 40, as is preferred such that each grinder drive is independently controllable. Here each electric motor 56 is connected to the controller 70

As is illustrated in FIGS. 3, 4, 5, 6, and 9a the composite orificed body with parts 46a, 46b—as is preferred—comprises a metal or ceramic orificed grinder body part 46a that forms the grinding face 48 of the grinder body and a plastic mouth body part 46b that adjoins the orificed grinder body part 46a so that said orifices 47b therein form a continuation of orifices 47a. Effectively the plastic body part 46b forms the outlet face 49 of the grinder body that faces the mobile mould member 22. This is for example advantageous when the mould member, here drum 22, has a metal surface or metal surface parts engaging the outlet face 49 of the body.

The mouth of each unit 40 here is thus formed by a multitude of outlet orifices 47b so that each cavity 25 is filled via multiple outlet orifices 47b, e.g. cylindrical bores at various angles to obtain a desired inflow of the mass into a mould cavity 25. Other cross-sectional shapes of the outlet orifices 47b are also possible.

It will be appreciated that the rotation of the drum 22 causes at some point in time that the mould cavity 25 overlaps with the outlet face 49 of the grinder body and the mouth thereof such that a variable effective outflow area of the orifices 47 in the orificed grinder body is afforded by the overlap. Along this effective outflow opening the ground mass can flow into the mould cavity. At some stage of the overlap this variable effective outflow area will have a maximum, as can be determined by geometrical analysis of the mouth and the cavity.

In according with the second aspect of the invention, it is envisaged that the installation 1 is operated such that the first flow of mass into the mould cavity 25 takes place only after a timed delay relative to the initial moment of communication between the outlet orifices 47b and the mould cavity.

This delay of the start of effectively filling the mould cavity, so of the filling event, has the advantage that the filling of the mould cavity does not start at the very leading end of the mould cavity, which normally entails a rush of the mass from said one location into the rest of the mould cavity. It has been found that this prior art inflow through the cavity causes an orientation of fibrous components of the mass, which then later, e.g. after cooking or frying a ground beef meat patty, causes the shape of the product to be distorted relative to the formed shape.

By delaying the inflow, the cavity is filled not from the leading end, but more or less over its entire filling opening in one instant. This allows to avoid the undesirable orientation of fibrous components as in the prior art approach. The delay can be done is several ways as will be explained herein.

According to an embodiment of the second aspect of the invention not only the inflow of mass into the mould cavity is delayed until a favourable overlap exists, also the grinder device controller is operated to cause intermittent operation of each of the grinder devices 45. This intermittent grinder device operation is synchronized with the movement of the mould member 22, such that the foodstuff mass is subjected to the grinding process during the filling event as the grinder drive drives the mobile grinder member 50 at a grinding speed during the filling event and such that in an intermediate period between successive filling events the grinder device 45 is halted or operated at a slower speed relative to the grinding speed, preferably halted. As there is no flow of mass into a mould cavity in the intermediate period it is thus proposed to reduce or preferably cease the grinder operation in said period so as to avoid overworking of the foodstuff mass.

It is noted that in a practical embodiment of a drum moulding device the filling events taking place at one unit 40 or position of the mass feed member can succeed one another at a very high pace, e.g. each 0.5 seconds or even each 0.25 seconds a new filling event. This means in practice that the intermediate period between filling events can have a duration between, for example, 0.1 and 0.3 seconds. It is in this intermediate period that, according to the second aspect of the invention, the grinder device 45 in said unit is at a standstill or operating slowly. The actual grinding by the device 45 and then performed in periods that may e.g. last between 0.1 and 0.4 seconds.

The grinder device is preferably adapted to operate the mobile grinder per filling event such that the mobile grinder member passes over each orifice in the orificed grinder body at least twice. This will require a high operating speed, e.g. rotational speed or reciprocal frequency of the mobile grinder member. These speeds are possible with existing grinder equipment.

In an embodiment the mass feed member, e.g. each unit 40, is provided with a stator member adjacent the mobile grinder member, the stator member being designed to restrain the mass from moving along with the mobile grinder member. For example the stator member includes one or more panels with their planes in flow direction of the mass towards the mouth.

It is noted that the aspects of the invention are equally applicable to so-called plate moulding devices, wherein a mould plate with mould cavities (e.g. in one or two parallel rows) is reciprocated between a filling position at the mass feed member and a remote knock-out position. These devices commonly operate at a slower pace, e.g. with filling events every 0.6 to 4.0 seconds, than drum moulding devices.

In an embodiment the composition of the foodstuff mass that is pumped by the pump 5 into the chambers 42 of the units 40 of the mass feed member 30 is such in relation to the orifices 47*a,b* that the foodstuff mass in said through-the-pump-composition is unable to pass through the effective outflow area of the orifices 47*a,b* under influence of the foodstuff mass pressure in the chambers of these units. In a simple example one could envisage that the primary grinding of meat supplied to the hopper 2 has been done such that the meat mass is very coarse, with meat particles too big to pass through the orifices under the influence of the pressure in the chamber 42.

It is then envisaged that the grinding process effected by each of the grinder devices 45 causes a change in said foodstuff mass composition, it is ground to a finer composition, so that the foodstuff mass does pass through the effective outflow area of the orifices in the orificed grinder body. As a result the start of the operation of the grinder device 45 then triggers the first flow of mass into the mold cavity and thus the start of the filling event of a mould cavity. So the grinder device functions as a sort of controller by means of the grinder device being in operation or being halted or operated slowly.

It will be appreciated that the pressure of the mass in the chamber 42 of each unit also affects the inflow of mass into the mould cavity. This pressure can, in an embodiment of operation of the installation, be kept at a substantial constant pressure level during operation of the installation. It is however also envisaged to effect a periodically varying pump rate by suitable control of the pump in timed relation to the motion of the mould member, so that the pressure in the chamber 42 is used as a further parameter to steer the actual flow of mass into the mould cavity.

In an embodiment of operation of the installation the composition of the foodstuff mass that is pumped by the pump into the mass feed member chambers 42 is such in relation to the orifices 47*a,b* that the foodstuff mass in said composition is unable to pass through the effective outflow area of the orifices in the orificed grinder body under influence of foodstuff mass pressure in the chamber of said mass feed member. For example the orifices then form a flow resistance that is too great for the mass to overcome, e.g. with the mass being so coarse that it will only flow through the orifices if the pressure would be significantly greater. It is then possible to operate the grinder devices, changing the mass into a finer ground mass that is able to pass through the orifices and thus starting the filling event.

It can also be such that even the finer grinding does not start the filling event. Then it is envisaged that the operation of the pump drive is controlled so as to vary the foodstuff mass pressure in the chamber of the mass feed member between a lower pressure at which said foodstuff mass does not flow through said effective outflow area and a raised pressure at which said foodstuff mass does flow through said effective outflow area, so that the operation of the pump is employed to trigger the first flow of mass into the mould cavity and thus the start of the filling event.

One can also envisage an embodiment wherein a valve, e.g. a sliding plate valve, is provided in the mass feed member, e.g. a valve in each unit 40. This will allow for a method wherein the opening of the valve is employed to trigger the first flow of mass into the mould cavity and thus the start of the filling event. For example the valve is a plate lying against the orificed grinder body and having openings in the plate corresponding to the orifices in the grinder body, so that in one position the openings and orifices are aligned and thus the valve opened and in another position the openings are not aligned with the orifices, so that the valve is effectively closed.

It will be appreciated that if the mass that is supplied to the hopper 2 has been previously subjected to a primary grinding process, the grinder devices 45 may be employed to effectively subject to the mass to a secondary grinding process very shortly before the mass enters the cavity 25 and is formed into the desired shape. This approach allows the primary grinding to be relatively coarse in view of the finally desired characteristics of the formed product, with the secondary grinding resulting in the final product characteristics. For example the method may include the use of a primary grinder performing the primary grinding process, which has an orificed grinder body with a multitude of smallest primary grinding orifices therein, which smallest primary grinding orifices are of greater diameter than the smallest orifices in the grinder device at the mouth of the mass feed member subjecting the mass to the secondary grinder process, for example at least 2 times greater in diameter, preferably at least 3 times greater. It is noted that the primary grinder, as is common in the art, may have multiple grinder bodies in series, with the final grinder body having the smallest primary grinding orifices. It is noted that also the mass feed member may be equipped with one or more "dual-phase" or "multi-phase" grinder devices, so with multiple grinder bodies in series.

In an embodiment for ground beef supplied to the pump the orifices in the grinder devices 45 of the mass feed member have a diameter between 2 and 12 millimeters, e.g. between 2 and 6 millimeters, e.g. between 2 and 4 millimeters.

Figure 3:
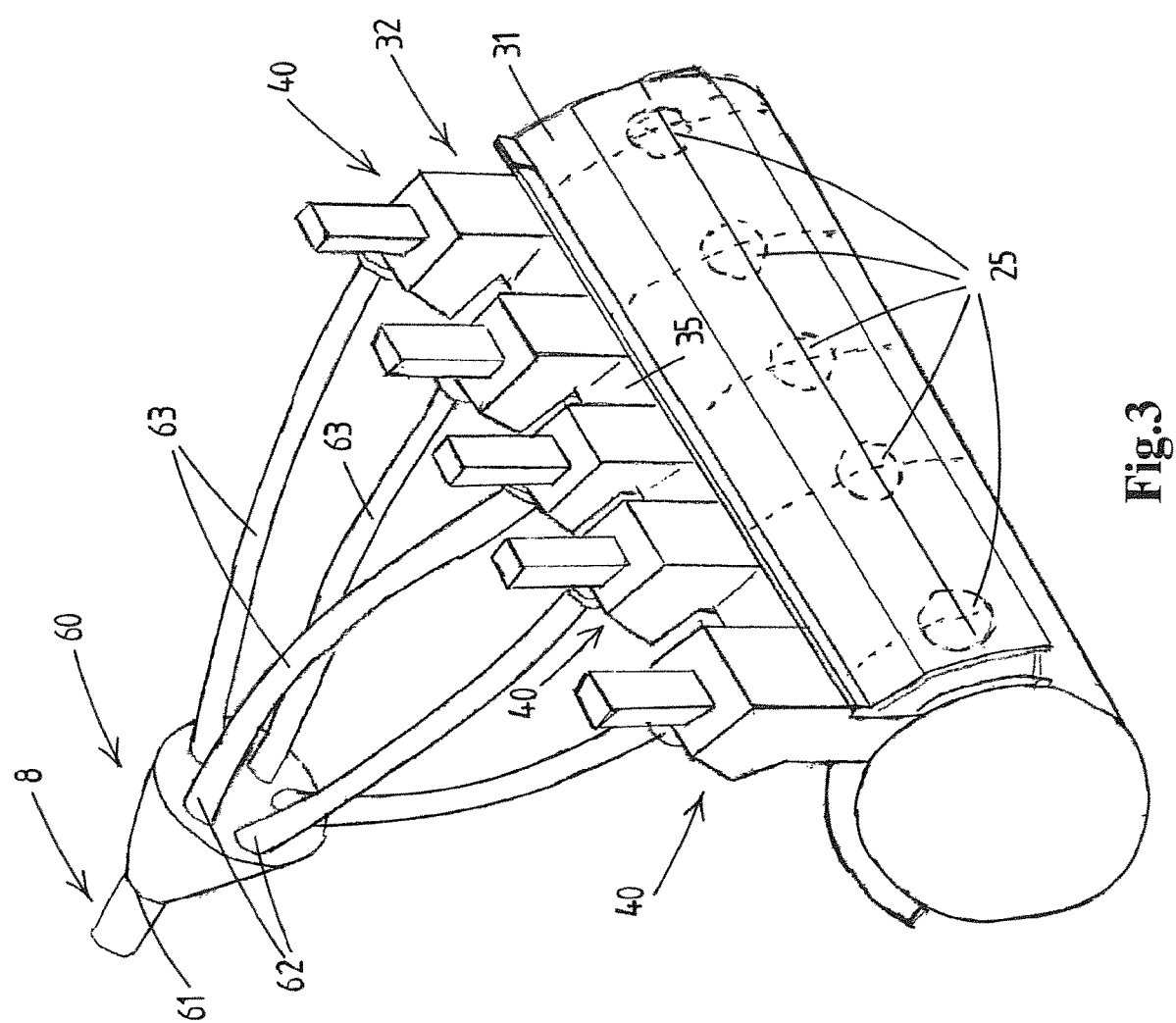
FIG. 3 shows a part of the installation of FIG. 2 illustrating the mass feed member and grinder units.
Figure 4:
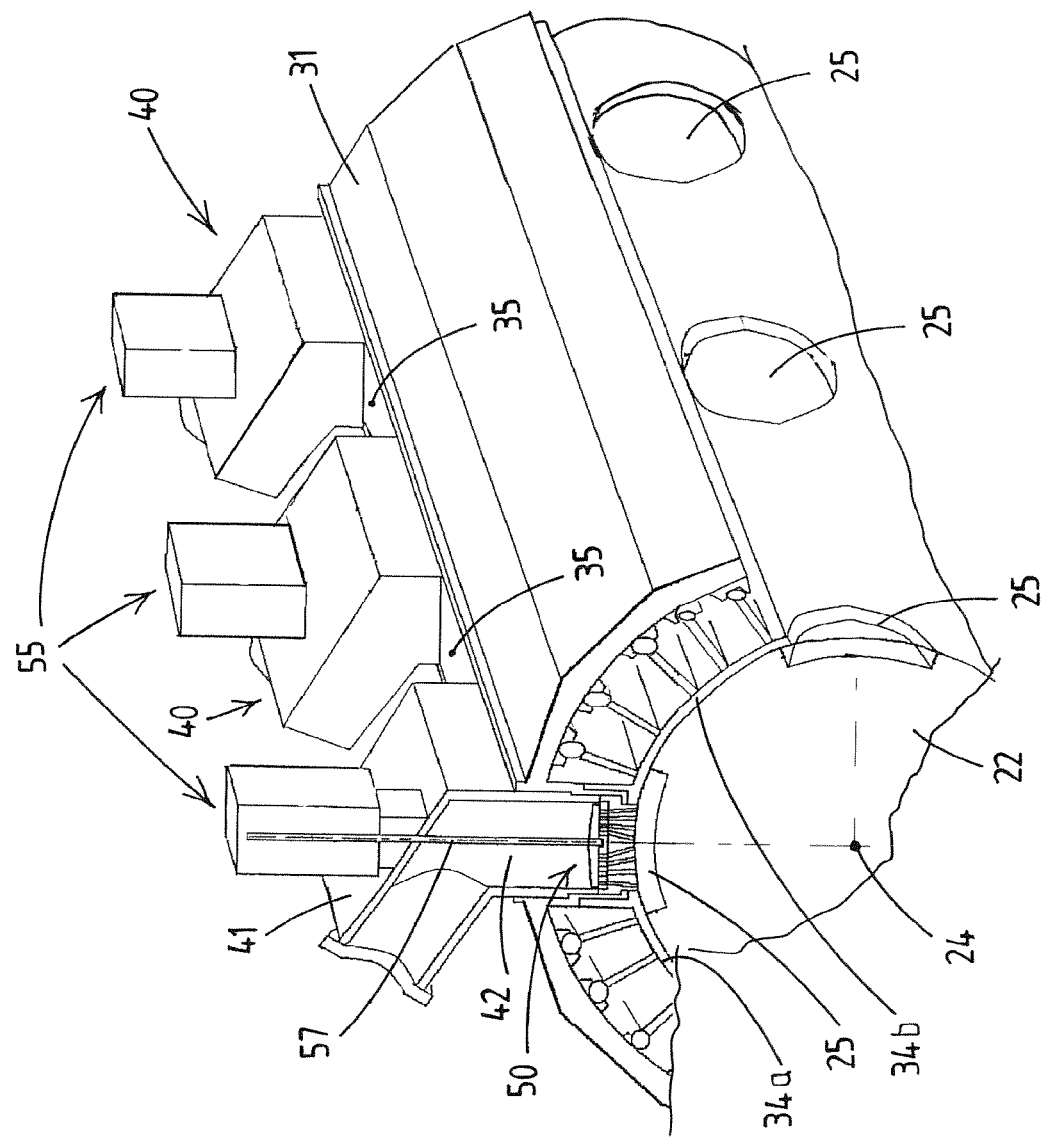
FIG. 4 shows schematically in cross-sectional view the mould drum, mass feed member, and grinder units of FIG. 3.
Figure 5:
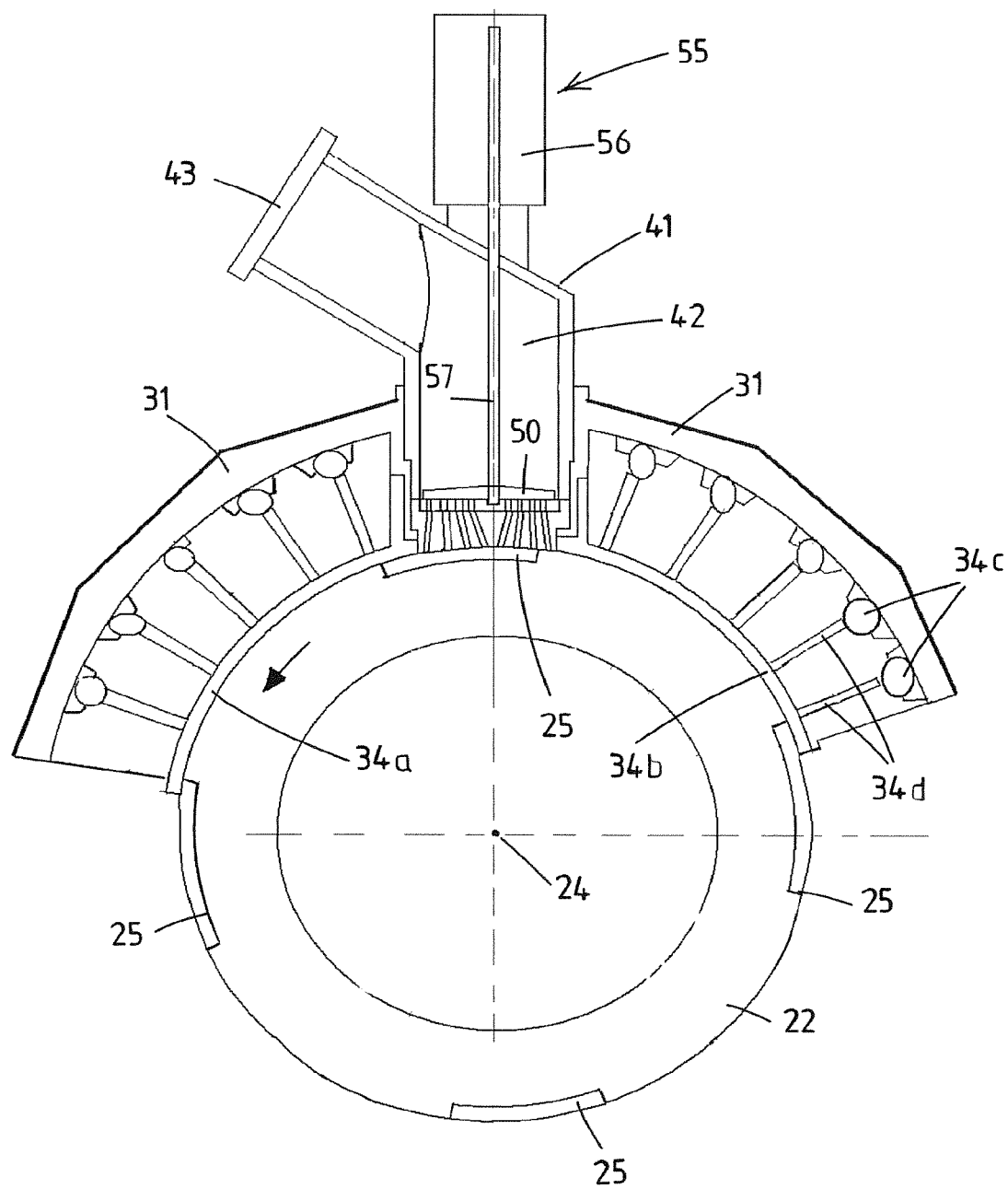
FIG. 5 shows schematically in cross-sectional view the mould drum, mass feed member, and grinder unit of FIG. 4.
Figure 6:
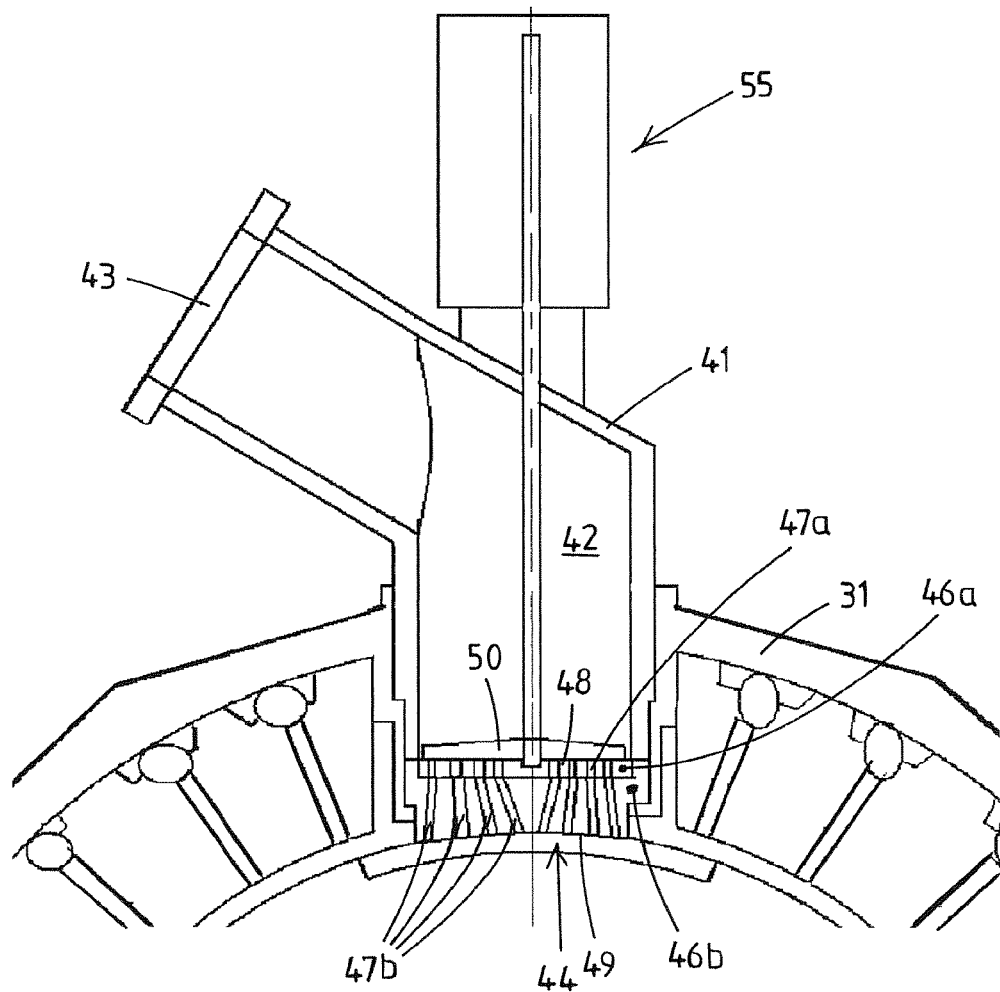
FIG. 6 shows a portion of FIG. 5 on a larger scale, FIGS. 7a, b illustrate schematically the timing of the filling event relative to the mould cavity motion in a cross-section parallel to the mould member motion, FIGS. 8a, b illustrate schematically the timing of the filling event relative to the mould cavity motion in a plan view on the mould member cavity and in a view similar to FIGS. 7a,b.
Figure 7A:
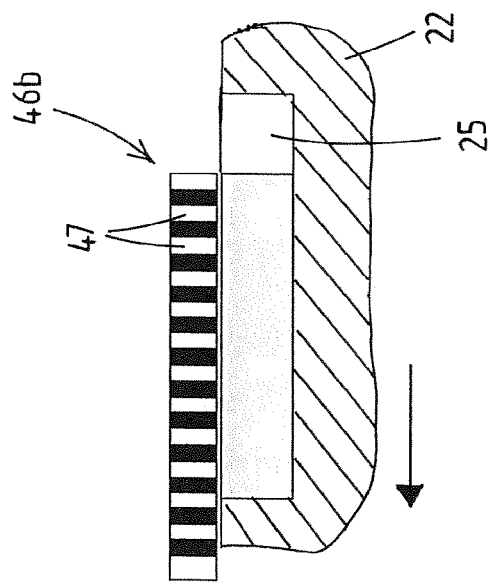
Figure 7B:
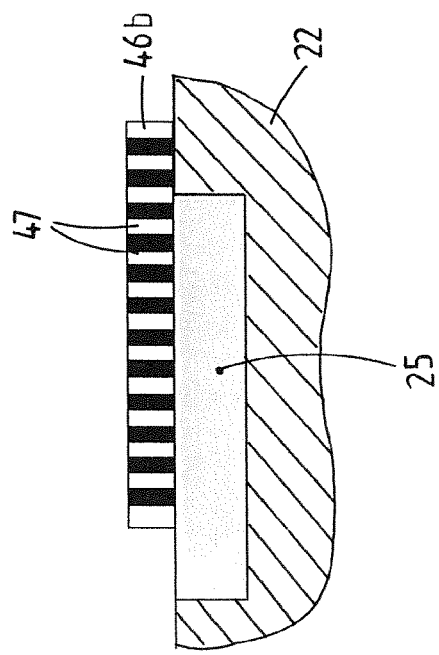
Figure 8A:
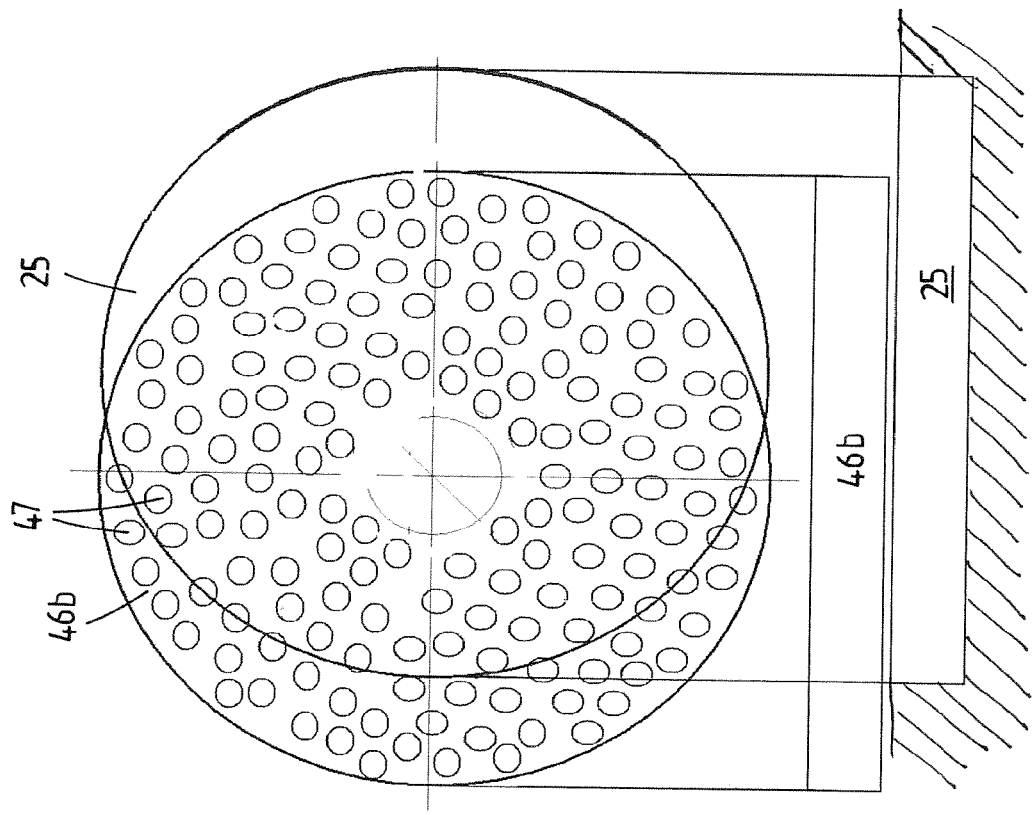
Figure 8B:
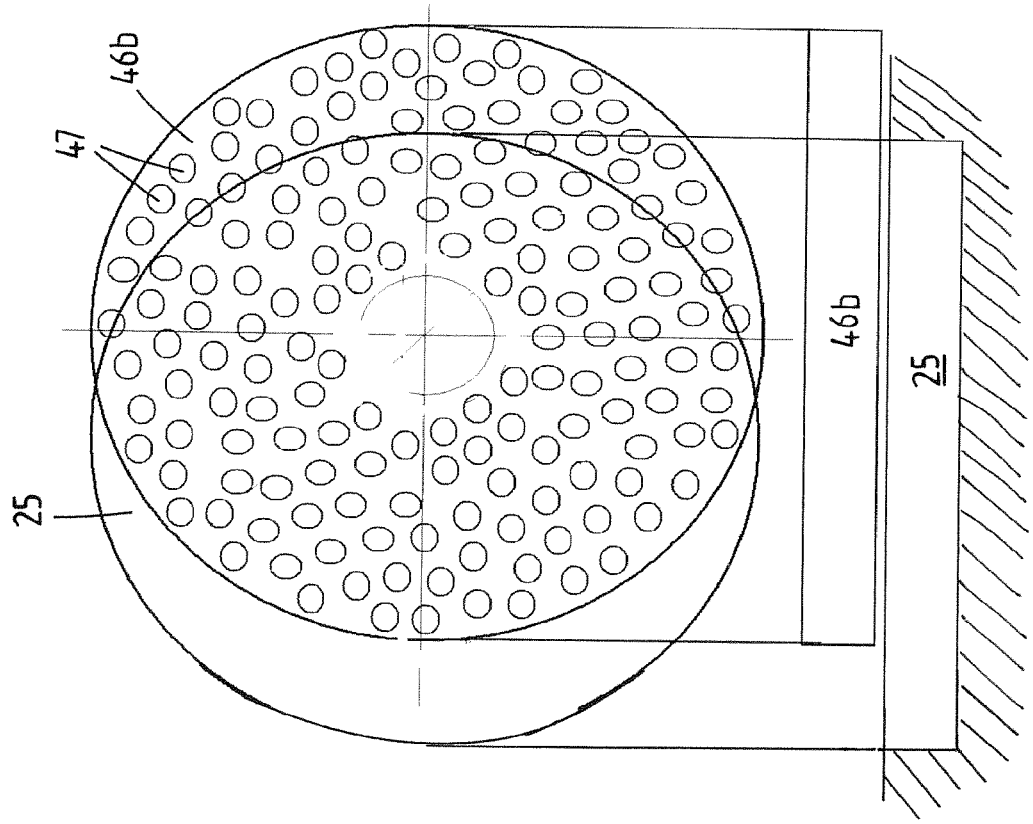

As can be seen in the example of FIGS. 2-4 the drum 22 is provided with a pattern of multiple mould cavities 25 with cavities 25 at distinct perpendicular axis positions when seen perpendicular to the path of the mould member, so here at different positions relative to the length of the drum 22. In more detail the drum 22, as is a common embodiment in the art, is provided with arrays of multiple cavities 25 when seen in circumferential direction of the drum 22, with axial spacing between adjacent arrays when seen in axial direction of the drum.

In an embodiment, cavities in adjacent arrays on the drum 22 are aligned in rows that are parallel to the axis 24. It is however preferred in view of the mass pressure in the mass feed member chambers 42 to have the cavities in nonparallel arrangement, e.g. staggered when seen in longitudinal direction on the drum or in spiraling lines. For example the mould cavities in one array are offset—in the direction of the path of movement of the mould member—relative to the mould cavities in one or more, preferably all, other arrays, so that the start of the filling events of the mould cavities of said one array is at a different moment than the start of the filling event of said one or more offset arrays of mould cavities. A nonparallel arrangement has the advantage that filling events do not take place per parallel row but are more distributed in time. This is beneficial, e.g. in view of control of mass pressure in the mass feed member chambers 42 and in view of pump operation.

Especially when the cavities on the mould member are not arranged in one row or in parallel rows it is considered advantageous if each mobile grinder member 50 has an associated independently controllable grinder drive 55 allowing to independently operate each mobile grinder member. The same is however also possible in combination with a single row or parallel row mould member, e.g. to enable a different grinding process of the foodstuff entering some mould cavities of the row compared to foodstuff mass entering some other mould cavities.

In practice the mass feed member may be provided with multiple mobile grinder members at the distinct perpendicular axis positions when seen perpendicular to the path of the mould member, these positions of the mobile grinder members each corresponding to the perpendicular axis position of a mould cavity, preferably the mobile grinder members being exchangeable, so that the flow of foodstuff mass into a mould cavity at a respective perpendicular axis position is ground by a respective mobile grinder member.

In a practical embodiment the duration of a filling event lies between 25 milliseconds and 500 milliseconds, e.g. between 50 and 200 milliseconds.

As indicated above it is envisaged, as is known in the art, that the mould member, e.g. the drum 22, is exchangeable for another mould member, having a different pattern of mould cavities. In such a situation it is advantageous if the mass feed member comprises a main carrier member supporting the units 40, wherein the housings 41 of the units 42 are releasably secured to the main carrier member, so as to allow for exchange of each of said multiple units, preferably such that each unit can be independently exchanged without release of any other unit 40. This allows to use units 40 that are tailored to the product to be made with the respective mould member.

In different mould drums 22, or in different mould plates, it is quite common for the mould cavities to be arranged at different positions when seen in a direction transverse to the direction of motion of the mould member. In order to accommodate such different mould members in a moulding device it is envisaged that in an embodiment the mass feed member comprises a main carrier member supporting said multiple units, wherein the housing of one or more, preferably all, of the multiple units is secured to the main carrier such as to allow for variation of the position of said one or more units in the direction of said perpendicular axis.

Figure 10:
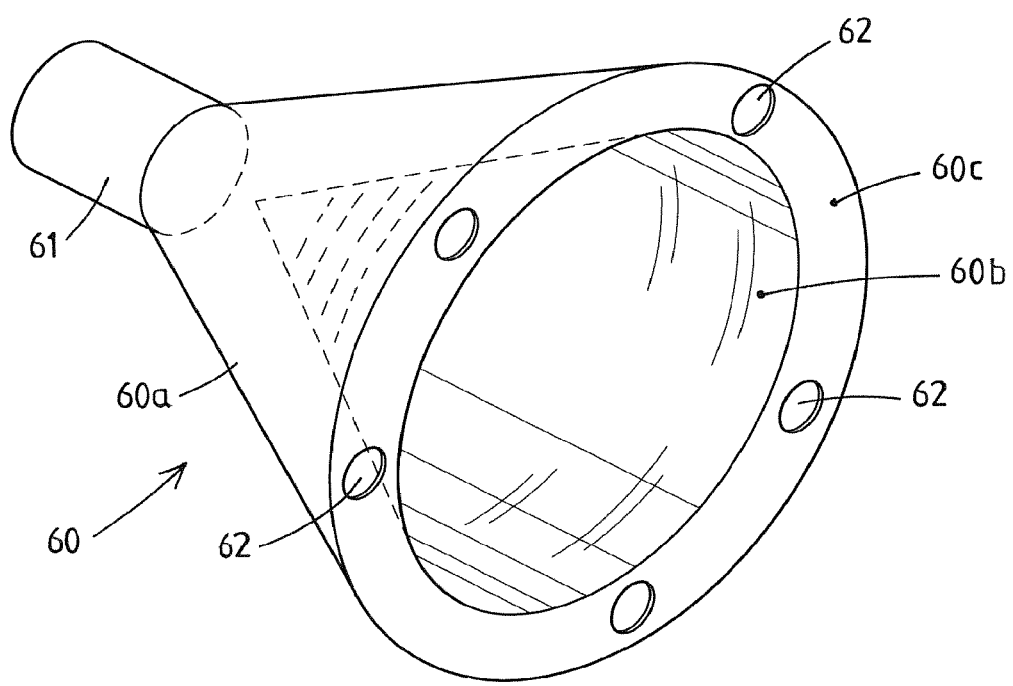

As shown in FIG. 10 the exemplary distributor 60 has a distributor housing forming a conical chamber between a conical outer chamber wall 60a and a conical inner chamber wall 60b, so as to form the singular inlet 61 at the apex of the conical chamber, and with an annular rear wall 60c at the outlet side of the conical chamber, wherein the series of outlet openings 62 is formed in the annular rear wall 60c.

In an embodiment the grinder device controller 70 is configured, e.g. programmed, to start the grinding process by bringing the mobile grinder 50 to the grinding speed after the effective cross-sectional outflow area of the orifices in the orificed grinder body afforded by overlap between said orifices and a mould cavity has reached a predetermined lower limit. As is preferred the mass feed member 30 sealingly engages the surface 23 of the drum 22 in which the cavities 25 are formed, so that substantially no mass may escape between the mass feed member and the mould drum.

As is preferred the mass feed member 30 is integrated with a closure member 34a that extends in downstream direction from the mouth 44 of the mass feed member to keep the filled cavities 25 closed for a while as the filled cavities move away from the fill position. This allows the mass to become a more coherent food product. The mass in the mould cavity forms the food product, e.g. the meat patty. As shown a closure member 34b is preferably provided to also extend from the mouth 44 in upstream direction, in order to closure the cavity as it is in communication with the mouth 44.

Optional details of a mould drum 22, mass feed member 30, and closure member 34, are e.g. disclosed in WO00/30458 and in WO2004/002229.

For example, the one or more closure members 34a, b may each comprise a semi-circular plate member, preferably of flexible design, that is urged in sealing contact with the surface 23 by one or more actuators, e.g. pneumatic actuators 34c, e.g. with transverse lamellae 34d between the plate member and the one or more actuators. This is known in the art.

The pump 5 urges the foodstuff mass through the tubes or hoses 63 towards the units 42 of the mass feed member 30. By suitable control of the pump 5, e.g. of the pump rotor speed, e.g. using a controllable electric pump drive motor MP, the output of mass by the pump and thereby the pressure of the mass in the chambers 42 can be controlled. As will be explained below in more detail this pressure control may include the sensing of the actual pressure of the mass in the chambers 42 by a pressure sensor, said signal acting as a feedback signal for a pump control unit.

At the release position that is downstream of the fill position the formed product P, here meat product P, is released from the mould cavity 25, e.g. to be transported onward on a conveyor 80, e.g. to other downstream equipment, e.g. an oven, a fryer, etc.

The installation may comprise a controllable vacuum assembly 90, e.g. integrated with the pump 5 as is known in the art. This vacuum assembly 90 is adapted to cause controlled evacuation of air from the mass at one or more locations in the trajectory of the mass from the hopper 2 to and including the pump chamber at a position where it is in communication with the pump inlet 7 of the positive displacement pump. As is preferred, this vacuum assembly comprises a vacuum pump, e.g. an electrically operated vacuum pump.

As is preferred, a vacuum port 91 is arranged in the pump 5 so as to be effective in establishing a vacuum in the pump chamber that is in communication with the inlet 7 during operation of the pump 5. This vacuum assists in the complete filling of the pump chamber with a portion of the mass.

If desired a vacuum may be created in the hopper 2 as is known in the art. A vacuum may also be created in any passage between the hopper 2 and the pump inlet 7, e.g. in a duct into which one or more augers 3 of a feed assembly extend.

A vacuum assembly 90 allows the evacuation of the foodstuff mass, e.g. the ground meat mass, so as to reduce the presence of air in the mass. This e.g. increases the uniformity of the products when it comes to the weight of mass that is effectively introduced into each of the mould cavities, among other advantages.

The drum 22 is provided with multiple mould cavities 25 which are arranged in the drum surface 23 in a mould cavities pattern with cavities at multiple (possibly two, preferably four or more) longitudinal positions when seen in longitudinal direction of the drum 22 and at multiple circumferential positions when seen in circumferential position of the drum 22. So in general terms a 2-dimensional pattern of cavities in the surface 23 of the drum 22.

In an embodiment the installation comprises a foodstuff mass pressure sensor adapted to sense pressure of the foodstuff mass in the chamber or chambers 42 of the mass feed member, and wherein the installation comprises a pump control unit 70 connected to the foodstuff mass pressure sensor.

In an embodiment a pump controller is provided that allows to select a target pressure or target pressure range for the foodstuff mass in the chamber, wherein the pump controller is configured, e.g. programmed, to stop or slow the pump when the measured foodstuff pressure exceeds said target pressure or said target pressure range and wherein the pump controller activates or accelerates the pump when the measured foodstuff pressure drops below said target pressure or target pressure range.

In an embodiment the installation is provided with a pump timing mechanism that causes activation or acceleration of the pump 5 during intervals that take place periodically, e.g. during a revolution of a mould drum 22, each of said intervals being in timed relation to a corresponding filling event of a single mould cavity, an interval at least partly being in timed overlap with said single filling event, said activation or acceleration causing a temporary increase of flow of foodstuff mass to the mass feed member 15 during said interval and said flow being relatively reduced in between successive intervals.

In an embodiment the installation comprises a position-determining device, e.g. a position sensor, for determining and/or detecting the position of a mould cavity relative to a mouth of the mass feed member during motion of the mould member, said position-determining device being linked to the grinder controller so as to provide an input signal for the operation of the grinder device or devices 45.

In an embodiment not only the mobile grinder member is mobile, e.g. rotated or reciprocated, (at high speed), but also the orificed grinder body is movably mounted, e.g. reciprocable in perpendicular axis direction.

Figure 11A:
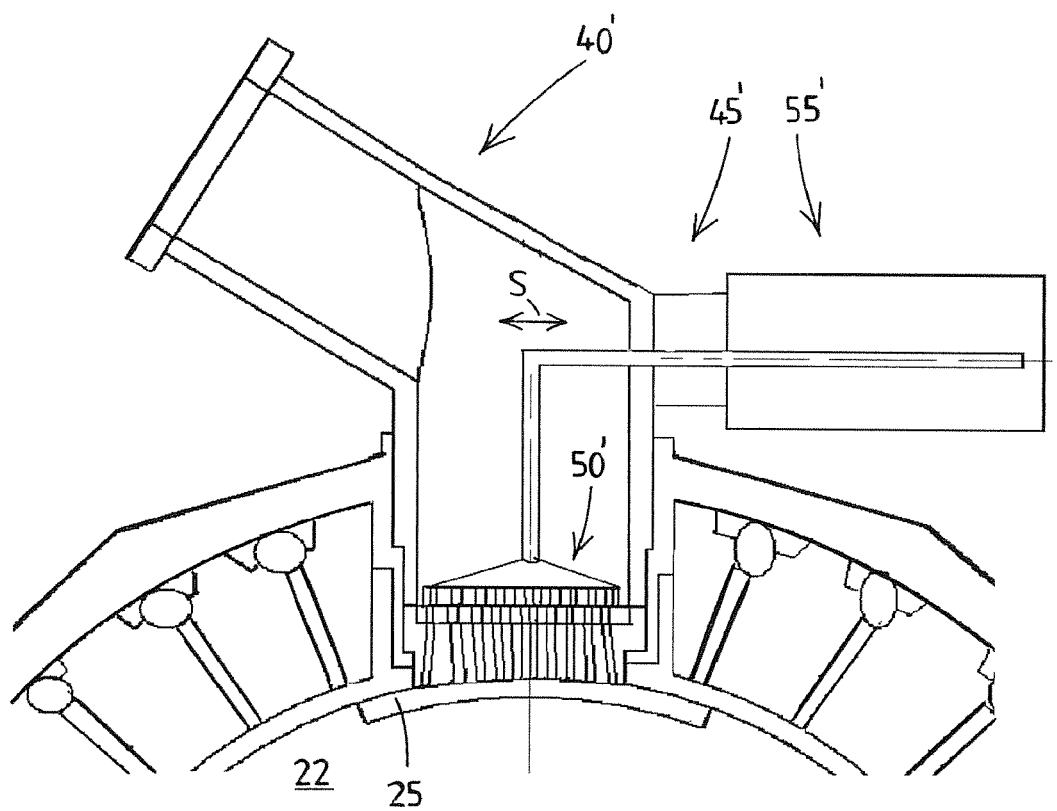
FIG. 11a depicts an alternative embodiment of a grinder device.
Figure 11F:
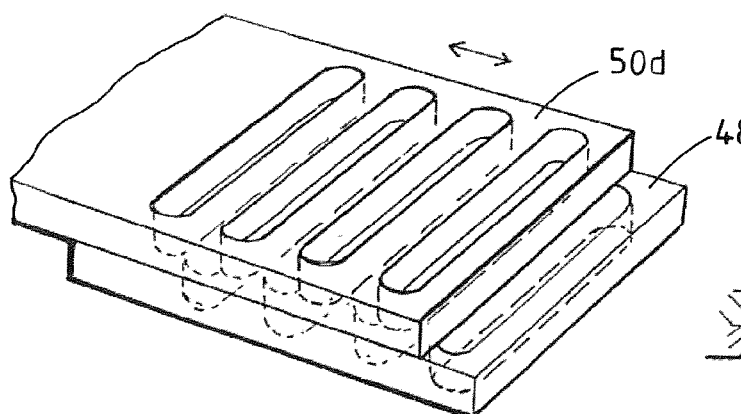

FIG. 11 depicts an alternative embodiment of a grinder device, here integrated in a unit 40'. Herein the mobile grinder member 50' is embodied as reciprocating grinder member, as indicated by arrow S in the figure. Due to its reciprocating motion by drive 55' over the grinding face 48 of the orificed grinder body the mass is effectively grinded if the device 45' is in operation. As shown it is envisaged that for each circumferential array of mould cavities 25 on the drum 22 a corresponding mobile grinder member 50' is provided, preferably driven by an associated independent drive 55', preferably in a path parallel to the path of motion of the mould member, here the drum 22. So if e.g. five arrays of mould cavities are present, the mass feed member may be provided with five independently driven mobile grinder members.

FIGS. 11*a-g* illustrate possible embodiments of the reciprocating grinder member 50'.

In FIGS. 11 *b, c* the member 50' is provided with a series of parallel grinder blades 50*b* having a sharp edge. The blades 50*b* are mounted in a frame 50*b* and extend at right angles to the grinding face 48 so as to not hinder the mass flow in an undesirable manner. As is preferred the spacing between adjacent blades 50*b* corresponds to the spacing between adjacent orifices in the grinder body so that the stroke can be small.

In FIGS. 11 *d, e* the member 50' is embodied as an orificed plate 50*c* that is reciprocated between a position wherein the orifices in the plate 50*c* align with the orifices in the grinder body below, and a non-aligned position as is shown in FIG. 11*e*.

Figure 11G:
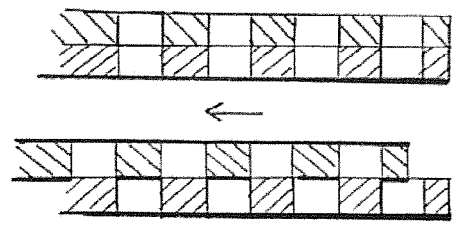

In the embodiment of FIGS. 11 *f, g* the orificed plate 50*d* is provided with slotted orifices instead of cylindrical orifices. The same slotted orifices are present in the grinder body which mates with the plate 50*d*. The operation is shown in FIG. 11*g*.

It will be appreciated that in embodiments the mouth can comprise all kinds of combinations of shapes of orifices which lead the mass into the mould cavities, e.g. slotted and cylindrical orifices combined in a group to form the outlet mouth that transfers mass into cavities in an array of the passing mobile mould member.

Figure 12:
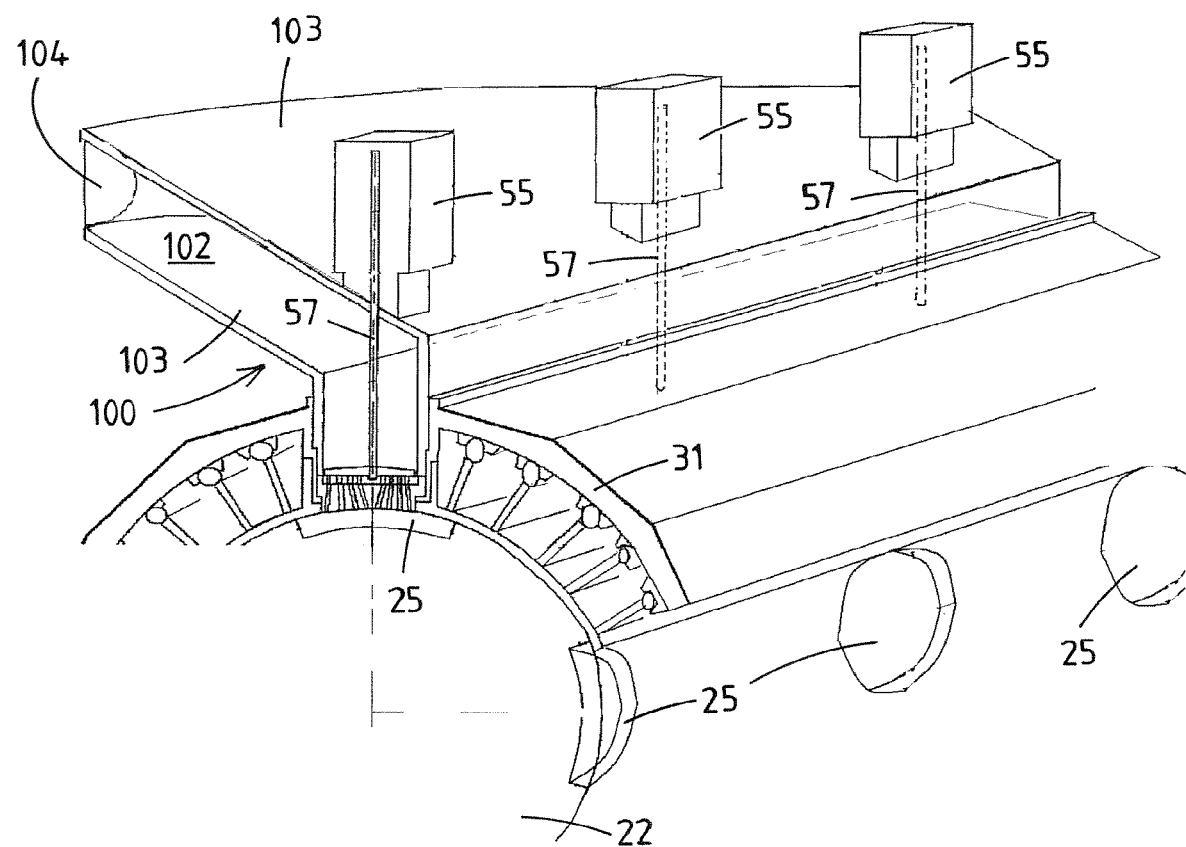

With reference to FIG. 12 an alternative embodiment of the mass feed member 30 will be discussed. Instead of having multiple units 40 each associated with a single circumferential array of mould cavities on the drum 22, the mass feed member now comprises a manifold body 100 delimiting a single elongated chamber 102 of the mass feed member, here the manifold body having a length corresponding to the length of the drum so as to transfer mass into all arrays of the drum. In an alternative embodiment two such manifold bodies are provided, each covering half the length of the drum 22 (or plate in a plate moulding device).

The manifold body 100 has main walls 103 of substantially triangular shape connected along a mouth side thereof by a wall containing the mouth, e.g. the mouth embodied with spaced apart regions of multiple orifices, each region being aligned with an associated circumferential array of mould cavities. The manifold body has an inlet 104 arranged at an apex of the main walls 103 that is located opposite said wall containing said mouth, such that the effective cross section of the chamber increases from said inlet 104 towards said wall containing the mouth.

As can be seen FIG. 12 the single body 100 is provided with multiple grinder devices along the length of the drum, here each comprising a rotary mobile cutter driven by shaft 57. Here it is shown that each shaft 57 is driven by a separate motor, but in another embodiment the shafts 57 are e.g. connected to a common drive motor, e.g. via a belt or gear transmission.

Figure 13:
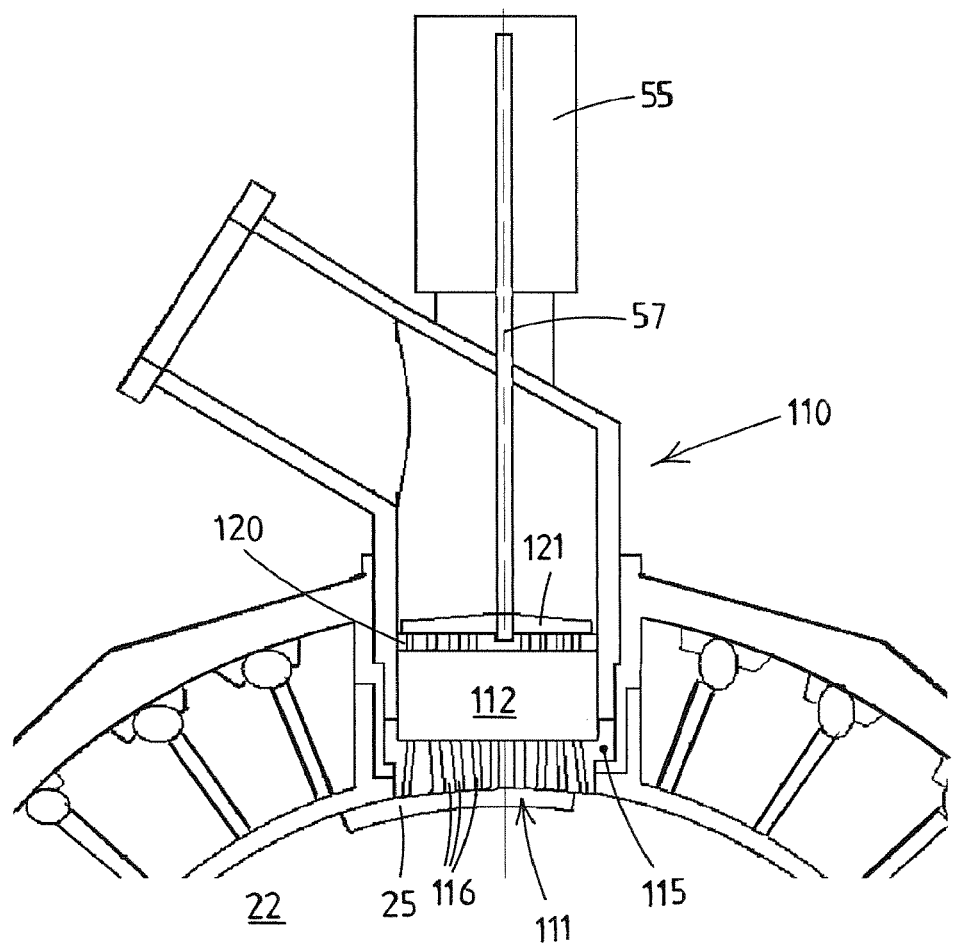
FIG. 13 shows in a view similar to FIG. 6 an alternative embodiment of the mass feed member.

FIG. 13 illustrates a mass feed member 110 wherein the mouth 111 is formed by an orificed mouth body 115 that has a multitude of orifices 116 therein through which the mass is transferred into the mould cavity 25 of the mould member 22.

The mass feed member 110 has a grinder device with an orificed grinder body 120 and a cooperating grinder member 121, preferably the grinder body being stationary mounted in the chamber of the mass feed member and the grinder member 121 being movable. As is preferred, here, the grinder member 121 is a rotary grinder member.

The grinder body and grinder member are spaced from the orificed mouth body 115, so that a buffer space 112 of the chamber is present between the actual grinder and the mouth body 115, in which buffer space mass is stored that has been ground by the grinder. This design e.g. allows for a difference between the arrangement of orifices in the grinder body on the one hand, and the orifices in the mouth body 115 on the other hand. It e.g. allows to use a single design of a grinder body in combination with a set of multiple mouth bodies that have different arrangements of the orifices therein, e.g. tailored to the products to be moulded. The method then includes the step of selecting a mouth body from said set, and mounting said selected mouth body in the mass feed member.

The buffer space 112 preferably has a rather limited volume, e.g. corresponding to between one time and five times the volume of the mould cavity 25 to be filled from the buffer space. This allows for some residence time of the ground mass, before being passed into the orifices of the mouth body. The residence time may e.g. be beneficial in view of cohesion of the foodstuff mass.

A further use of the buffer space 112 may be to accommodate therein stacked layers of foodstuff mass, wherein the layers differ with respect to the grinding of the mass. For example one can envisage that the mass fed to the mass feed member is sufficiently fine to pass through the orifices of the grinder body and the mouth (e.g. orificed mouth) under the influence of the mass pressure exerted by the pump. Then it depends on the operation of the grinder, whether or not mass passing through the grinder body is effectively ground.

For example one can envisage that during one filling event the grinder is not operated at all, so that a layer of mass is created that is not ground, whereas during the next filling event the mass is ground by operation of the grinder. This could be used to produce products that have a difference with respect to the grinding of the mass, which can e.g. be attractive when producing small meat products (e.g. for in soup) wherein the difference results in variation of mouth feel of the products.

One can also envisage that in the buffer space 112 a mixer is present, e.g. a static mixer, so that a mix of mass that is ground with mass that has not been ground by the grinder of the mass feed member is obtained.

It will also be possible to operate the installation such that during a filling event, e.g. under control of a valve member as explained below, the grinder only works during a part of the filling event time so that some of the mass that passes through the grinder body will not be ground whilst the other part will be ground. So, in this manner, more or less layers of mass are created. This can e.g. be used to produce moulded products having in each product layers of mass that differ with respect to the grinding of the mass in each layer. Instead of "not grinding vs. grinding" one could also seek to have different grinding speeds during parts of the mass flow through the grinder device, so that also layers differing with respect to their grinding are obtained.

It will be appreciated that the idea to have different grinding of layers of the mass can also be done when the grinder is integrated with the mouth, so in absence of buffer space.

Figure 14:
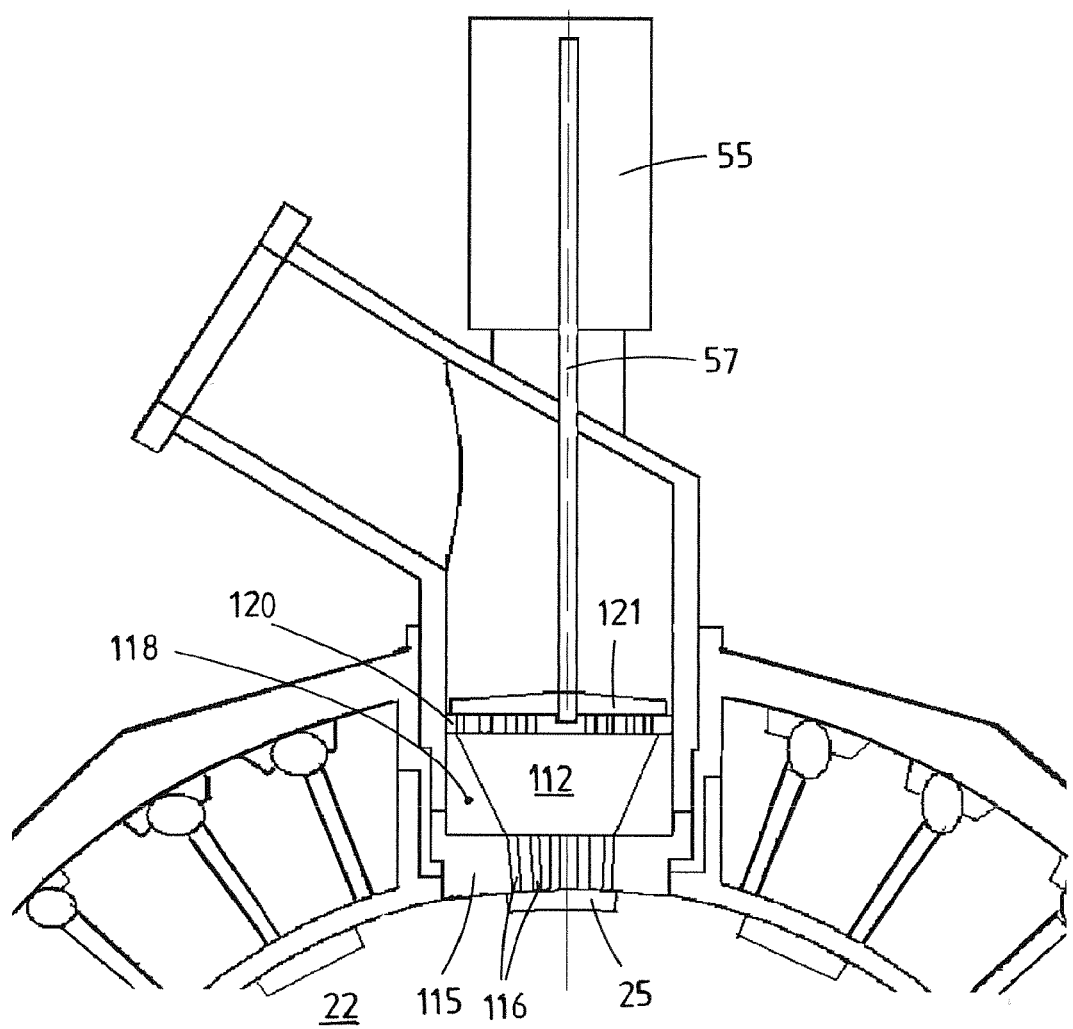
FIG. 14 shows in a view similar to FIG. 6 an alternative embodiment of the mass feed member.

When comparing FIG. 14 to FIG. 13 it is clear that it is proposed that the orificed mouth body is exchangeable for another orificed mouth body, primarily to tailor the mouth body to the mould cavities in the drum. As can be seen the drum (or other mould member) in FIG. 14 has smaller diameter mould cavities than the FIG. 13 embodiment. The group of orifices in the mouth body is altered accordingly by replacing the mouth body.

The FIG. 14 also illustrates the feature to provide a funnel member 118 between the orificed mouth body on the one hand and the spaced apart grinder body on the other hand, with the funnel member 118 having a tapering passage therein that is dimensioned at one end according to the group of orifices in the grinder body and on the opposed end to the group of orifices in the mouth body.

Figure 15:
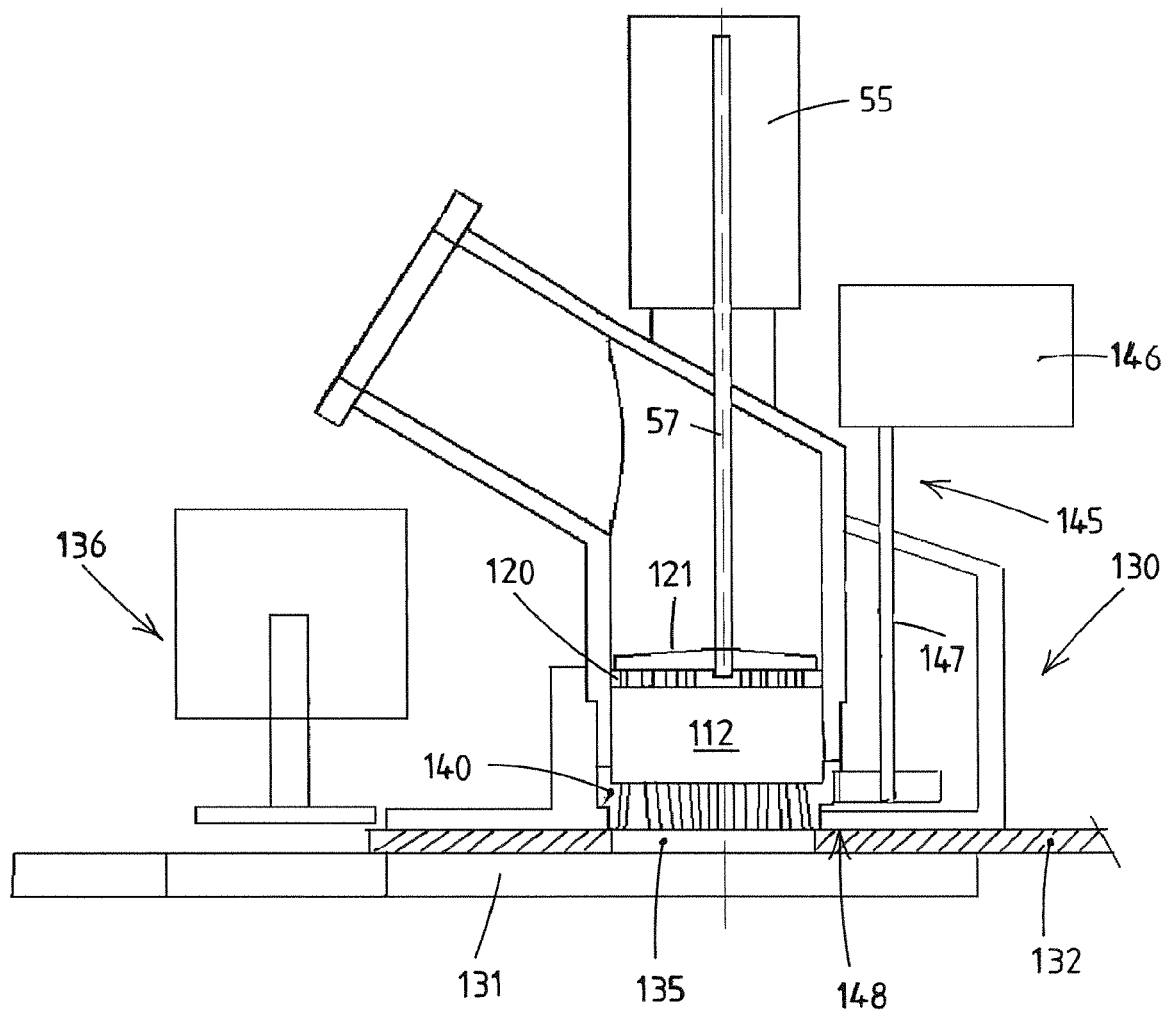
FIG. 15 shows in a view similar to FIG. 6 an alternative embodiment of a moulding device and the mass feed member, FIG. 16. shows in a view similar to FIG. 6 an alternative embodiment of the mass feed member, FIGS. 17a, b, c illustrate an alternative embodiment of the mass feed member, FIGS. 18a, b, c illustrate alternative mobile grinder members, FIGS. 19a, b, c illustrate yet another alternative embodiment of the mass feed member.

The FIG. 15 illustrates a moulding device 130 not having a mould drum but a mould plate 132 as is another well-known food product moulding device type. The moulding device has a frame 131 movably supporting a reciprocating mould plate 132 that is reciprocated in its plane by means of a drive. Many examples are known in the art. The mould plate 132 has a row of mould cavities 135 that extend through the thickness of the mould plate, so are open at opposed ends. The row of cavities 135 extends perpendicular to the direction of motion of the plate. The FIG. 15 shows the cavity at the filling position. There the mould cavity is, as is preferred for this type of device, at a standstill during a dwell time, after which the plate is moved to bring the mould cavity to a release or knock-out position underneath knock-out device 136.

FIG. 15 illustrates the possibility to arrange, preferably at each of the multiple distinct perpendicular axis positions as explained herein, an orificed mouth body 140 with a multitude of orifices therein, wherein the body 140 is mounted in the mass feed member in a rotatable manner, e.g. circular at its outer circumference and journaled in a main carrier body of the mass feed member. A mouth body rotary drive 145 is provided, here with a motor 146, drive shaft 147 and gear transmission 148 to be able to rotate the mouth body. It is envisaged that during a filling event, the mouth body is rotated over less than a full revolution, e.g. over less than half a revolution, e.g. over about a quarter revolution. This may be done to obtain a desired inflow of mass into the mould cavity. As the orificed mouth body 140 does not cooperate with a grinder member, no further grinding is effected by this limited angle rotation.

It will be appreciated that in the FIG. 15 device one can, as preferred, effect the filling event during the dwell time of the mould member at the filling position, so that the effective outflow area afforded by the overlap between the orifices in the body 140 and the mould cavity 135 has its maximum value throughout the filling.

Figure 16:
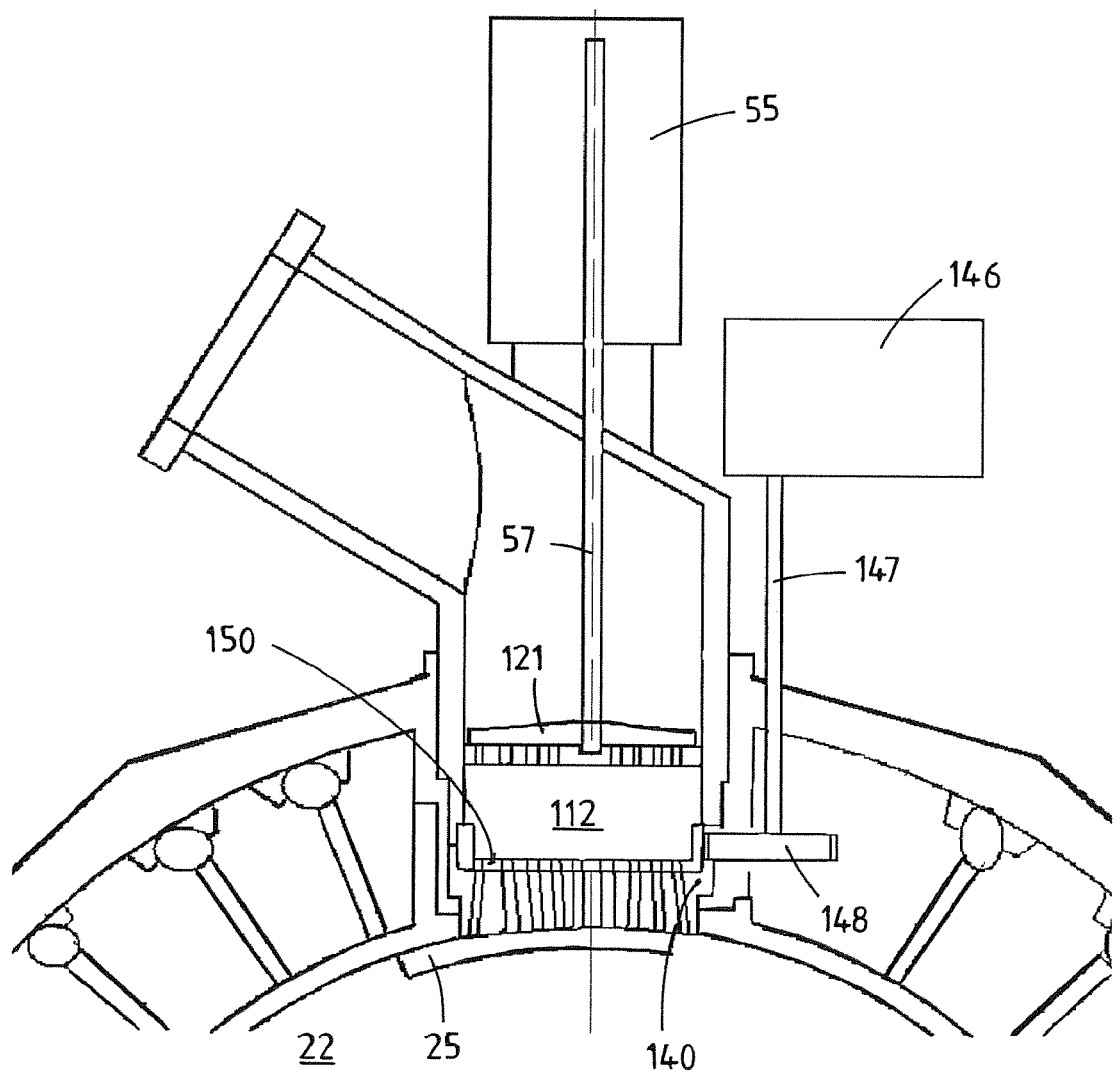

FIG. 16 illustrates the provision of a valve member 150 at the entry side of the orificed mouth body 140, here, by way of example in a mould drum device. The valve member 150 is used in this example as trigger for the start of a filling event, e.g. as the composition of the mass in combination with the mass pressure in the chamber of the mass feed member is such that the mass will flow through the orifices in the mouth body when the valve member is opened.

As can be seen, in this example, it is proposed that the valve member 150 is an orificed body as well, which is mounted rotatably, with the mouth body 140 being stationary so that in one position the orifices in the valve member 150 are aligned with the orifices in the mouth member and in another, closed, position the orifices are misaligned so that the valve is effectively closed.

It will be appreciated that in an embodiment the valve member 150 could also serve as orificed grinder body with the grinder member 121 cooperating directly with the grinding face formed by the valve member 150.

The FIGS. 17*a, b, c* illustrate an alternative embodiment of the mass feed member.

The mass feed member 160 has a manifold body 161 delimiting a single elongated chamber 162 of the mass feed member, here the manifold body having a length corresponding to the length of the drum (not shown) so as to transfer mass into all arrays of cavities of the drum.

In an alternative embodiment two such manifold bodies are provided, each covering half the length of the drum (or plate in a plate moulding device).

The manifold body 161 has an inlet 163, here located opposite the mouth of the mass feed member. At the mouth the mass feed member has an orificed grinder body comprising a metal orificed grinder body 164 that forms the grinding face and that is stacked on a plastic orificed grinder body 165 that faces drum.

As can be seen FIG. 17*a* the mass feed member 160 is provided with multiple grinder devices 170 along the length of the chamber 162, here each comprising a rotary grinder member 171 driven by shaft 172. Here it is shown that each shaft 172 extends out of the chamber 162 and that the protruding part of the shaft 172 is provided with a pinion 173 that meshes with a worm gear 174 on a rotary shaft 175 driven by motor 176. As is shown here multiple grinder devices 170 are driven by said common shaft 175 and motor 176.

As explained the grinder body 164 can be an elongated plate body having the length of the chamber 162 as shown in FIG. 17*a*, but, as is shown in FIG. 17*b*, it is also envisaged that for each rotary grinder member 171 there is a corresponding metal orificed grinder body 164*a* which is e.g. received in an apertured mounting plate with multiple apertures for such grinder bodies 164*a*.

The FIGS. 18*a* and 18*b* illustrate alternative grinder devices wherein the drive shaft 172 terminates at a distance from the orificed grinder body 164*a*, and wherein the actual grinding part of the rotary grinder member 171 is connected to the free end of the drive shaft 172 via multiple legs 171*a* of said member 171, here each from an outer end of a grinder member leg 171*a* inclined towards the central drive shaft end. This open structure of the rotary grinder member allows for a rather unhindered passage of the mass towards the orificed grinder body 164*a*.

The FIG. 18*c* illustrates various forms of the rotary grinder member 171.

Figure 19A:
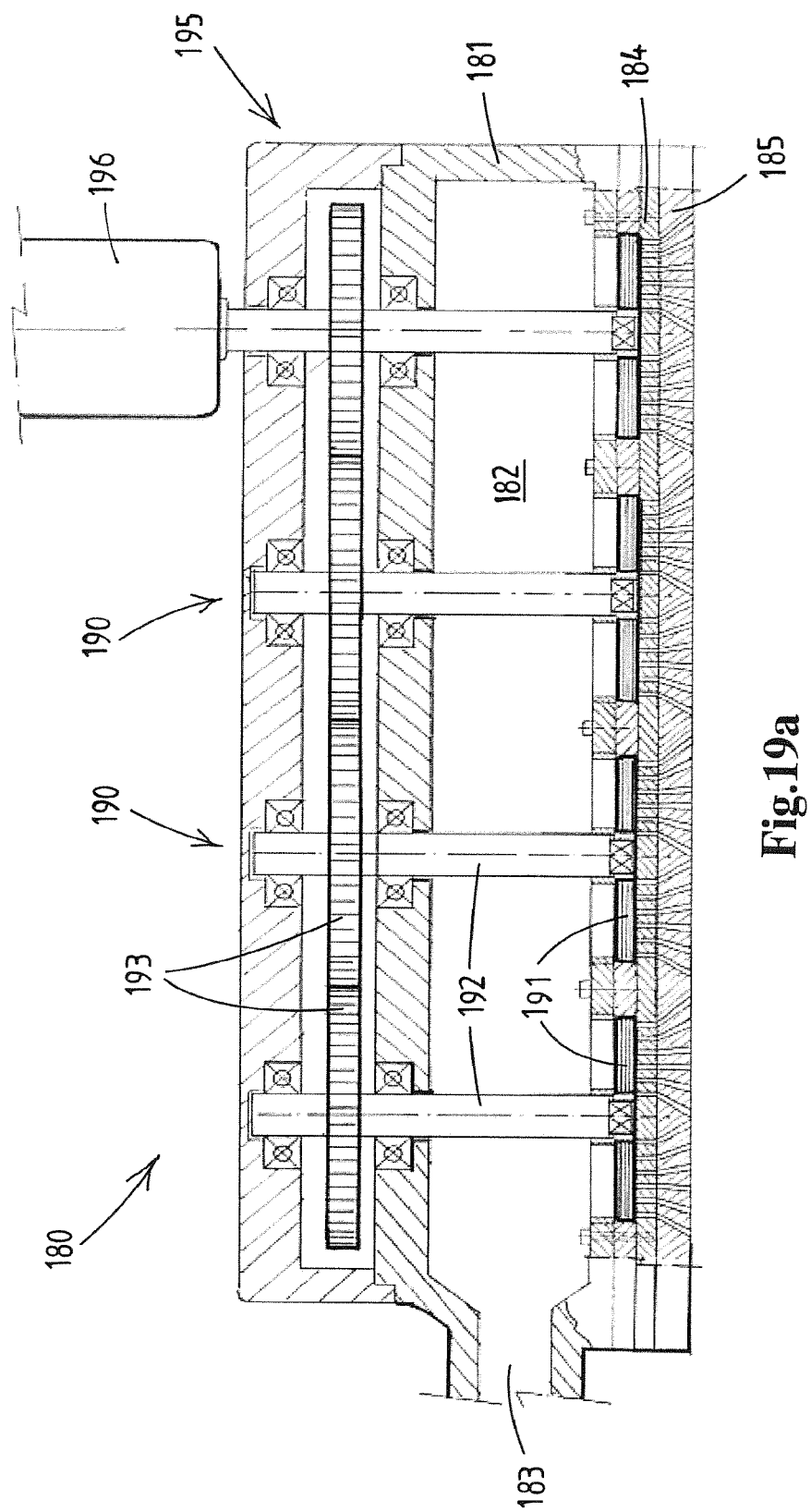

The FIGS. 19*a, b, c* illustrate yet another alternative embodiment of the mass feed member.

The mass feed member 180 has a manifold body 181 delimiting a single elongated chamber 182 of the mass feed member, here the manifold body having a length corresponding to the length of the drum (not shown) so as to transfer mass into all arrays of cavities of the drum. In an alternative embodiment two such manifold bodies are provided, each covering half the length of the drum (or plate in a plate moulding device).

The manifold body 181 has an inlet 183, here located at an axial end of the manifold 181. At the mouth the mass feed member has an orificed grinder body comprising a metal orificed grinder body 184 that forms the grinding face and that is stacked on a plastic orificed grinder body 185 that faces drum.

As can be seen FIG. 19*a* the mass feed member 180 is provided with multiple grinder devices 190 along the length of the chamber 182, here each comprising a rotary grinder member 191 driven by shaft 192. Here it is shown that each shaft 192 extends out of the chamber 182 and that the protruding part of the shaft 192 is provided with a pinion 193 that meshes with the pinion of an adjacent grinder 190. One of the pinions 193 is fitted on a shaft 192 that is driven by motor 196, so that multiple grinder devices 190 are driven by said single motor 196. The pinions 193 are present in a gear case 195 of the mass feed member.

Figure 19B:
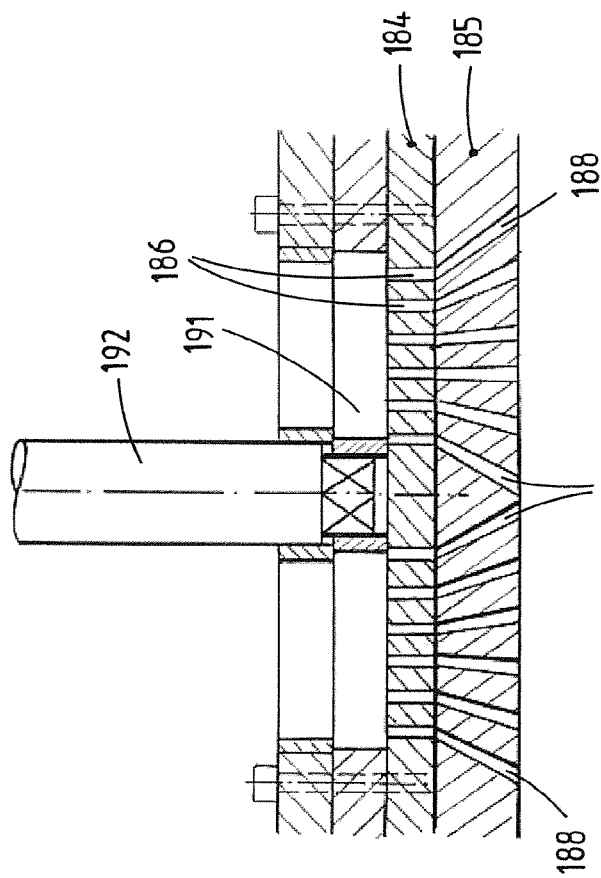
Figure 19C:
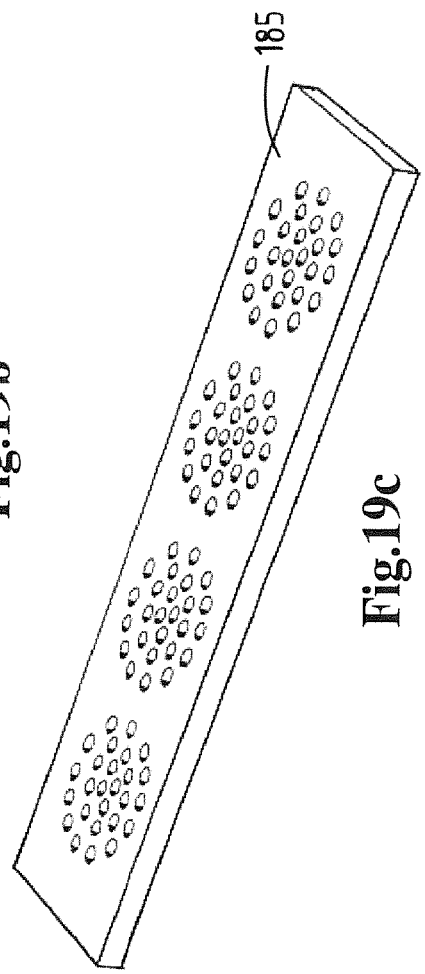

The FIGS. 19*b, c* illustrate that the metal orificed grinder body 184 is provided with parallel orifices 186, preferably at right angles to the grinding face, and that at least some of the adjoining orifices in the plastic body 185 are arranged at various angular orientations in view of an optimal distribution of the inflow of mass into a mould cavity. For example, a central group of orifices 187 in body 185 is directed at an inward angle to provide an outlet in the outlet face below the end of the drive shaft 192. Another group 188 along the outer perimeter of the group of orifices in the body 185 is outwardly inclined so as to allow flow into a cavity near the perimeter of the cavity. FIG. 19*c* shows the outlet face formed by the body 185 with multiple groups of orifices having an outlet in said face, each group corresponding to an array of passing mould cavities in the mobile mould member, e.g. drum.

Figure 20:
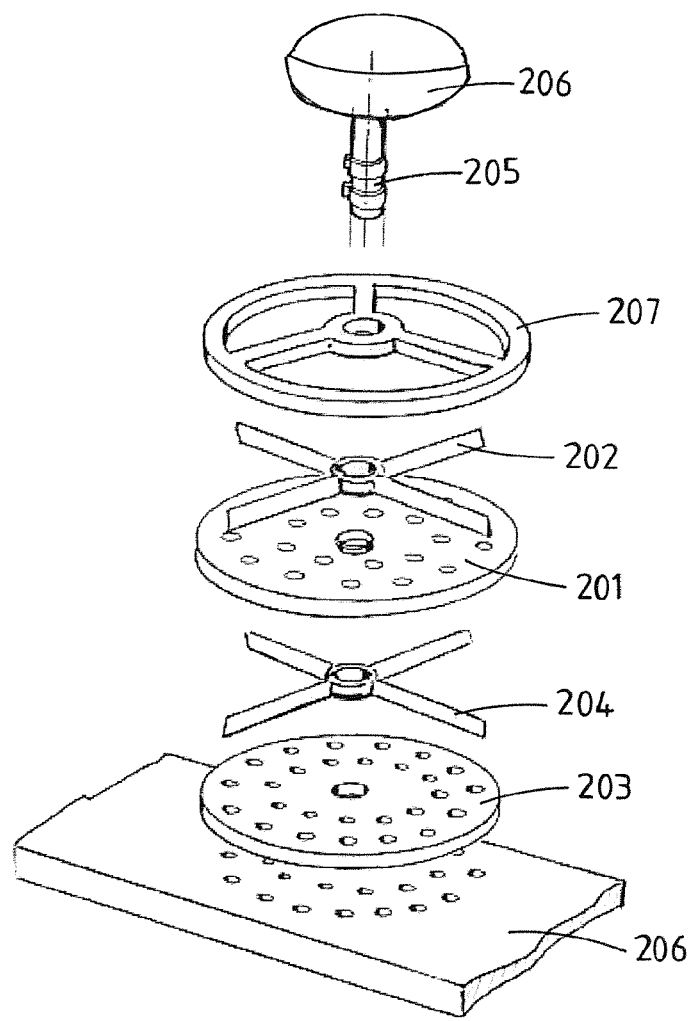
FIG. 20 illustrates a dual-phase grinder device, FIGS. 21 a, b, c illustrate common drive arrangements for driving multiple grinder devices of a mass feed member, FIGS. 22a, b illustrate reciprocating drive arrangements for driving a reciprocating grinder member of a grinder device in a mass feed member, FIGS. 23a, b illustrate a reciprocating drive arrangement for driving a reciprocating grinder member of a grinder device in a mass feed member, FIGS. 24a, b illustrate the provision of a controlled valve at the inlet to the chamber of a unit of the mass feed member, FIGS. 25a, b, c, d illustrate valve arrangements to control the flow of mass of the inlet of the chamber of each unit of the mass feed member, FIGS. 26a, b illustrate the provision of a controlled valve at the mouth of the chamber of a unit of the mass feed member.

FIG. 20 illustrates an embodiment of a mass feed member grinder device 200 of the "dual phase type". Herein multiple orificed grinder bodies are placed in series, with the final orificed grinder body having the smallest orifices. In the example a first grinder body 201 has a grinding face along which first rotary grinder member 202 passes. Downstream a second orificed grinder body 203 is present and a second rotary grinder member 204 is arranged between the bodies 201 and 203. This member 204 cooperates with the grinding face of the second body 203. As is preferred the members 202 and 204 are driven by common rotary drive shaft 205 and motor 206. A bearing bracket 207 may be provided as intermediate support of the drive shaft in the chamber.

It is illustrated that the orifices in the second or final body 203 have a smaller diameter than the orifices in the first body 201. The final body 203 lies against a plastic orificed body 206 as explained with reference to other alternatives for the grinder device.

It is noted that also the mass feed member may be equipped with one or more "dual-phase" or "multi-phase" grinder devices, so with multiple grinder bodies in series.

FIGS. 21 *a, b, c* illustrate alternative embodiment of the transmission between a single grinders drive motor 176 and multiple grinder devices each having a rotary drive shaft 171.

Figure 21A:
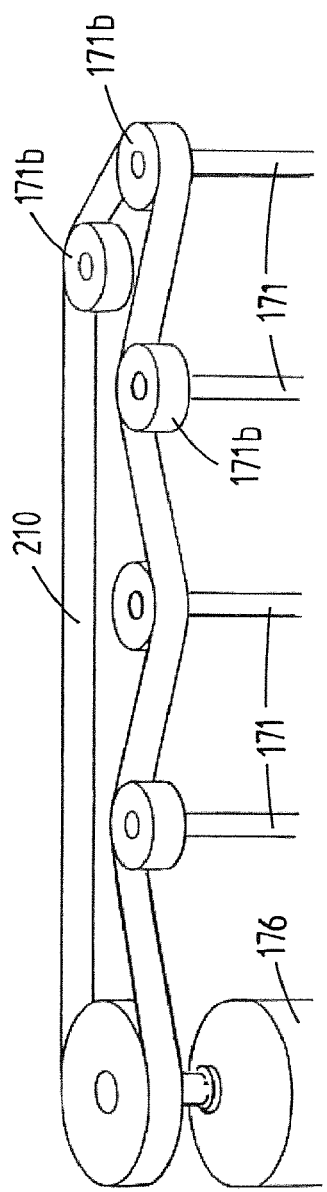

In FIG. 21*a* the motor 176 drives a common belt or chain 210 which engages, e.g. meshes, a transmission member 171*b* on the shaft 171, e.g. a pinion.

Figure 21B:
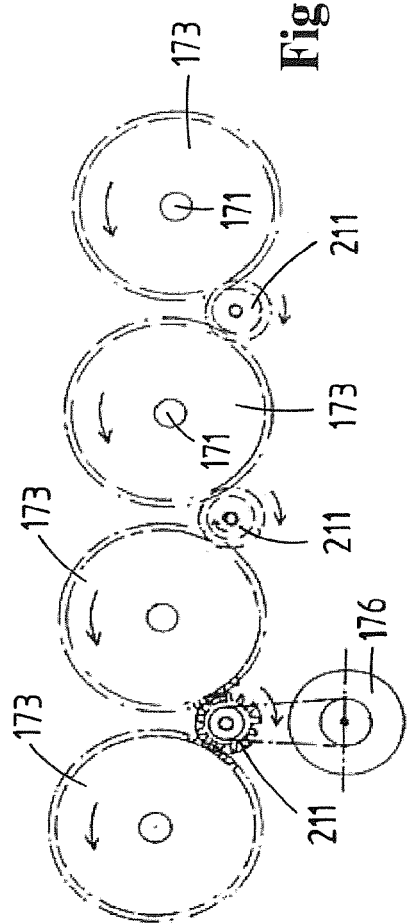

In FIG. 21*b* each of the shafts 171 is provided with a pinion 173 and intermediate gears 211 are placed between adjacent pinions 173, e.g. to cause the effect that all shafts 171 rotate in the same direction. The motor 176 drives this transmission train, e.g. by driving one of the intermediate gears 211 as shown here with a further chain transmission.

Figure 21C:
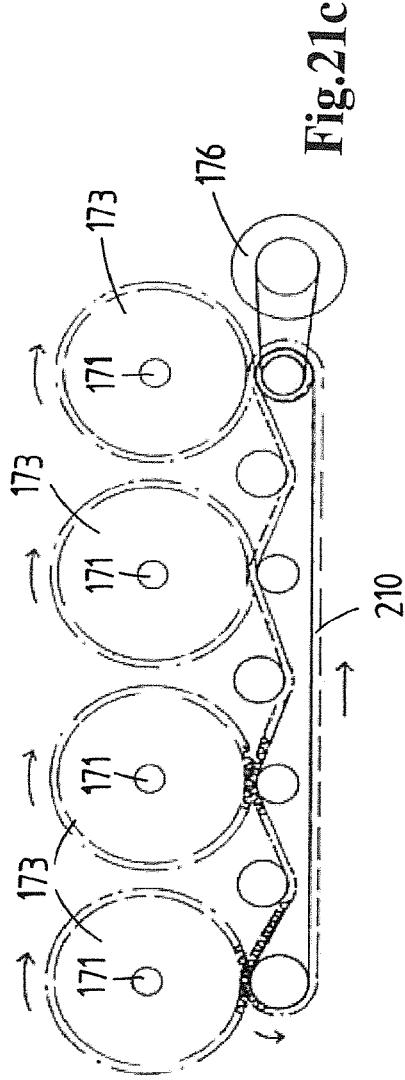

In FIG. 21c an alternative common belt 210 is shown to drive all shafts 171 via a respective pinion 173 fitted on the shaft 171.

Figure 22A:
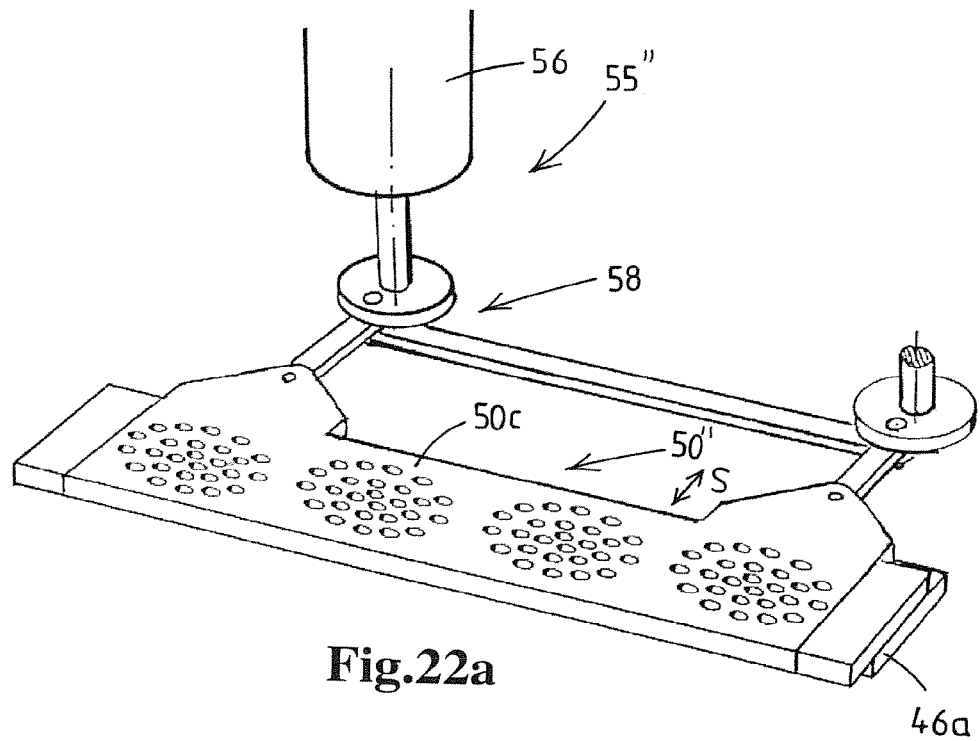

The FIG. 22a illustrates a reciprocating drive arrangement for driving a reciprocating grinder member 50" of a grinder device in a mass feed member. Herein it is envisaged that for all circumferential arrays of mould cavities on a drum (in this example four arrays, drum not shown) a common reciprocating grinder member 50" is provided. The member 50" is reciprocated in a direction that is parallel or tangent to the path of motion of the drum, so at right angles to the longitudinal axis of the drum.

In FIG. 22a the grinder member 50" is embodied as an orificed mobile grinder member with groups of orifices therein corresponding to groups of orifices in the mating grinder body 46a similar to the embodiment explained with reference to FIGS. 11 c, d with each group corresponding to a passing array of mould cavities. It will be appreciated that member 50" as in FIG. 22a could also be embodied as shown in FIG. 11 a, b or otherwise.

The common reciprocating grinder member 50" is driven by an associated drive 55", here comprising a rotary output shaft motor 56 connected via a crank mechanism 58 to the reciprocating member 50".

Figure 22B:
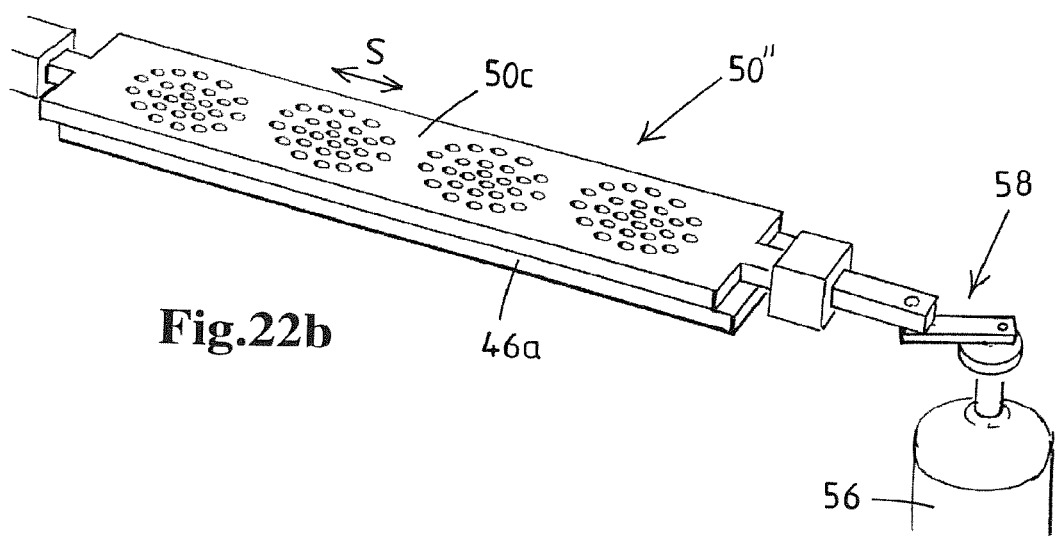

The FIG. 22b illustrates another reciprocating drive arrangement for driving a reciprocating grinder member of a grinder device in a mass feed member. Herein the grinder member 50" is reciprocated in a direction that is parallel to the longitudinal axis of the drum (so in longitudinal direction of the mass feed member).

The FIGS. 23a, b illustrate a reciprocating drive arrangement for driving a reciprocating grinder member as shown in FIG. 11. Herein the member 50' is dimensioned to cooperate with a part of the orificed grinder body 46a having a single group of orifices that fill an array of mould cavities that pass said group of orifice in operation of the device. So per array there is an individually driven member 50' in the mass feed member with a motor 56 and a transmission, here a crank mechanism 58. Each member 50' is guided in guides 50d of the mass feed member (or of a unit 40) that extend transverse to the longitudinal axis of the drum (not shown).

Figure 24A:
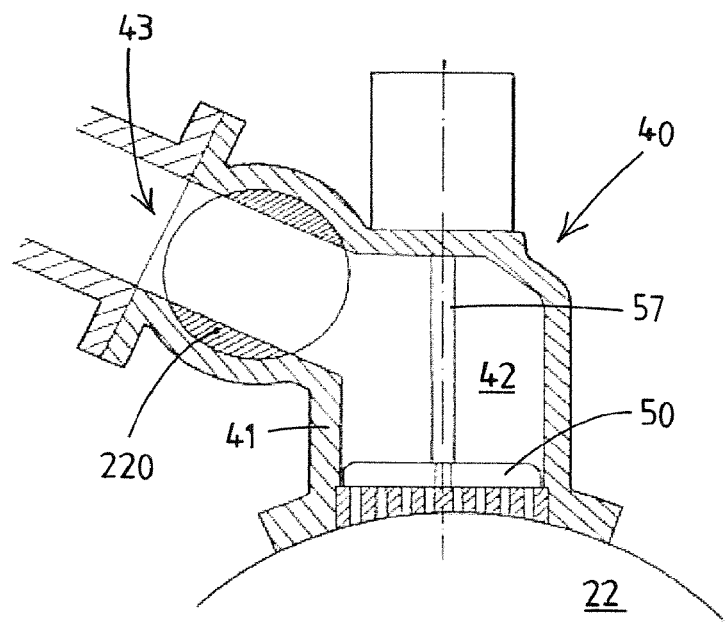
Figure 24B:
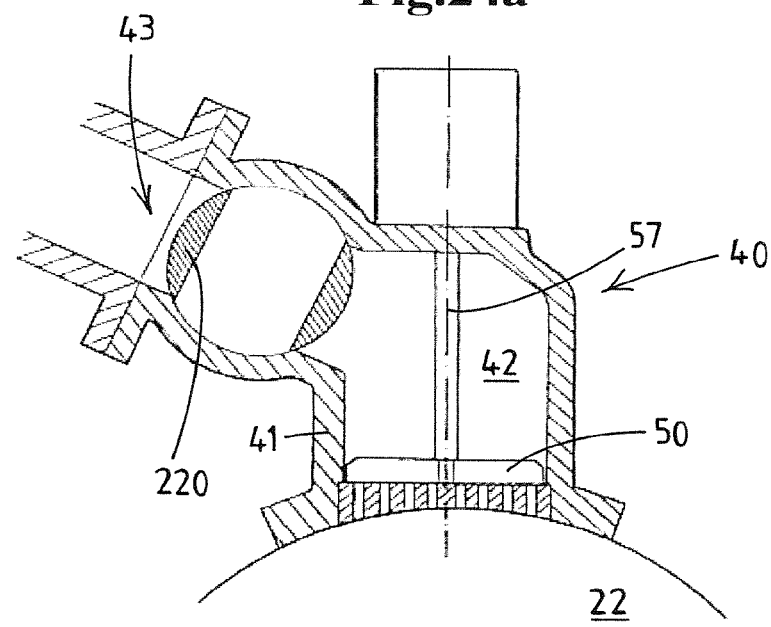

FIGS. 24a, b illustrate the provision of a controlled valve in a unit 40, here at the inlet 43 to the chamber 42 within the housing of the unit 41. The valve is embodied as a ball valve 220, e.g. electrically controlled, e.g. in timed relationship to the passing of mould cavities along the mouth formed by the unit 40. The valve 220 can be employed to control the start of each filling event.

The valve 220 is placed upstream of the grinder device with mobile grinder member 50, here at the inlet 43 of the unit 40.

Such a valve 220 could also be placed at the inlet of a mass feed manifold having a mouth that feeds multiple arrays of mould cavities, e.g. as shown in FIG. 12 where the valve 220, e.g. ball valve, could be arranged at the inlet 104 of manifold 100.

Figure 25A:
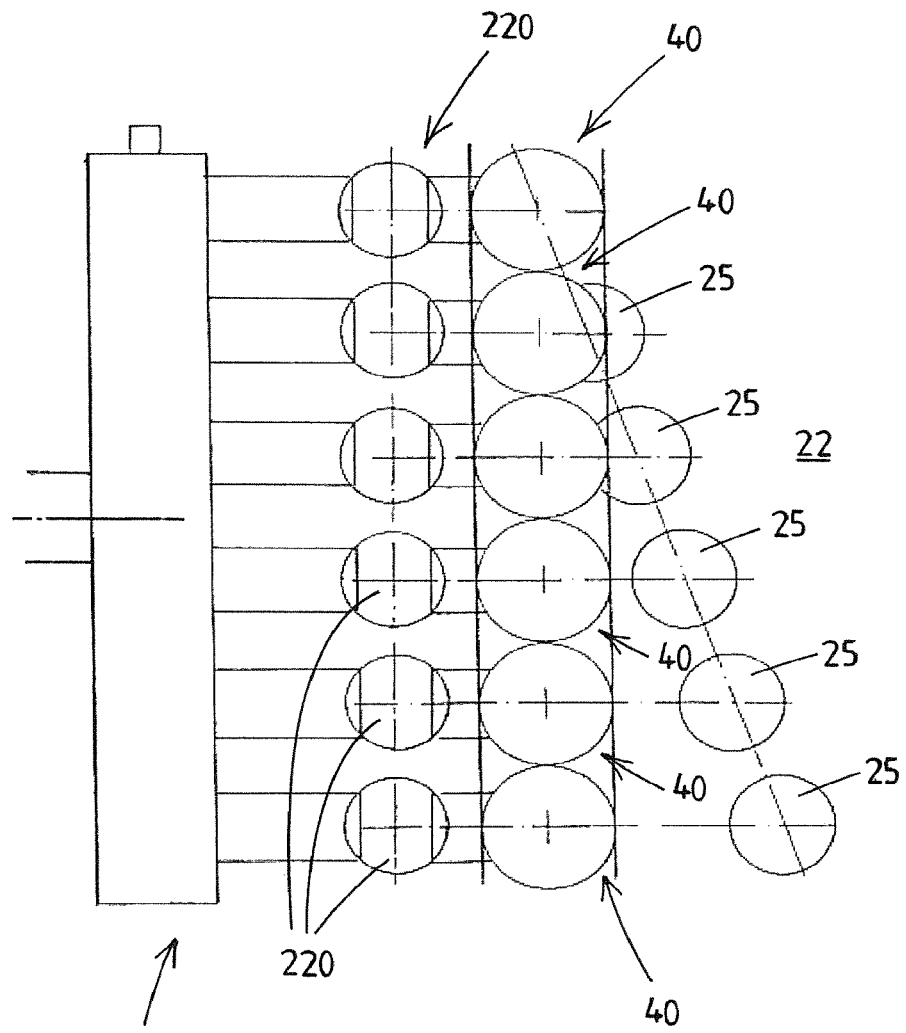

FIG. 25a illustrates schematically a mould member, here drum, 22 with mould cavities 25 that are not aligned on a line parallel to the drum axis but are offset in circumferential direction from one array of cavities 25 to the next. Each unit 40 has a mouth corresponding to one array of passing cavities 25 and has a valve 220, here a ball valve at the inlet 43 of the housing of the unit. A distributor 60 distributes the mass emerging from the pump (not shown) to all of the inlets of the units 40. The valves 220 are all connected to a valve control unit that allows to time the opening and closing of each individual valve in timed relation to the passing of the respective cavities 25, e.g. allowing to control the start of the individual filling events.

Figure 25B:
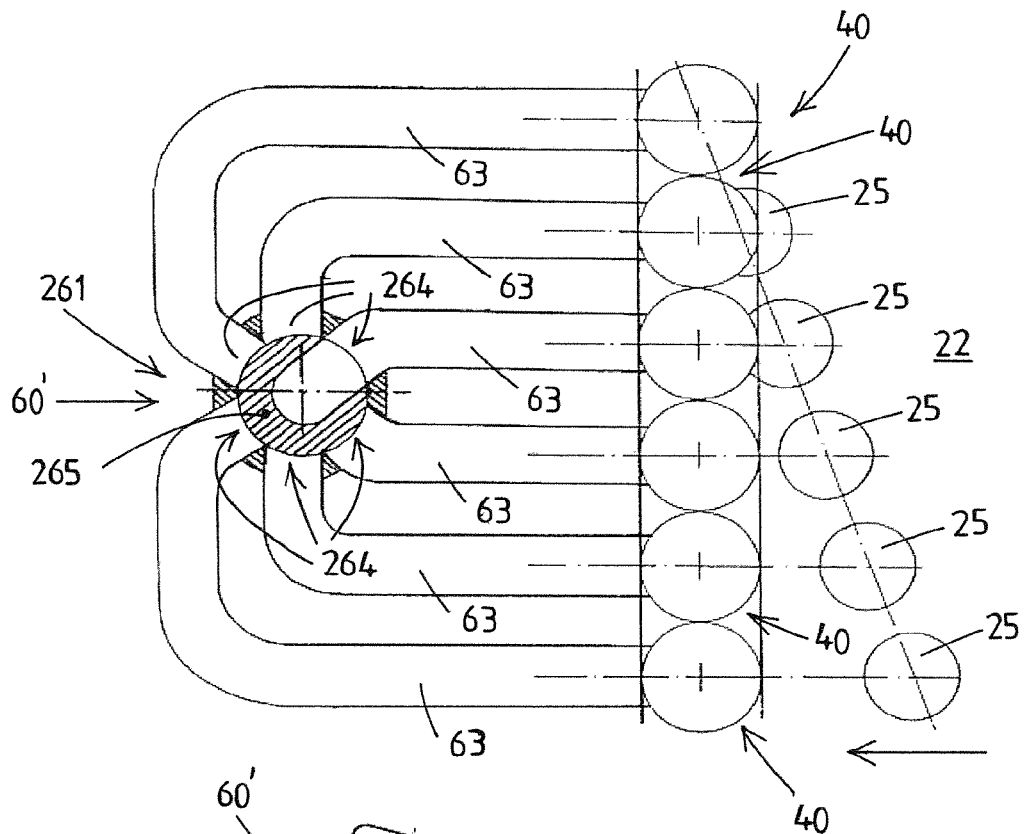
Figure 25C:
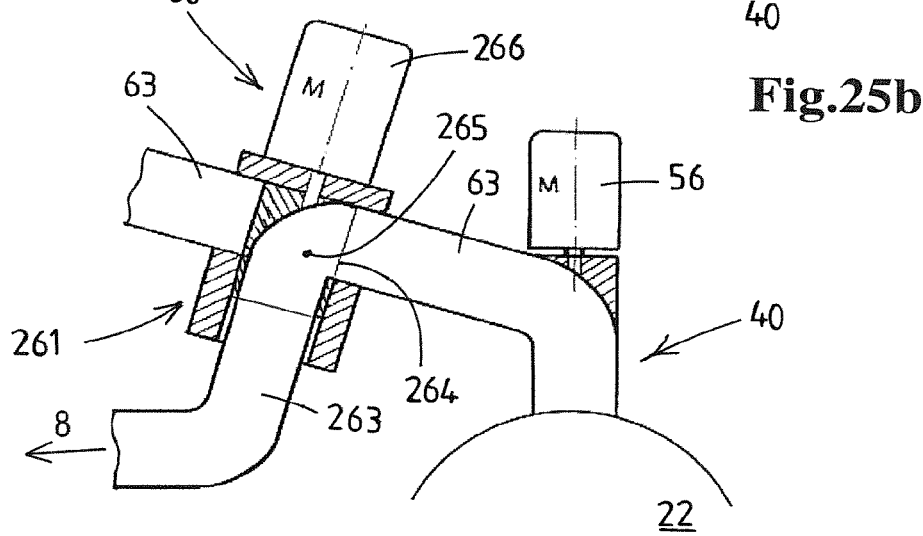

In FIGS. 25b, c it is illustrated that the distributor 60' is provided with a distributor valve 261 having a housing 262 with an inlet 263 connected to the pump 5 and with multiple outlets 264 connecting to tubes or hoses 63 that each lead to a corresponding unit 40.

The valve 261 has a movable, here rotatable, valve member 265 that selectively connects to the inlet 263 to a selected outlet 264 and thus passes the mass to a selected unit 40. Here valve member actuator 266 is embodied as an electric motor.

It will be appreciated that the provision of the distributor valve 261 between the pump 5 and the inlets of the units 40 allows to bring each chamber 42 of a unit in communication with the pump 5 in a timed relationship, relative to the passing of the cavities in the respective array of cavities 25 that passes the unit 40. This can e.g. be used to time the filling events.

Figure 25D:
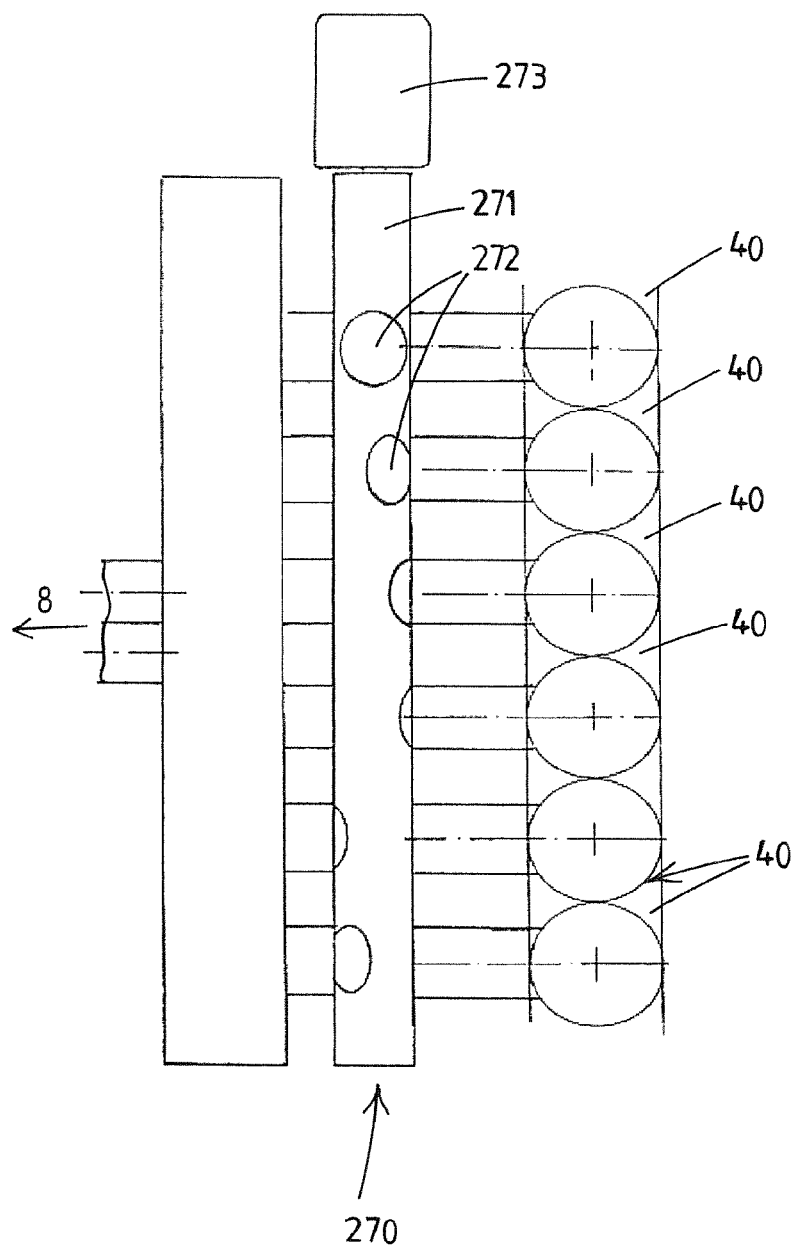

FIG. 25d schematically depicts a distributor valve 270 that allows for a similar control of the flow of mass to each unit as with the valve 261. Herein the movable valve body 271 is a rotatable shaft having multiple apertures 272, each one for controlling the flow to a corresponding unit 40. The actuator 273 controls the angular positioning of the shaft 271.

Figure 26A:
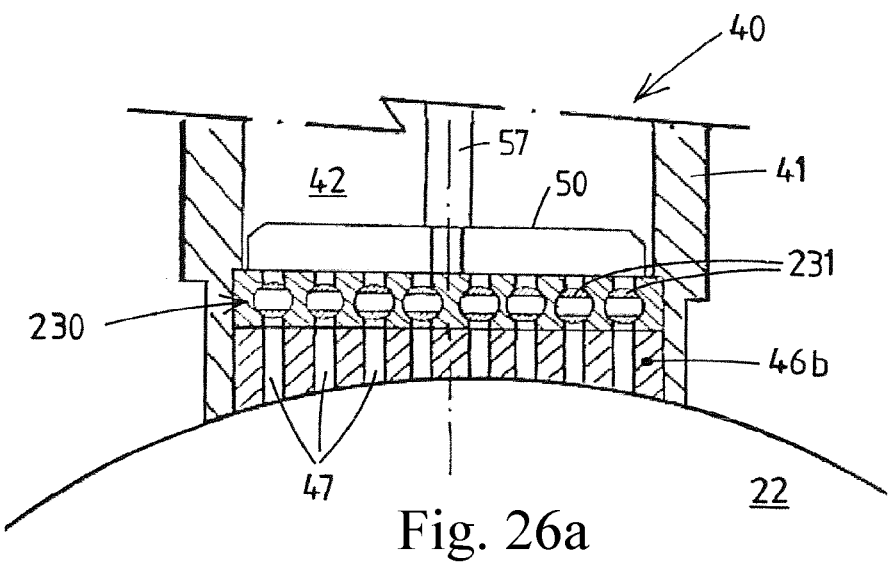

FIGS. 26a, b illustrate the provision of a controlled valve 230 at the mouth of the chamber 42 of a unit 40 of the mass feed member.

Herein the valve 230 is embodied with multiple parallel valve rods 231 that each intersect several orifices 232 formed in an orificed valve block 233. One side of the valve block 233 in this example is embodied as a grinding face that cooperates with a mobile grinder member 50 that passes over the grinding face, e.g. the valve block 233 being made of metal. In another embodiment a metal orificed grinder plate body is placed over the inlet side of the valve block, e.g. the block being made of plastic.

Preferably the valve rods 231 are made of metal.

As will be appreciated in one angular position of the valve rods 231 the apertures 235 in the valve rod 231 align with the orifices 232 in the valve block 233, so that the valve 230 is open and foodstuff mass can pass through the orifices 232 towards the mould cavity in drum 22. In another angular position of the rods 231 the valve 230 is closed.

For example all rods 231 have a pinion 234, with the pinions meshing so that all rods 231 are moved simultaneously, e.g. by a controlled electric valve drive motor.

In an embodiment the one or more valve rods are movable in their axial direction for the purpose of opening and closing the valve.

In another embodiment not all valve rods 231 of a valve corresponding to a single array of passing mould cavities are actuated simultaneously between opened and closed position.

For example one set of rods is actuated in timed delay relative to another set of rods 231 of the valve 230 so that the flow of mass into a mould cavity can be further controlled. In an embodiment a valve 230 has multiple valve actuators, e.g. electric motors or solenoids, each actuating a group of one or more valve rods of the valve 230 allowing to obtain a timed variation of opening of orifices in a group of orifices relating to the filling of a mould cavity.

It will be appreciated that the valve 230 can also be employed in a mass feed member without provision of any grinding device as disclosed herein in order to obtain a timed filling of the passing mould cavities that are to be filled with foodstuff mass.

Figure 27:
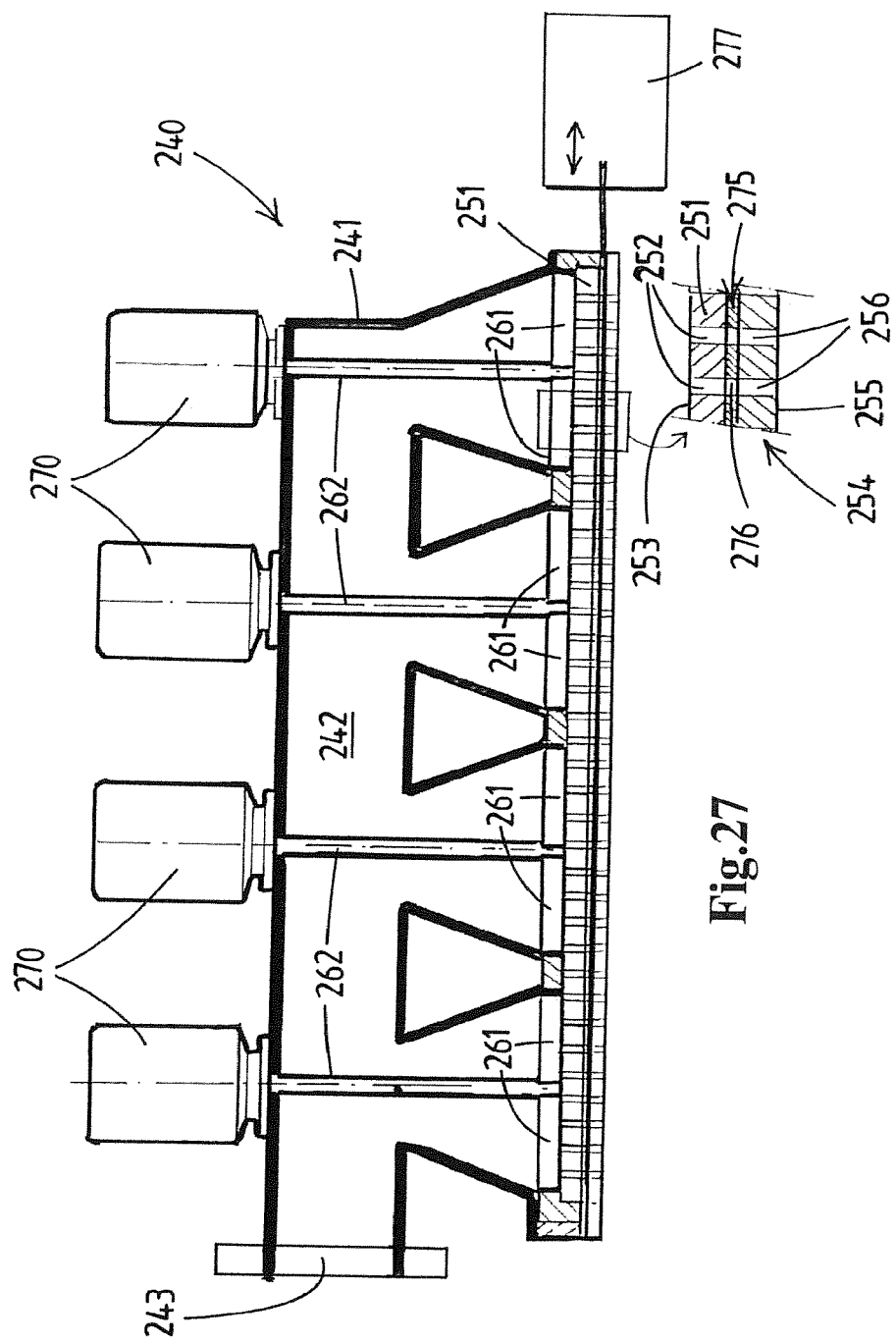
FIG. 27 illustrates the provision of a controlled valve at the mouth of the chamber of the mass feed member.

FIG. 27 illustrates the provision of another controlled valve at the mouth of the chamber of the mass feed member.

Generally similar to the mass feed member of FIG. 17*a* the mass feed member 240 has a manifold body 241 delimiting a single elongated chamber 242 of the mass feed member. Here the manifold body has a length corresponding to the length of the drum (not shown) so as to transfer mass into all arrays of cavities of the drum.

The manifold body 241 has an inlet 243 for the mass emerging from the pump.

As can be seen the mass feed member 240 is provided with multiple grinder devices 260 along the length of the chamber 242, here each comprising a rotary grinder member 261 driven by shaft 262. Here it is shown that each shaft 262 extends out of the chamber 242 and that the protruding part of the shaft 262 is driven by a motor 270. As will be appreciated a common drive arrangement for the multiple grinders is also possible.

At the mouth—as part of the mouth body—the mass feed member manifold body 241 has an elongated a metal orificed grinder body 251 that forms the grinding face 253 that cooperates with all grinder members 261 and has orifices 252 therein.

The mouth body further comprises an elongated plastic orificed body part 254 forming the outlet face 255 of the mouth body with the orifices 256 therein each in communication with a respective orifice 252. The outlet face 255 faces the drum (not shown).

It is illustrated that the mouth body is provided with a controlled valve therein allowing to open and close the connection between orifices 252 in the grinder body 251 and the orifices 256 in the body part 254. In this example it is shown that the valve comprises an orificed valve plate 275 that is placed between the body 251 and body part 254 and that is slidable in its plane between a position wherein orifices 276 in the valve plate 275 align with the orifices 252 and 256 so that the valve is open and a closed position wherein the valve plate 275 closes the connection between the orifices 252 and 256.

The valve plate 275 is actuated by an actuator 277, e.g. a solenoid actuator.

The valve plate 275 may be employed in view of the timing of the start filling events of a row of multiple cavities passing along the mouth of the mass feed member. As only a single valve plate is present in this example, all these events will start at the same time. In an alternative embodiment multiple valve plates are provided in the mass feed member, each governing the opening and closing of a group of orifices relating to the filling of an array of mould cavities in the drum, e.g. with the individual operable actuator for each valve plate causing a valve plate motion at right angles to the plane of the FIG. 27.

It will be appreciated that for reasons of friction the valve plate 275 can be made of a suitable plastic material and/or a further plastic body being present between the grinder body 251 and the valve plate 275.

Figure 26B:
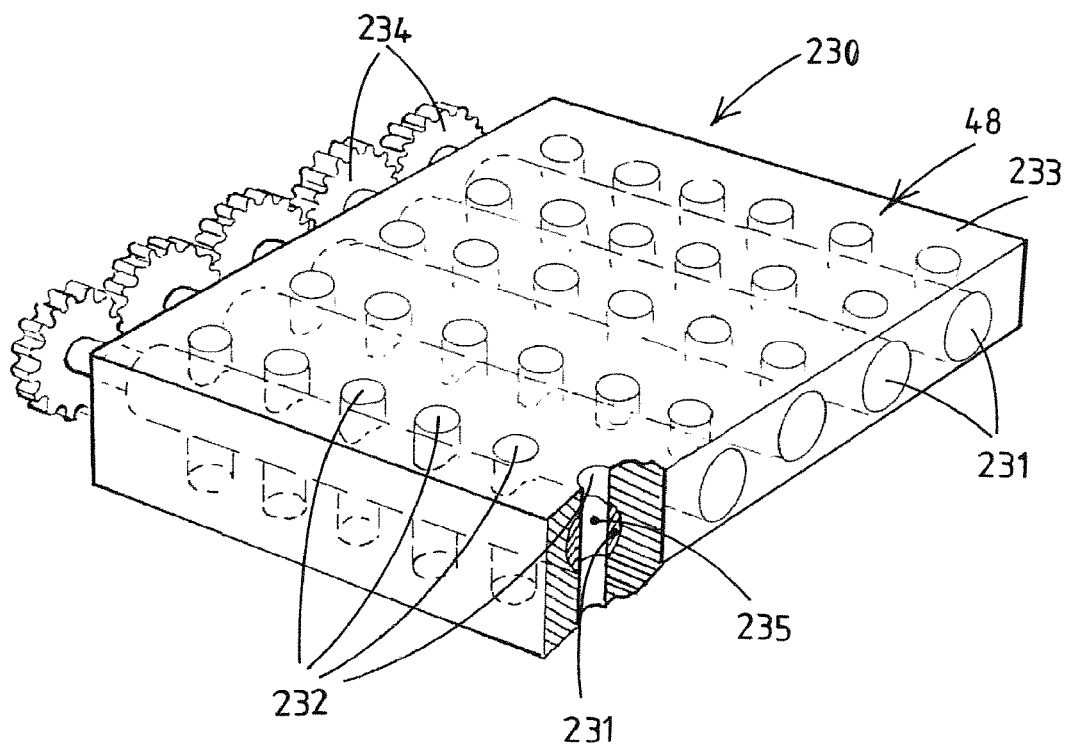

It is preferred for the closing of the orifices in the mouth body as shown by way of example in FIGS. 26 and 27 to be performed as close as practical to the outlet face of the orificed mouth body as this will cause a disconnection between the mass that has been filled into the mould cavity and the mass that is present in the mass feed member. This disconnection e.g. avoids formation of a streak pattern on the respective side of the formed product.

Figure 28:
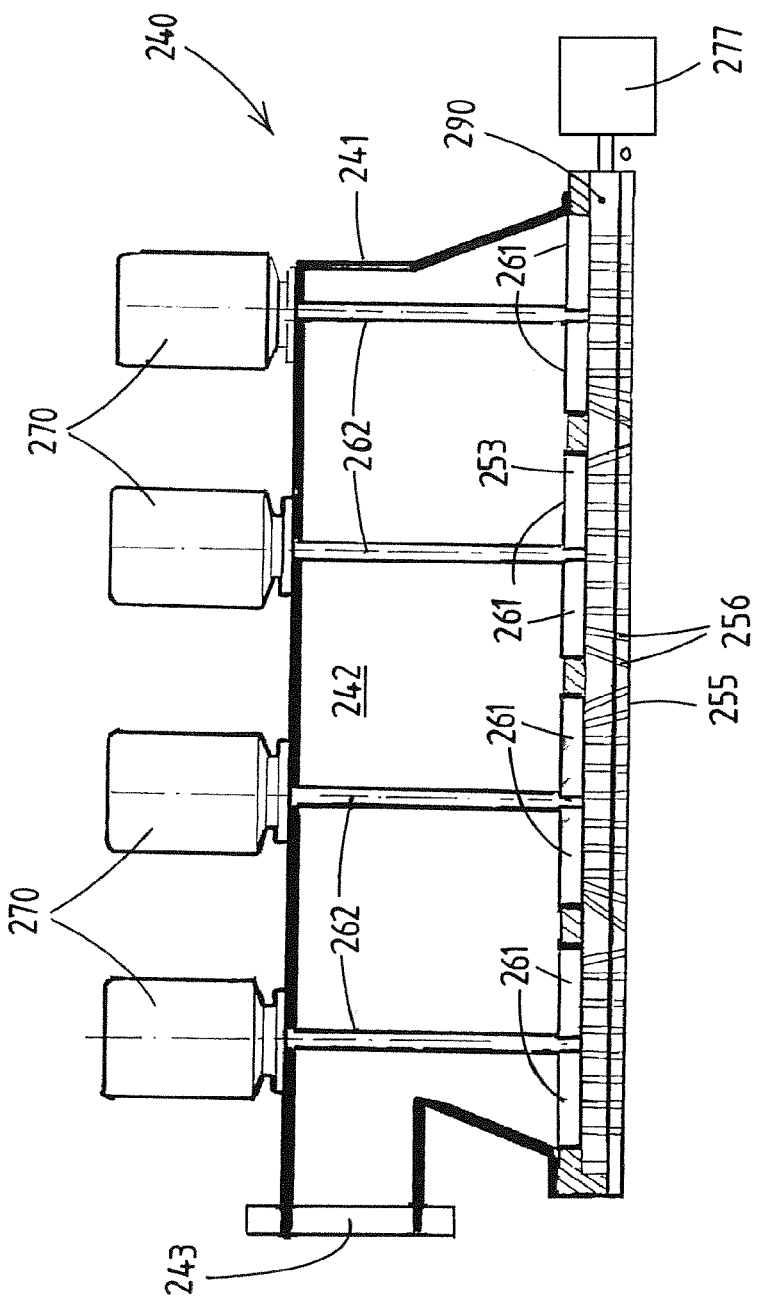
FIG. 28 illustrates a variant of FIG. 27.

In an alternative embodiment, shown in FIG. 28, the valve plate 275 and grinder body 251 are integrated into a single orificed plate body 290, so that effectively a valve plate is created to open and close the orifices 256 at their inlet side and so that the combined valve plate and grinder body 290 effectively forms the grinding face 253 on the face opposite the body 254, which face 253 cooperates with one or more mobile grinder members 261, preferably with multiple rotary grinder members arranged at spaced positions along the length of the combined valve plate and grinder body 290.

The grinder body and/or the layer thereof forming the grinder face and the one or more mobile grinder members may be made of metal or other suitable material, such as ceramic material.

Figure 29:
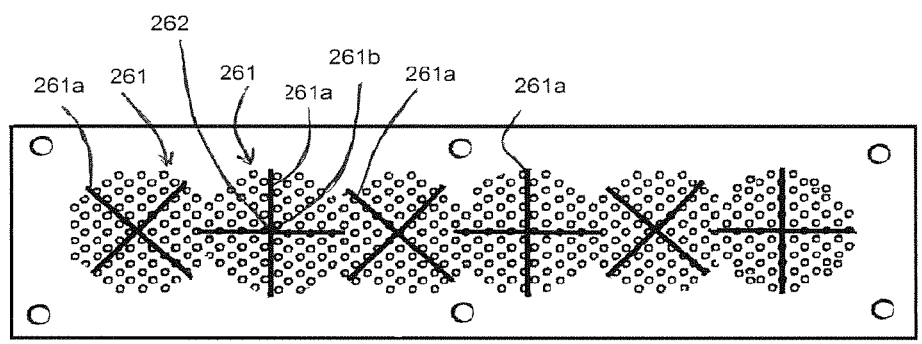
FIG. 29 illustrates the provision of multiple grinders with rotary grinder members having overlapping grinding areas.

FIG. 29 shows schematically, looking at the grinding face, a grinder body and multiple rotary grinder members 261, each having one or more grinder blades 261*a* that extend from a hub 261 *b*, e.g. connected to a rotary drive shaft 262. It is illustrated that the one or more grinder blades 261*a* of one grinder overlap the rotary path of the one or more grinder blades of an adjacent grinder, so that their effective circular grinding areas have an overlap. In other words the one or more blades 261*a* of one grinder mesh with the one or more blades of an adjacent grinder. This approach allows for a relatively dense arrangement of cavities, e.g. when the mould member is a drum mould member with spirally arranged mould cavities. Also this approach avoids or reduces the occurrence of stagnant zones in the chamber of the mass feed member caused by non-orificed regions of the grinder body.

The invention claimed is:

1. An installation for moulding of three dimensional products from a pumpable foodstuff mass, wherein the installation comprises:
   a pump having at least one pump chamber, an inlet, and an outlet for the foodstuff mass;
   a pump drive;
   a moulding device including:
      a frame;
      a mould drum having an outer circumferential drum surface with a curvature and a longitudinal drum rotation axis, the mould drum being rotatably supported by the frame to revolve relative to the frame about the longitudinal drum rotation axis, wherein the mould drum has in the outer circumferential drum surface a pattern of multiple mould cavities, and the pattern includes multiple arrays of mould cavities at distinct positions along the longitudinal drum rotation axis, and wherein, in each array, multiple mould cavities are arranged at spaced locations in a circumferential direction of the outer circumferential drum surface, each mould cavity having a filling opening in the outer circumferential drum surface for transfer of the foodstuff mass into the mould cavity and for later removal of a moulded product from the mould cavity;
      a mould member drive for moving the mould drum relative to the frame along a circular path about the longitudinal drum rotation axis, said path including a fill position for each mould cavity of said multiple mould cavities where foodstuff mass is filled into the mould cavity and a product release position for each mould cavity of said multiple mould cavities where a moulded product is released from the mould cavity;

a mass feed member having a chamber with an inlet for foodstuff mass and said mass feed member being arranged at the fill position along the circular path of the mould drum, said inlet of the mass feed member being connected or adapted to be connected to the outlet of the pump, the mass feed member being adapted to transfer the foodstuff mass into at least one mould cavity of said multiple mould cavities; and wherein the mass feed member is provided with a grinder drive for driving a grinder member within the mass feed member, said grinder drive adapted to move the mobile grinder member, said grinder member defining a plurality of orifices;

wherein a grinder device controller is provided to control operation of the grinder drive of the mass feed member;

wherein the mass feed member is further provided with a grinder body defining a plurality of orifices corresponding to the multiple mould cavities of the mould drum as the mould drum moves, the plurality of orifices of the grinder member adapted to mate the plurality of the orifices of the grinder body depending on reciprocation and displacement of the grinder member relative to the grinder body.

2. The installation of claim 1, wherein the grinder member is arranged to reciprocate in a direction along a circular path of motion of the mould drum.

3. The installation of claim 1, wherein the grinder member is arranged to reciprocate in a direction parallel to the longitudinal drum rotation axis of the mould drum.

4. The installation of claim 1, wherein the mass feed member defines at least one linear guide along which the grinder member moves.

5. The installation of claim 4, wherein the at least one linear guide extends transverse to the longitudinal drum rotation axis of the mould drum.

6. The installation of claim 1, wherein the grinder member is dimensioned to cooperate with a part of the grinder body having a single group of orifices that are arranged to correspond to an array of mould cavities that pass said single group of orifices, wherein the grinder member is connected to the grinder drive, the grinder drive comprising a motor and a transmission for reciprocating the grinder member relative to the part of the grinder body.

7. The installation of claim 6, wherein the grinder member includes a part that corresponds the part of the grinder body, the part of the grinder member is individually connected to its own motor and the transmission, the transmission being a crank mechanism; and wherein the grinder drive comprising a rotary output shaft motor connected via a crank mechanism to the grinder member.

8. The installation of claim 1, wherein the grinder body is maintained stationary relative to the grinder member.

9. The installation of claim 1, wherein the grinder member includes at least one mobile grinder member having an associated independently controllable grinder drive adapted to independently operate each of the at least one mobile grinder member.

10. The installation of claim 1, wherein the grinder body and the grinder member are formed as plates having flat cooperating surfaces slidably engaging one another.

11. An installation for moulding of three dimensional products from a pumpable foodstuff mass, wherein the installation comprises:

a pump having at least one pump chamber, an inlet, and an outlet for the foodstuff mass;
a pump drive; and
a moulding device including:
a frame;
a mould member having multiple mould cavities, wherein at least one mould cavity of the multiple mould cavities has a filling opening for the introduction of foodstuff mass into the at least one mould cavity, wherein the mould member is movably supported by the frame;
a mould member drive for moving the mould member along a path, said path including a fill position of the at least one mould cavity where mass is filled into the at least one mould cavity and a product release position of the at least one mould cavity where a moulded product is released from the at least one mould cavity, wherein the mould member is provided with a pattern of the multiple mould cavities, the multiple mould cavities being at perpendicular axis positions when seen perpendicular to the path of the mould member; and
a mass feed member having a chamber with an inlet for foodstuff mass and having a discharge mouth facing the mould member at the fill position along the path of the mould member, said inlet of the mass feed member being connected or adapted to be connected to the outlet of the pump, the mass feed member being adapted to transfer the foodstuff mass into the at least one mould cavity of the mould member;
wherein the mass feed member is provided with multiple grinder devices, each being arranged at a distinct perpendicular axis position when seen perpendicular to the path of the mould member, said positions each corresponding to the perpendicular axis position of the at least one mould cavity;
wherein each grinder device comprises a grinder body having multiple orifices and a grinding face;
a mobile grinder member arranged adjacent the grinding face of the grinder body, each mobile grinder member cooperating with the grinding face of the grinder body; and
a grinder drive adapted to move the mobile grinder member, and
wherein a grinder device controller configured to control operation of the multiple grinder devices.

12. The installation according to claim 11, wherein each mobile grinder member has an associated independently controllable grinder drive adapted to independently operate each mobile grinder member.

13. The installation according to claim 11, wherein the mould member is a mould drum, which mould drum has an outer circumferential drum surface with a curvature and a longitudinal drum rotation axis, the mould drum being rotatably supported by the frame to revolve about the longitudinal drum rotation axis, and wherein the mould drum has, in the outer circumferential drum surface, a pattern of multiple arrays of mould cavities at distinct positions in the longitudinal drum rotation axis, wherein, in each array, multiple mould cavities are arranged at spaced locations in circumferential direction of the other circumferential drum surface, wherein each mould cavity of the multiple mould cavities has a filling opening in the outer circumferential drum surface for the transfer of foodstuff mass into each mould cavity of the multiple mould cavities and for later removal of the moulded product from each mould cavity of the multiple mould cavities, and wherein the mass feed member has a discharge mouth body provided with said discharge mouth, said discharge mouth body having a curved outlet face corresponding to the curvature of the mould drum.

14. The installation according to claim 11, wherein each mobile grinder member is arranged to extend transversely to a longitudinal drum rotation axis of a mould drum.

15. The installation according to claim 11, wherein the mass feed member defines at least one guide along which the mobile grinder member moves.

16. The installation of claim 11, wherein the grinder body is maintained stationary relative to the mobile grinder member.

17. The installation of claim 11, wherein the grinder body is formed from metal or ceramic.

18. The installation of claim 11, wherein the grinder body and the mobile grinder member are formed as plates having flat cooperating surfaces.

19. An installation for moulding of three dimensional products from a pumpable foodstuff mass, wherein the installation comprises:
   a pump having at least one pump chamber, an inlet, and an outlet for the foodstuff mass;
   a pump drive; and
   a moulding device including:
      a frame;
      a mould drum having an outer circumferential drum surface with a curvature and a longitudinal drum rotation axis, the mould drum being rotatably supported by the frame to revolve relative to the frame about the longitudinal drum rotation axis, wherein the mould drum has in the outer circumferential drum surface a pattern of multiple mould cavities including multiple arrays of mould cavities at distinct positions along the longitudinal drum rotation axis, and wherein, in each array, multiple mould cavities are arranged at spaced locations in a circumferential direction of the outer circumferential drum surface, each mould cavity having a filling opening in the outer circumferential drum surface for transfer of the foodstuff mass into the mould cavity and for later removal of a moulded product from the mould cavity;
      a mould member drive for moving the mould drum relative to the frame along a circular path about the longitudinal drum rotation axis, said path including a fill position for each mould cavity of said multiple mould cavities where foodstuff mass is filled into the mould cavity and a product release position for each mould cavity of said multiple mould cavities where a moulded product is released from the mould cavity; and
   a mass feed member having a chamber with an inlet for foodstuff mass and said mass feed member being arranged at the fill position along the circular path of the mould drum, said inlet of the mass feed member being connected or adapted to be connected to the outlet of the pump, the mass feed member being adapted to transfer the foodstuff mass into at least one mould cavity of said multiple cavities;
   wherein the mass feed member is provided with a grinder drive for driving a grinder member within the mass feed member, said grinder drive adapted to move the mobile grinder member, said grinder member defining a plurality of orifices;
   wherein a grinder device controller is provided to control operation of the grinder drive of the mass feed member;
   wherein the mass feed member is further provided with a grinder body defining a plurality of orifices corresponding to the multiple mould cavities of the mould drum as the mould drum moves, the plurality of orifices of the grinder member adapted to mate the plurality of the orifices of the grinder body depending on reciprocation and displacement of the grinder member relative to the grinder body;
wherein the grinder member is arranged to reciprocate in a direction parallel to the longitudinal drum rotation axis of the mould drum;
wherein the mass feed member defines at least one linear guide along which the grinder member moves;
wherein the grinder body is maintained stationary relative to the grinder member;
wherein the grinder body and the grinder member are formed as plates having flat cooperating surfaces.

* * * * *